(12) United States Patent
Steinlage et al.

(10) Patent No.: US 10,076,072 B2
(45) Date of Patent: Sep. 18, 2018

(54) TILLAGE IMPLEMENT WITH INTRA-WING GANG OFFSET

(71) Applicant: Deere & Company, Moline, IL (US)

(72) Inventors: David L. Steinlage, Centralia, KS (US); Shawn J. Becker, Centralia, KS (US); Robert T. Casper, Mingo, IA (US); Bryan D. Blauwet, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/243,687

(22) Filed: Aug. 22, 2016

(65) Prior Publication Data

US 2017/0079196 A1    Mar. 23, 2017

Related U.S. Application Data

(60) Provisional application No. 62/222,564, filed on Sep. 23, 2015.

(51) Int. Cl.
| | | |
|---|---|---|
| *A01B 73/04* | (2006.01) | |
| *A01B 19/02* | (2006.01) | |
| *A01B 63/14* | (2006.01) | |
| *A01B 33/02* | (2006.01) | |
| *A01B 23/04* | (2006.01) | |

(52) U.S. Cl.
CPC ............ *A01B 73/044* (2013.01); *A01B 19/02* (2013.01); *A01B 23/04* (2013.01); *A01B 33/02* (2013.01); *A01B 63/14* (2013.01); *A01B 73/046* (2013.01)

(58) Field of Classification Search
CPC ..... A01B 73/044; A01B 73/046; A01B 23/04; A01B 23/06; A01B 33/02
See application file for complete search history.

(56) References Cited

U.S. PATENT DOCUMENTS 1,648,381 A * 11/1927 Flatley .................. A01B 23/06
                                                                 172/565
2,046,851 A * 7/1936 Rutter .................. A01B 73/044
                                                                 172/581

(Continued)

FOREIGN PATENT DOCUMENTS

| AU | 2003200023 B2 | 12/2007 |
|---|---|---|
| AU | 2011201689 B2 | 11/2011 |

(Continued)

OTHER PUBLICATIONS

Deere & Company, Anti-Tangle Kit, Deere & Company Sales Manual, 1994-2016; http://salesmanual.deere.com/sales/salesmanual/en_NA/secondary_tillage/attachments/field_cultivators/2210_fh_and_11/2210_anti_tangle_kit.html.

*Primary Examiner* — Tara Mayo-Pinnock
(74) *Attorney, Agent, or Firm* — Klintworth & Rozenblat IP LLP; Steven J. Wietrzny

(57) ABSTRACT

A tillage implement has a main frame, a hinged wing and a plurality of gangs each having tools along its length. The plurality of gangs includes a main frame gang mounted to the main frame and inner and outer wing gangs mounted to the wing. The inner and outer wing gangs have inner ends that are forward or rearward with respect to the direction of travel of outer ends, and the lengths of the inner and outer wing gangs are offset from each other in the direction of travel.

8 Claims, 39 Drawing Sheets

(56) References Cited

U.S. PATENT DOCUMENTS

| | | | |
|---|---|---|---|
| 2,324,064 A * | 7/1943 | Coffing | A01B 23/06 172/570 |
| 3,640,345 A | 2/1972 | Sosalla | |
| 4,042,045 A | 8/1977 | Hake | |
| 4,306,732 A | 12/1981 | Pettibone | |
| 5,944,116 A * | 8/1999 | Domries | A01L 363/26 172/580 |
| 6,164,386 A | 12/2000 | Delaurier | |
| 6,578,640 B1 | 6/2003 | Ohlman et al. | |
| 6,612,381 B2 | 9/2003 | Powell et al. | |
| 6,626,246 B2 | 9/2003 | Gerber et al. | |
| 6,688,405 B2 | 2/2004 | Steinlage | |
| 6,896,068 B2 | 5/2005 | Dietrich, Sr. et al. | |
| 6,926,093 B1 | 8/2005 | Fink et al. | |
| 7,000,708 B2 | 2/2006 | Powell et al. | |
| 7,108,075 B2 | 9/2006 | Powell et al. | |
| 7,766,093 B2 | 8/2010 | Becker et al. | |
| 7,918,285 B1 | 4/2011 | Graham et al. | |
| 8,047,299 B2 | 11/2011 | Hurtis et al. | |
| 8,122,970 B2 * | 2/2012 | Palen | A01B 73/046 172/311 |
| 9,247,687 B2 | 2/2016 | Gray et al. | |
| 9,370,137 B2 * | 6/2016 | Hennes | A01B 21/083 |
| 9,510,496 B2 * | 12/2016 | Kovach | A01B 23/06 |
| 2002/0144826 A1 | 10/2002 | Gerber et al. | |
| 2002/0144827 A1 | 10/2002 | Dietrich, Jr. et al. | |
| 2003/0132013 A1 | 7/2003 | Steinlage | |
| 2004/0149459 A1 | 8/2004 | Powell et al. | |
| 2008/0066935 A1 | 3/2008 | Becker et al. | |
| 2012/0298386 A1 | 11/2012 | Steffan et al. | |
| 2014/0158386 A1 | 6/2014 | Payne et al. | |
| 2014/0251646 A1 | 9/2014 | Gray et al. | |
| 2014/0262370 A1 | 9/2014 | Kohn et al. | |
| 2015/0156946 A1 | 6/2015 | Sudbrink et al. | |

FOREIGN PATENT DOCUMENTS

| | | |
|---|---|---|
| BR | PI1101737 A2 | 8/2012 |
| CA | 2329462 A1 | 6/2002 |
| CA | 2595999 A1 | 2/2008 |
| CA | 2737824 A1 | 10/2011 |
| CA | 2833996 A1 | 6/2014 |
| CN | 103843483 A | 6/2014 |
| EP | 2377383 B1 | 10/2011 |
| EP | 2740341 A1 | 6/2014 |

* cited by examiner

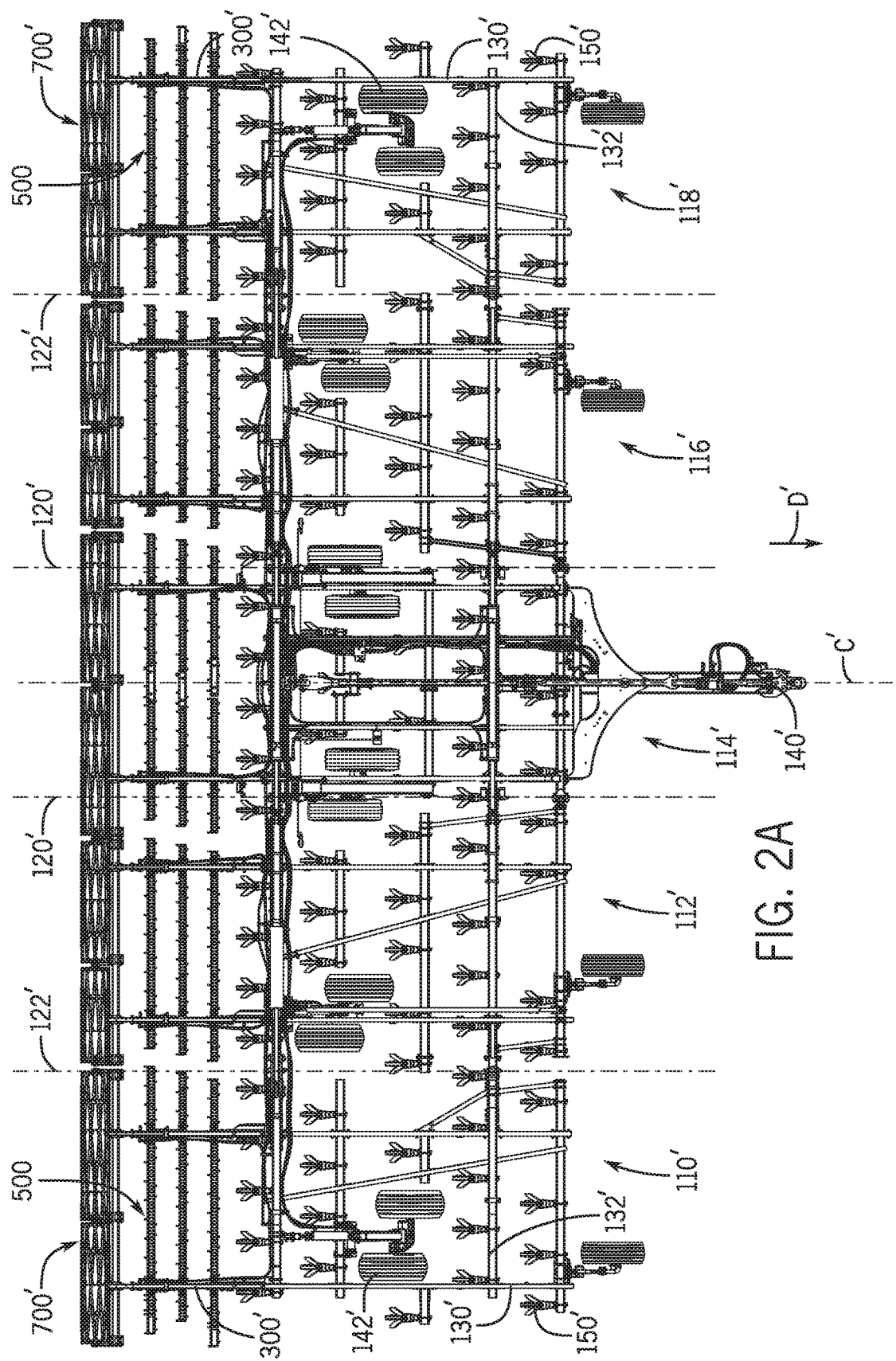

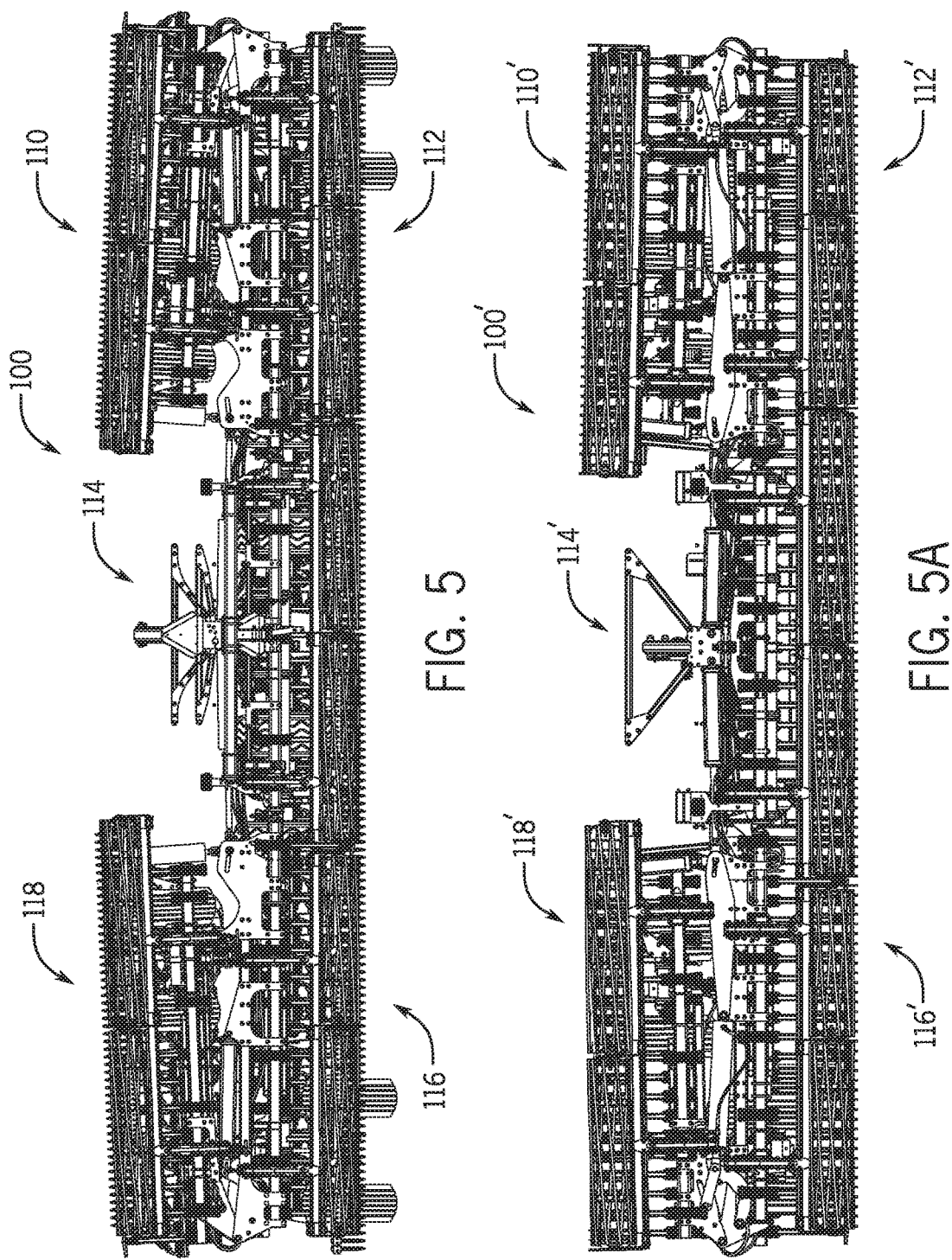

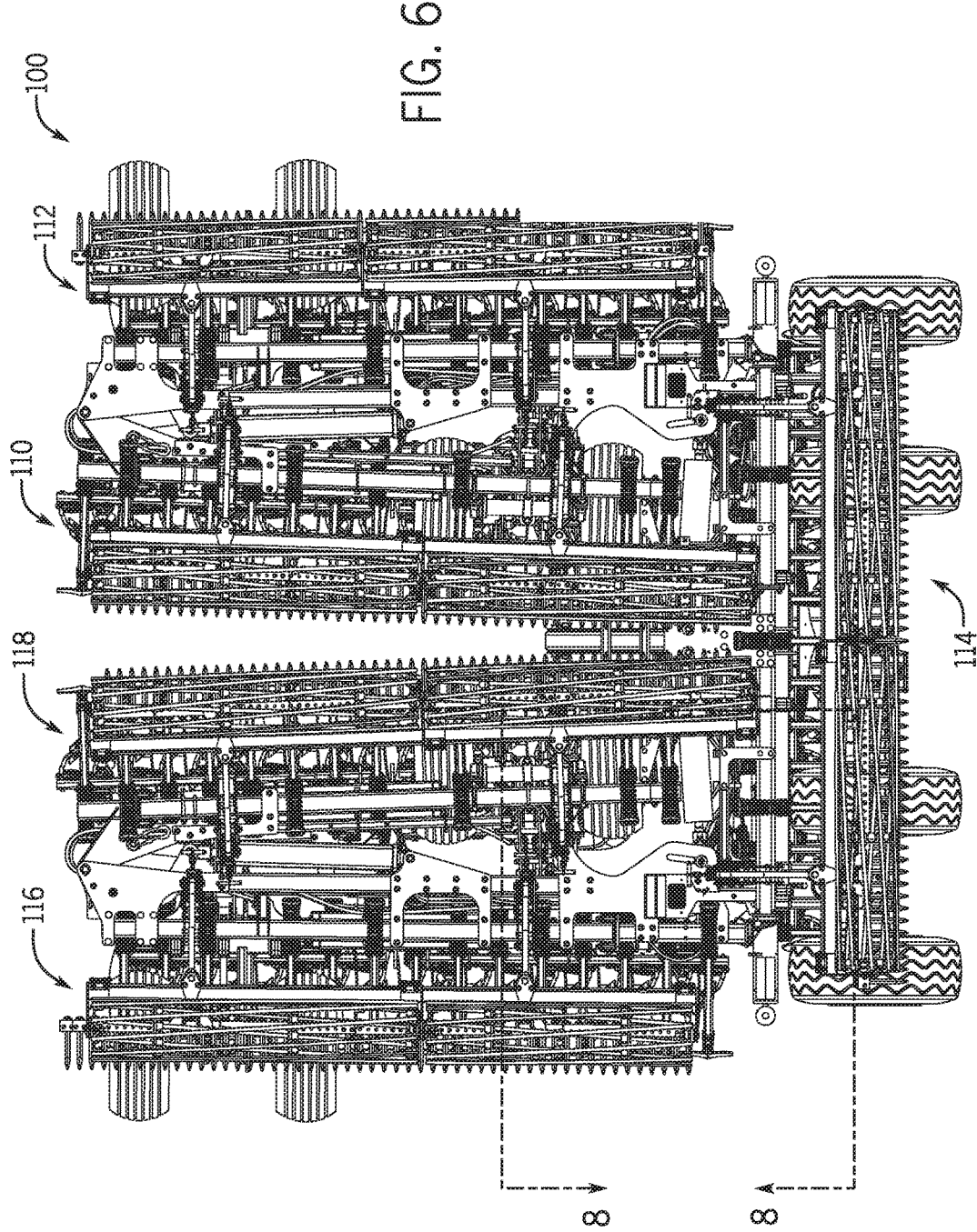

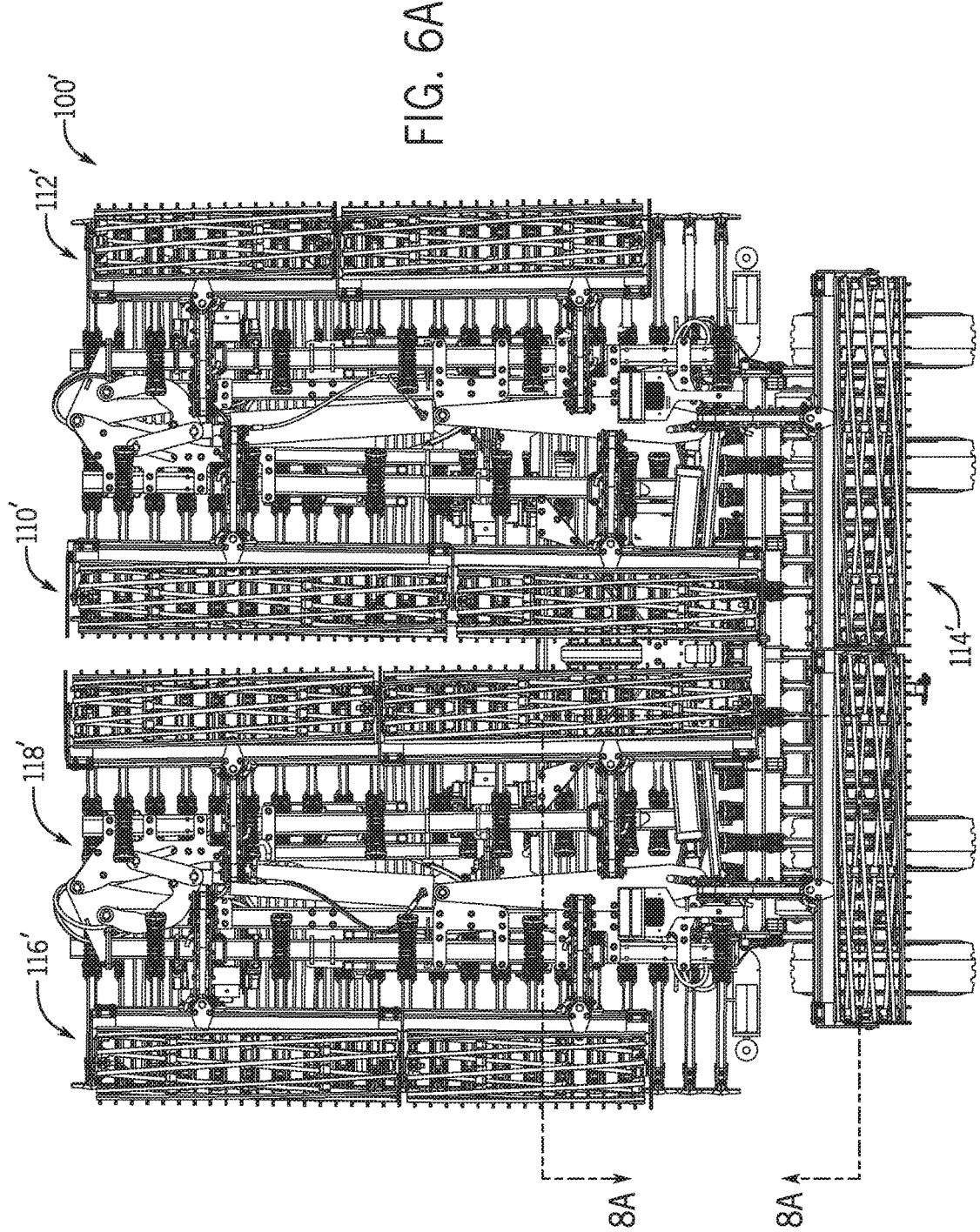

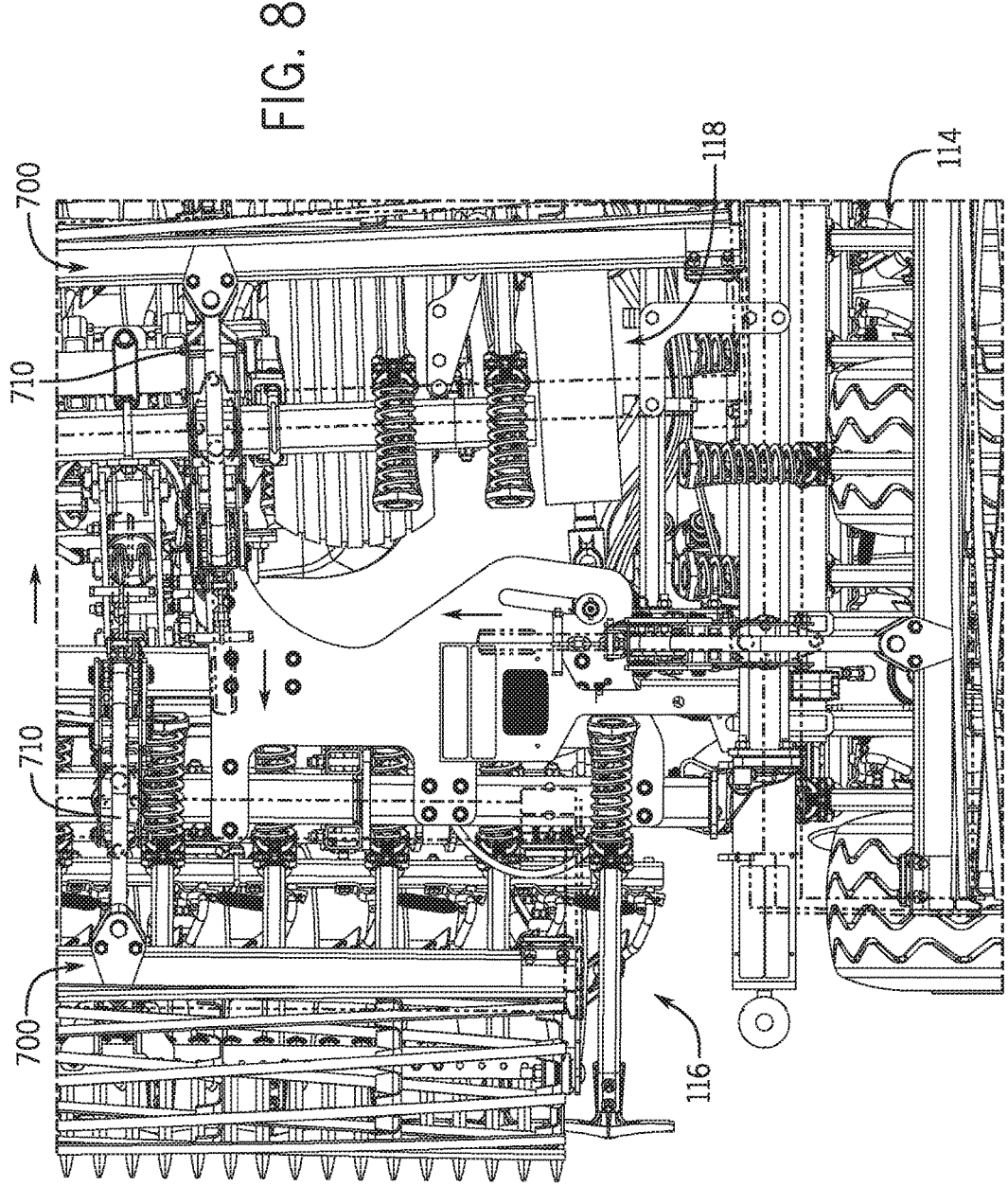

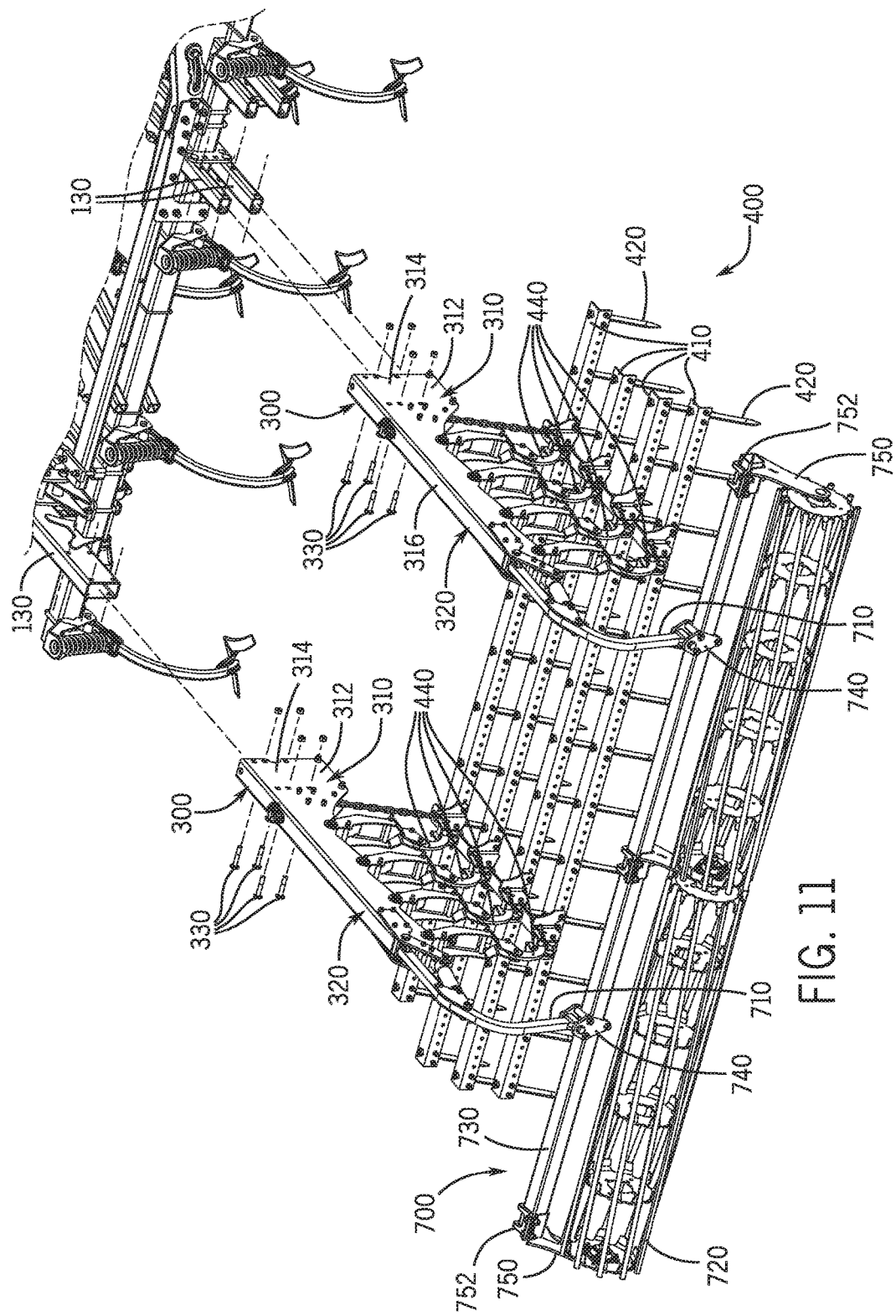

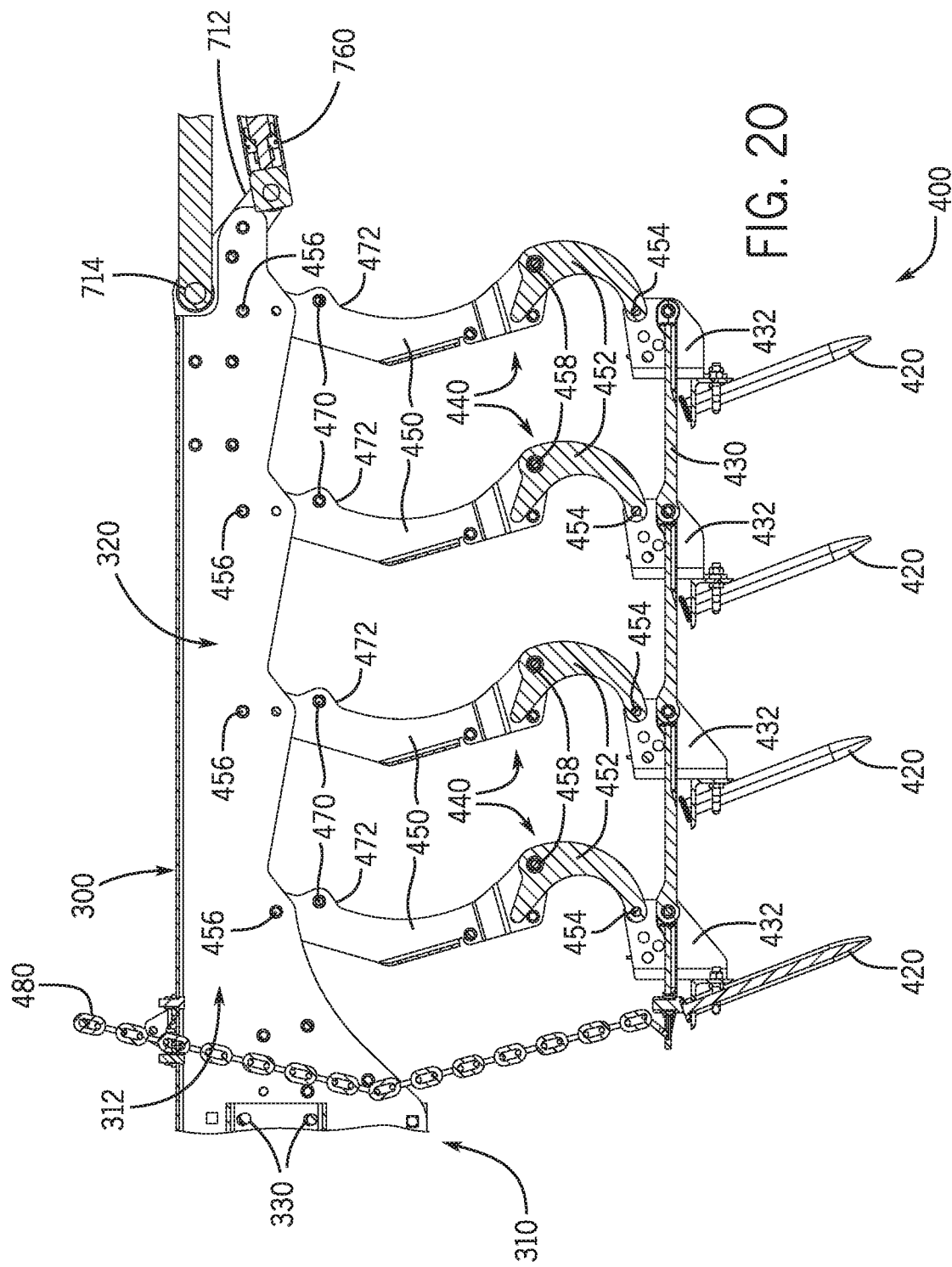

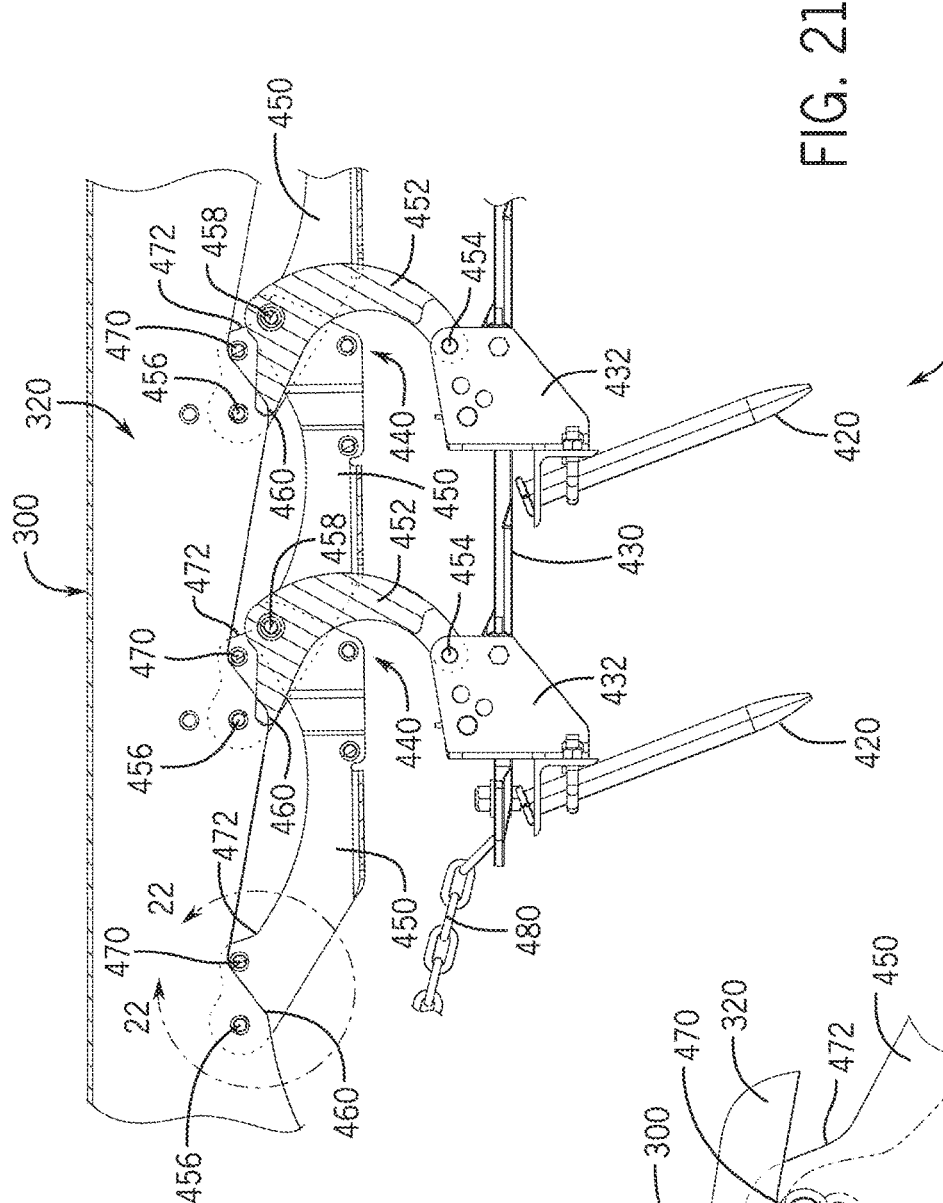
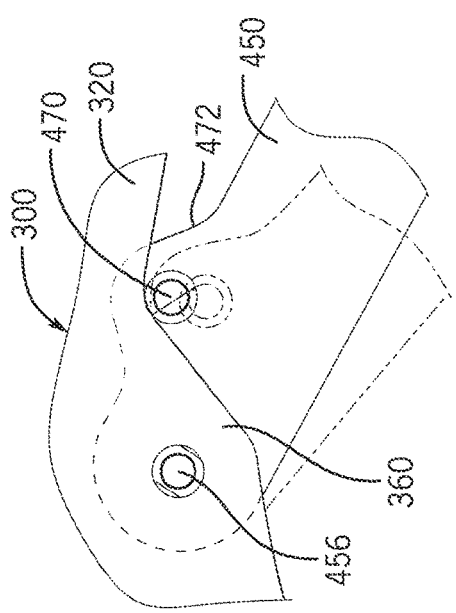

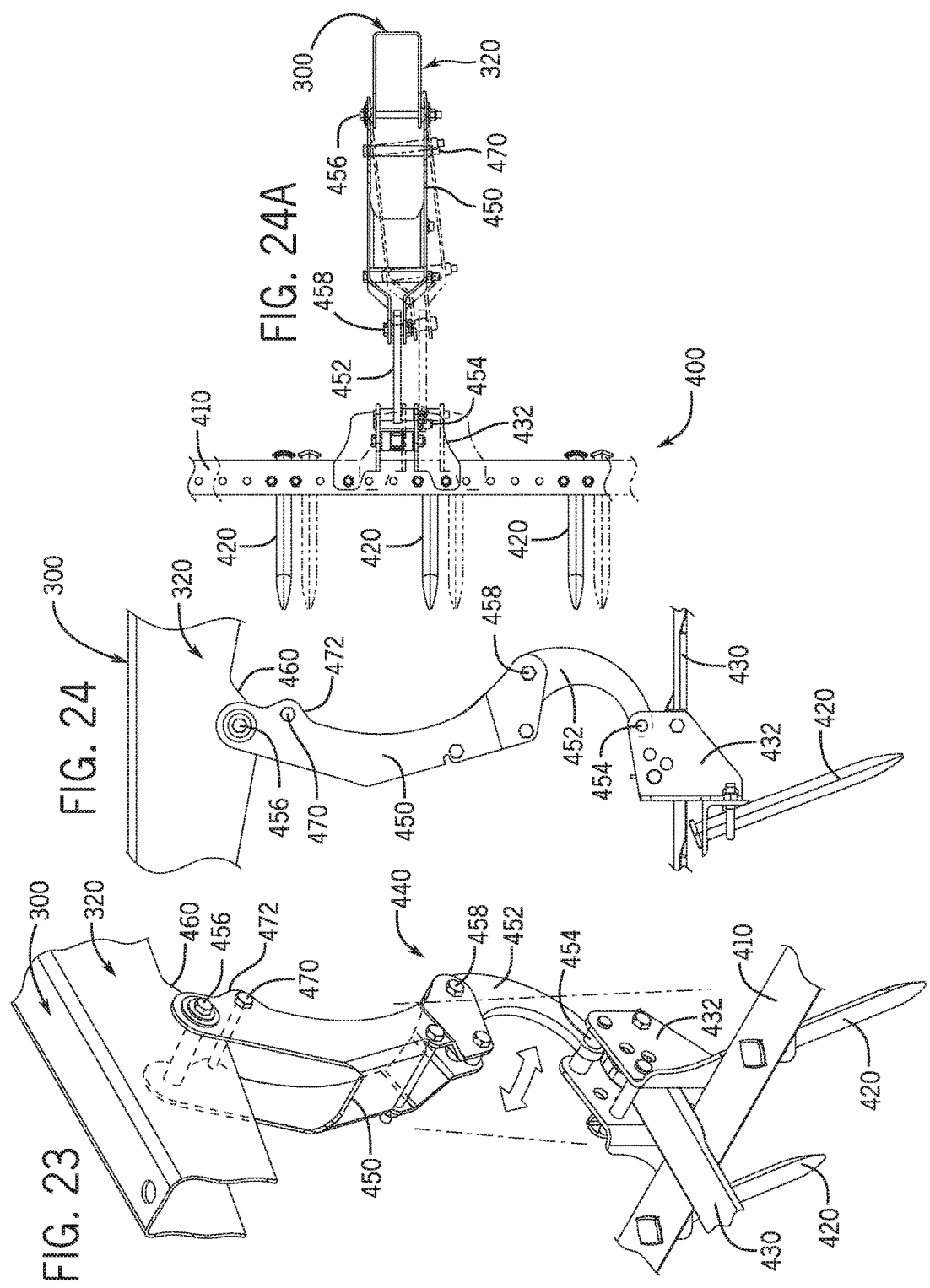

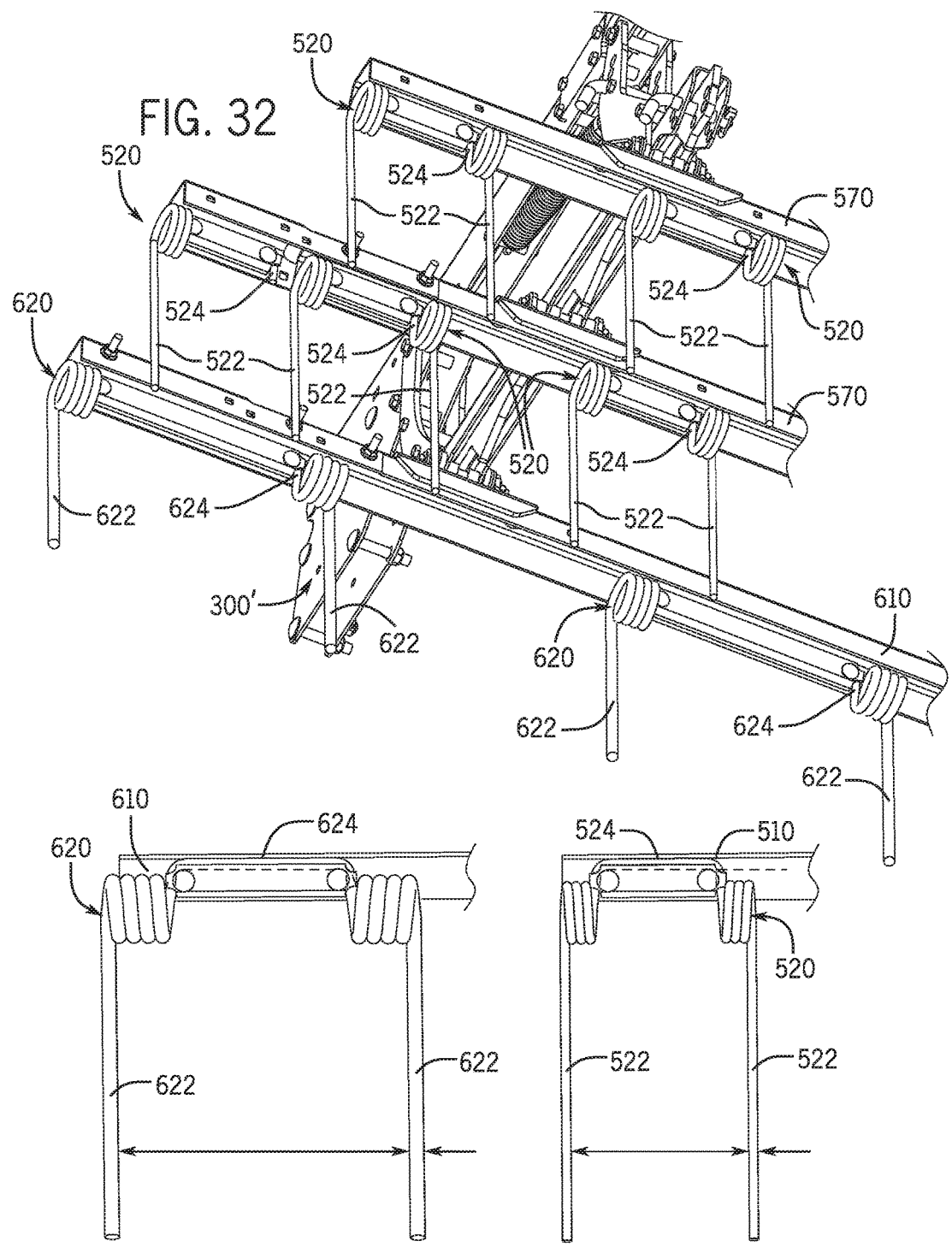

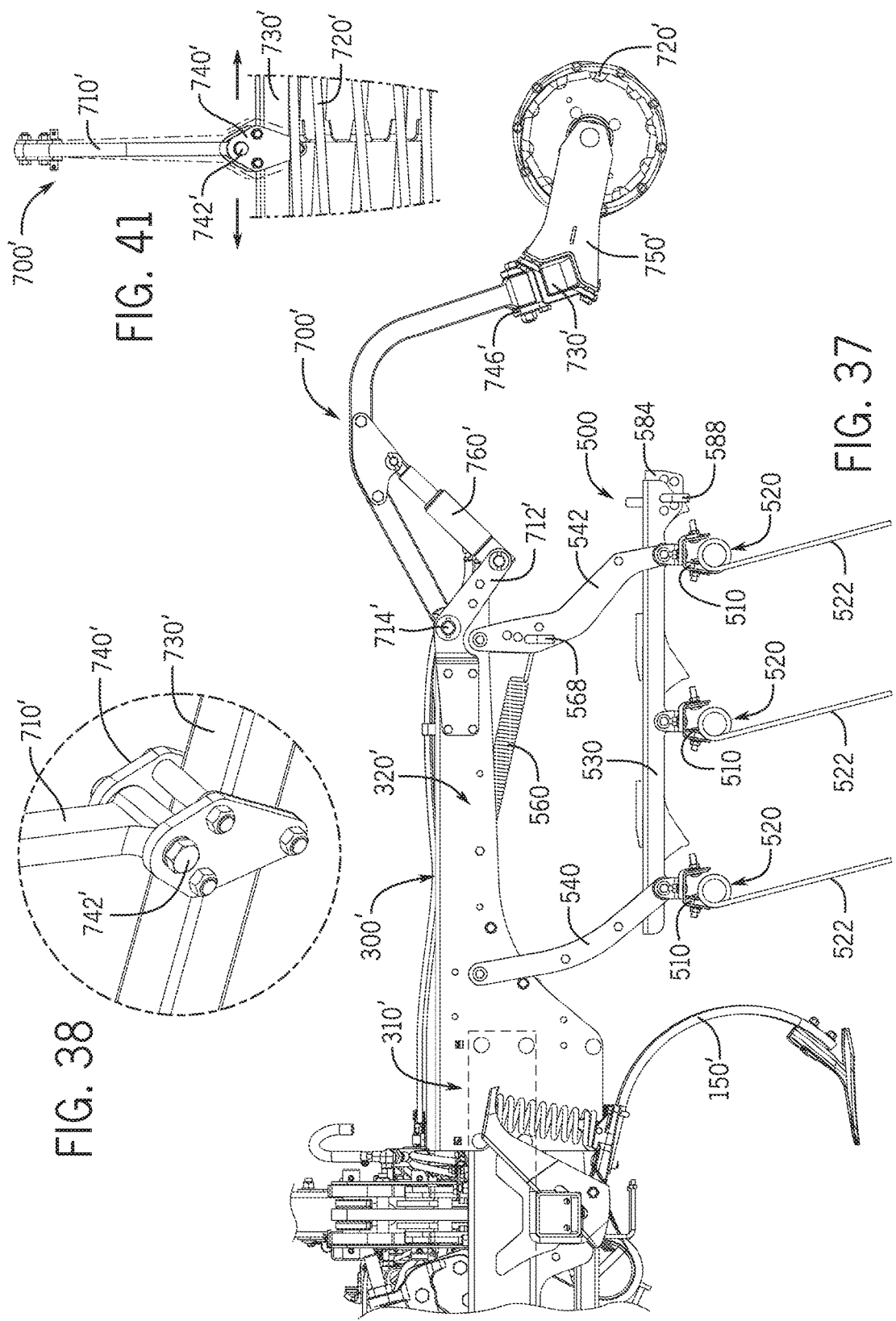

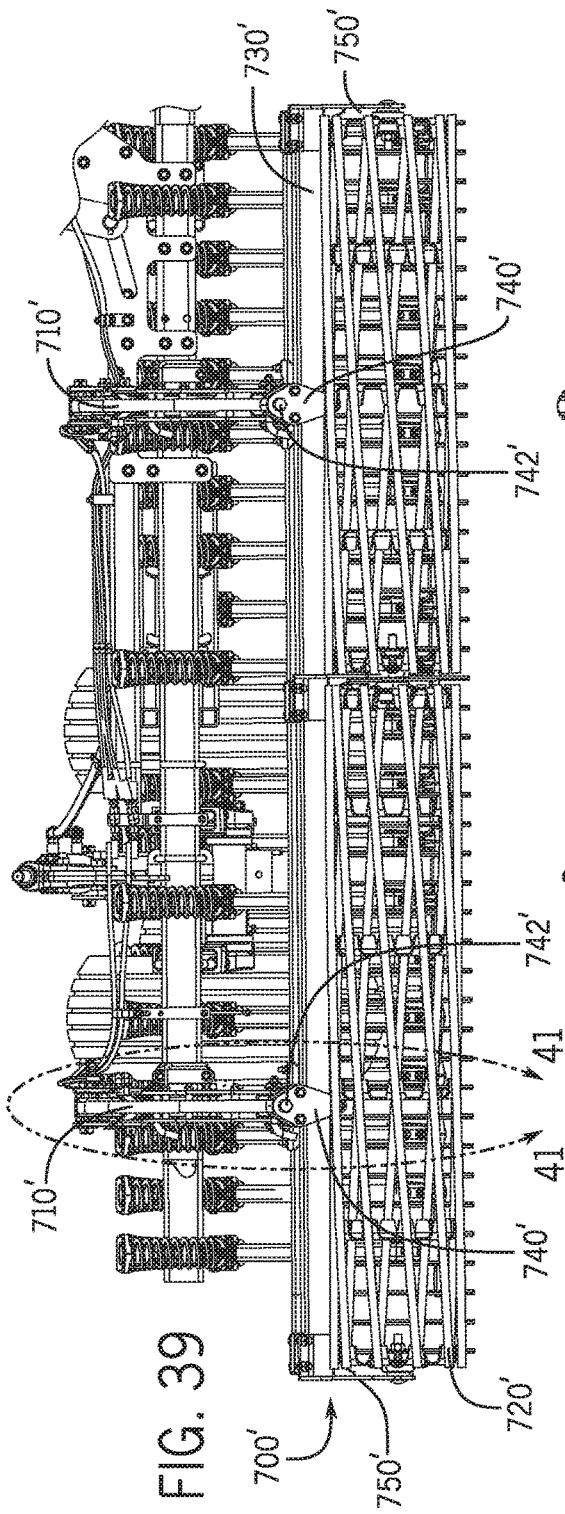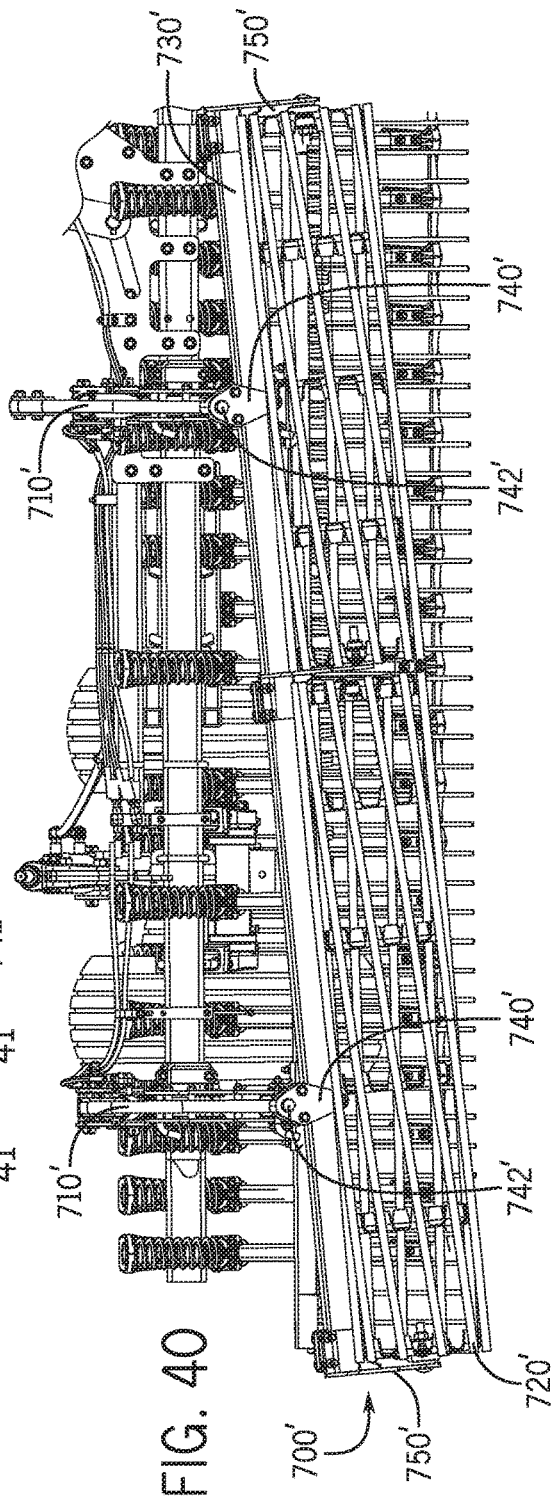

TILLAGE IMPLEMENT WITH INTRA-WING GANG OFFSET

CROSS-REFERENCE TO RELATED APPLICATION(S)

This application claims priority to provisional application Ser. No. 62/222,564, filed Sep. 23, 2015.

STATEMENT OF FEDERALLY SPONSORED RESEARCH OR DEVELOPMENT

Not applicable.

FIELD OF THE DISCLOSURE

This disclosure relates to tillage implements, and in particular to winged tillage implements.

BACKGROUND OF THE DISCLOSURE

Agricultural implements and machines, such as various plows, tillers, rippers, seeders, nutrient applicators, etc., are used to work soil of crop fields. Tillage and other agricultural implements can perform a variety of tasks, such as breaking up tough ground, injecting nutrients into the ground, and leveling the ground. Such implements are commonly towed behind work vehicles, such as tractors, and can be outfitted with a variety of ground-engaging tools, such as shanks, disks, harrowing tools and finishing tools, depending on the ground preparation operation being carried out.

The ability to efficiently and effectively conduct ground preparation operations is highly affected by the ground conditions, such as the wetness, the amount of crop residue, and the general composition of the ground. One issue is establishing and maintaining the desired engagement of the tools with the ground. This could be in terms of the proper orientation and alignment with the direction of travel of the implement, the proper ground following and penetration to achieve the desired ground preparation, or achieving a consistent orientation, following and penetration with respect to the ground across the width of the implement transverse to the travel direction of the implement.

Modern tillage implements may have a central main frame and one or more wings supporting the tools in a prescribed pattern to achieve good ground working and residue flow over an extended swathe of field as the implement traverses the field. Some tillage implements, for example, have outer wings hinged to inner wings, which, in turn, are hinged at opposite sides of the main frame. The hinges permit the wings to fold inward for transport of the implement on roadways. Arranging the various tools and attachments as needed for ground-working without interfering with folding of the implement may be challenging and may require operator intervention in the event any of the various components become entangled.

SUMMARY OF THE DISCLOSURE

The disclosure generally provides a tillage implement with an improved offset disk rank arrangement.

In one aspect the disclosure provides a tillage implement having a main frame centered on a centerline in a direction of travel of the implement, and a wing hinged to the main frame to one side of the centerline. A plurality of gangs, each having tools along its length, includes a main frame gang mounted to the main frame and inner and outer wing gangs mounted to the wing. The inner and outer wing gangs have inner ends that are forward or rearward with respect to the direction of travel of outer ends, and wherein the lengths of the inner and outer wing gangs are offset from each other in the direction of travel.

In another aspect the disclosure provides a tillage implement having a main frame centered on a centerline in a direction of travel of the implement. At least one wing is pivotally coupled to the main frame to at least one side of the centerline. A plurality of disk gangs are mounted to the main frame and the at least one wing, including a plurality of main frame disk gangs mounted to the main frame and a plurality of wing disk gangs mounted to an associated one of the at least one wing. The main frame disk gangs are mounted to the main frame such that an inner end of a first main frame disk gang to a first side of the centerline is forward with respect to the direction of travel of an outer end of the first main frame disk gang, and an inner end of a second main frame disk gang to a second side of the centerline opposite the first side is forward with respect to the direction of travel of an outer end of the second main frame disk gang. The wing frame disk gangs are mounted to the associated at least one wing offset from each other such that an inner end of an inner wing disk gang is forward with respect to the direction of travel of an outer end of the inner wing disk gang, and an inner end of an outer wing disk gang is forward with respect to the direction of travel of an outer end of the outer wing disk gang.

In another aspect the disclosure provides a tillage implement having a main frame centered on a centerline in a direction of travel of the implement. First and second inner wings are pivotally coupled to the main frame at respective first and second sides of the centerline. First and second outer wings are pivotally coupled to the respective first and second outer wings opposite the main frame. A plurality of disk gangs are mounted to the main frame and first and second inner and outer wings, including a plurality of main frame disk gangs mounted to the main frame and a plurality of wing disk gangs mounted to each of the first and second inner and outer wings. The main frame disk gangs are mounted to the main frame such that an inner end of a first main frame disk gang to a first side of the centerline is forward with respect to the direction of travel of an outer end of the first main frame disk gang, and an inner end of a second main frame disk gang to a second side of the centerline opposite the first side is forward with respect to the direction of travel of an outer end of the second main frame disk gang. Each of the first and second inner and outer wings has inner and outer wing disk gangs mounted offset from each other such that an inner end of the associated inner wing disk gang is forward with respect to the direction of travel of an outer end of the associated inner wing disk gang, and an inner end of the associated outer wing disk gang is forward with respect to the direction of travel of an outer end of the associated outer wing disk gang.

The details of one or more embodiments are set forth in the accompanying drawings and the description below. Other features and advantages will become apparent from the description, the drawings, and the claims.

BRIEF DESCRIPTION OF THE DRAWINGS

FIGS. 2 and 2A are top views of the respective tillage implements of FIGS. 1 and 1A;

FIGS. 5 and 5A are respective rear views thereof, each shown in a partially folded orientation;

FIGS. 6 and 6A are respective rear views thereof, each shown in a fully folded orientation;

FIGS. 8 and 8A are enlarged rear views showing areas 8-8 and 8A-8A of FIGS. 6 and 6A, respectively;

FIGS. 11 and 11A are respective enlarged partial rear perspective views thereof, showing finishing attachments exploded from the wing frame;

FIG. 20 is an enlarged partial sectional view thereof, shown in the FIG. 17 position;

FIG. 21 is an enlarged partial sectional view showing area 21-21 of FIG. 19;

FIG. 22 is detail view showing area 22-22 of FIG. 21;

FIG. 23 is a partial perspective view showing one antitangle bracket of the example spike harrow attachment of FIG. 17;

FIG. 24 is a partial side view thereof;

FIG. 24A is a partial end view thereof shown in an orientation corresponding to when the implement is folded;

FIG. 32 is a partial perspective view of an example knockdown tine harrow attachment;

FIGS. 33 and 34 are partial rear views thereof, showing knockdown and smoothing tines, respectively;

FIG. 37 is a partial side view of the example tine harrow and finishing basket attachments as shown in FIG. 25, showing a roller basket in a raised position;

FIG. 38 is an enlarged partial perspective view showing area 38-38 of FIG. 10A;

FIG. 39 is a partial rear view of FIG. 10A;

FIG. 40 is a partial rear view similar to FIG. 39, showing the roller basket pivoted laterally; and FIG. 41 is a partial rear view showing area 41-41 of FIG. 39.

Like reference symbols in the various drawings indicate like elements.

DETAILED DESCRIPTION

Figure 1:
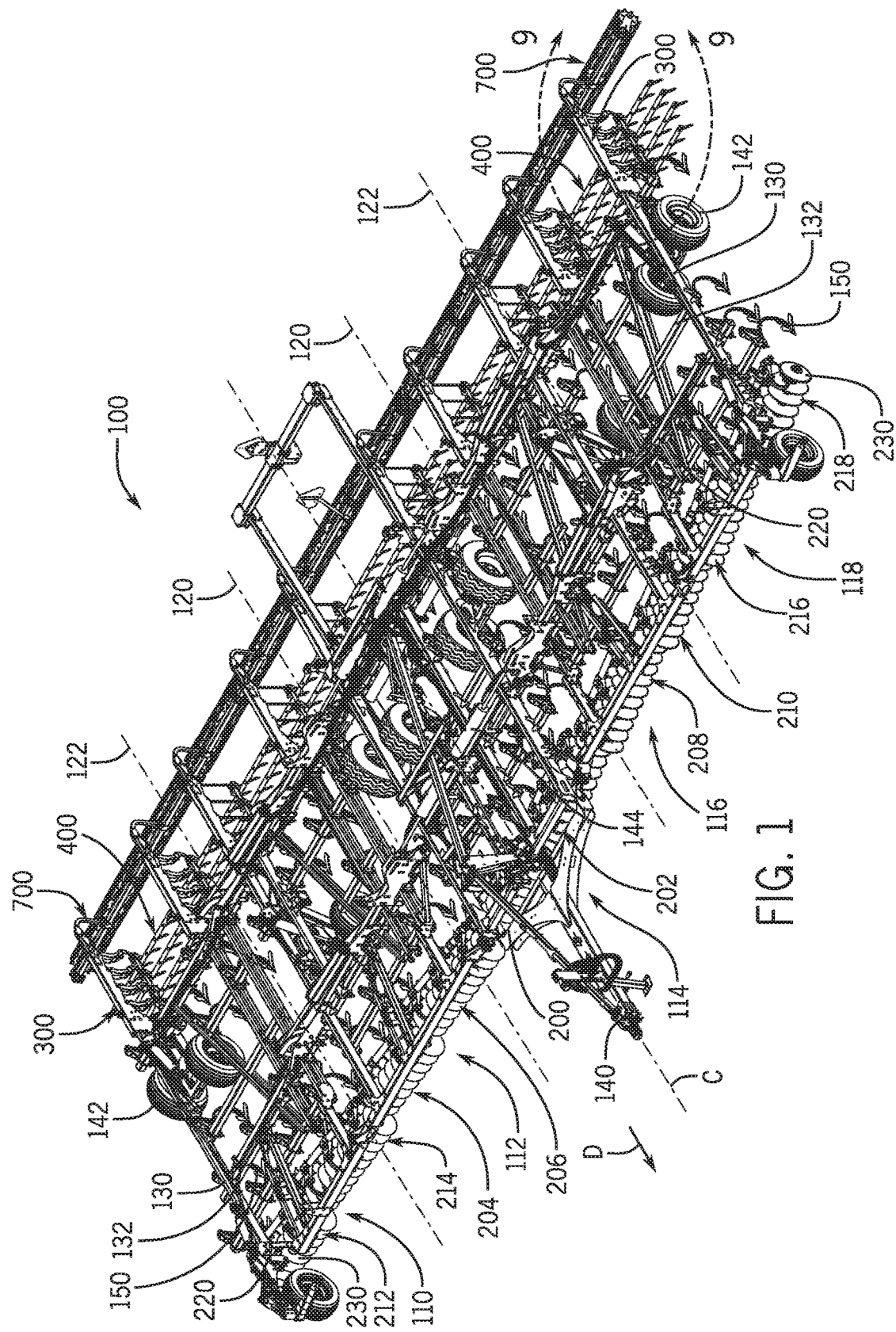
FIGS. 1 and 1A are perspective views of example tillage implements in the form of a mulch finisher and a field cultivator, respectively, in which this disclosure may be incorporated.

The following describes one or more example embodiments of the disclosed tillage implement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The disclosure is presented and discussed at times with respect to specific tillage implements, including the example mulch finisher and field cultivator tillage implements shown in the drawings. It should be understood that, as applicable, the principles of the disclosure may apply to either of the illustrated examples as well as to other tillage implements (e.g., other compact and conventional primary and second tillage implements) and other agricultural implements. Thus, the disclosure should not be limited to the specific examples described below and shown in the accompanying figures of the drawings.

Also, terms of direction and orientation will be used herein with respect to one or more of a direction of travel and the ground. For example, the terms "forward" and "fore" (and variants) refer to a direction corresponding to the direction of travel of the implement, while the terms "rearward" and "aft" (and variants) refer to a direction opposite the direction of travel. The terms "fore-aft" and "fore-aft axis" are also utilized in reference to a direction or an axis extending in the fore and aft directions. By comparison, the terms "lateral" or "lateral axis" refer to a direction or an axis that is perpendicular to the fore-aft axis and extends in a horizontal plane. Also, the terms "vertical" or "vertical axis" refer to a direction or an axis that is orthogonal to a horizontal plane. The terms "up" and "down" (and variants) refer to a vertical relation to the ground. The terms "inner" or "inside" and "outer" or "outside" (and variants) are terms of relative relation to a fore-aft centerline of the implement in which an "inner" object is nearer the centerline than an "outer" object.

Various agricultural machines (e.g., seeders, sprayers, primary and secondary tillage implements, and so on) have very wide platforms for mounting various tools or material dispensing components for working crop fields. To allow for transport on roadways, the implements may be formed in sections, one or more of which are able to fold inward alongside or above a main fame of the implement, which has a controlled (e.g., regulated) width or lateral dimension. The sections may be hinged together and pivot with respect to one another between an operational position, in which the "wing" frame sections are generally parallel with the main frame section, and a transport position, in which the wing sections are folded up and/or over the main frame section. An implement may have as few as one main frame section and one wing section, or it may have several wing sections, such as multiple (e.g., inner and outer) wing sections on each side of the main frame section.

The effective transport and operational dimensions of the implement may be governed by various factors. As noted, the transport dimensions may be governed by roadway regulations for the width and height of vehicles. This, in turn, may affect the operational dimensions of the implement by limiting the width (i.e., the lateral dimension perpendicular to the direction of travel) of the sections that may be folded onto or above the main frame within the regulated width and height envelope. The dimensions of the implement during operation may be governed by other factors. For example, the operational length (i.e., the longitudinal fore-aft direction of travel) and width of the implement may be limited by certain practical considerations, such as supportable weight of the implement, power of the towing vehicle and cost. The length and width of the implement may be limited by certain functional aspects, such as the stability of the implement and consistent position of the implement with respect to the ground during operation It is important that the implements be able to fold (and unfold) in an unimpeded manner. In certain implements the various tools and material dispensing components that may be supported by the sections may project upwardly in various directions and to various extents such that they may interfere with another part of the implement (e.g., another tool, material dispensing component, section frame member, wheels, etc.). Moreover, given the large length and width of the implement, and the often numerous frame, tool and other components of the implement, a potential obstruction may be difficult to identify before commencing a fold or unfold operation. In the event of an obstruction, the operator may be required to reverse the folding operation, exit the vehicle cabin and clear the obstruction before re-commencing folding. Worse yet, in some cases, the obstructions may cause binding or interlocking of the obstructing components in a way that prevents the corresponding sections from being separated (i.e., unfolded) readily.

Various aspects of this disclosure address these (and other) concerns with conventional agricultural machines, and particularly tillage implements. In particular, the disclosure affords various improvements to the compact foldability and ground-following capability of multi-section tillage implements. The fold and ground-working capabilities will be referenced throughout the following discussion numerous times, and for brevity, will be referred to as "FGW" capabilities. This term will be understood to represent improvements to either foldability or ground-working, or both collectively. In other words, a particular aspect of the disclosure may pertain to both the fold and ground-working capabilities of the implement, or only the foldability, or only the ground-working capabilities. Yet, any of these aspects of the disclosure will be considered to contribute to the FGW capabilities of the implement.

In certain embodiments, the disclosure provides an improved offset gang arrangement for multi-section agricultural implements. In various embodiments, the agricultural implement may be a tillage implement having a main frame centered on a centerline in the direction of travel of the implement. The implement may have one or more wing sections hinged to one or more sides of the main frame. The wing section(s) and the main frame may each have multiple gangs of tools. The main frame gangs may be mounted to the main frame such that an inner end of a first main frame gang to a first side of the centerline is forward with respect to the direction of travel of an outer end of the first main frame gang, and an inner end of a second main frame gang to a second side of the centerline opposite the first side is forward with respect to the direction of travel of an outer end of the second main frame gang. The wing section gangs may be mounted to the associated wing section offset from each other such that an inner end of an inside wing gang is forward with respect to the direction of travel of an outer end of the inside wing gang and an inner end of an outside wing gang is forward with respect to the direction of travel of an outer end of the outside wing gang.

Unlike some large multi-section tillage implements in which each section has a single elongated gang of tools, this disclosure reduces the effective space occupied in the fore-aft direction of travel dimension by having multiple offset disk gangs in each section. Desired tool spacing patterns may be maintained while reducing the longitudinal dimension of the implement (sometimes referred to as "frame depth"). Improved "ground-following," as it is sometimes called, of the implement may in turn be achieved by decreasing the frame depth. Proper lateral and longitudinal placement of the disks on the implement, and thereby, good working performance may be achieved. For example, sufficient fore-aft and lateral spacing may be achieved and maintained to allow proper flow of crop residue and debris through the implement (e.g., to prevent plugging of the tools), and proper lateral spacing may be achieved and maintained for consistent ground working across the entire implement (e.g., to prevent areas of unprocessed or uneven ground).

The angle of each disk with respect to a lateral vertical plane (sometimes referred to as the "steer" angle) and the angle of each disk with respect to a horizontal plane (sometimes referred to as the "tilt" angle) may be set as needed for good ground preparation. By offsetting the ends of the gang longitudinally in the fore-aft direction of travel, the steer angle (and also possibly the tilt angle) of the tools may be changed. The disclosed tillage implement places the tools, such as cultivator disks, at the proper steering angles and at the desired spacing pattern to achieve proper ground-working and residue flow through the implement. Further, the intra-wing offset of the gangs (either forward or rearward) reduces the fore-aft distance occupied by the gangs in each section. When the aggregate offset for the set of the gangs across all sections of the implement is considered, the reduction in fore-aft distance occupied by the gangs may be significant. The space reduction may, in turn, allow for a significant reduction in frame depth, thus saving weight and cost and improving ground-following of the implement. Moreover, in various embodiments, each gang may be adjusted separately, or adjacent pairs or sets of gangs on a given section may be adjusted together. The latter may help with consistent ground engagement of tools of different gangs and reduce the number of actuating assemblies needed.

Another aspect of the disclosure that improves upon the FGW capabilities of the implement pertains to improvements to the mounting location and arrangement of various attachments to the implement. Unlike some conventional implements, in which various finishing attachments are mounted along laterally-extending frame members via a U-bolt or similar tube clamp-type mounting hardware generally at any open area at the rear of the implement, in certain embodiments, the tillage implement may have drawbars (e.g., for finishing attachments such as harrows, finishing baskets, etc.) with mounting location fixing features. The mounting location fixing features may be configured mechanically to limit the potential locations, (or define a single location, or one of a selected few locations) at which the drawbars may be mounted on the implement and still perform the dedicated functions. In this way, placement of the drawbars, and thereby the finishing attachments, may be effectively selected by the implement manufacturer rather than the end user or operator to better insure that implement folding operations may be carried out without obstruction and/or to achieve a tight fold configuration.

In certain embodiments, the drawbars may be configured to mount directly or indirectly to the longitudinal, fore-aft frame members. The drawbars may extend in a fore-aft direction offset from, or aligned with, the frame members. Either way, the drawbars, and thereby the finishing attachments, may be located in a generally pre-defined, known space envelope at the rear of the implement. In the design and manufacture of the implement then, the frame and other components of the implement may be located to accommodate the components of the finishing attachments within the pre-defined space envelopes at the prescribed locations.

In certain embodiments, the drawbars may have a body, or a mounting portion of the body, that is generally saddle-shaped, or otherwise has a generally inverted "U" configuration that defines an open channel sized to accommodate a fore-aft frame member of the implement. The saddle may overlap the fore-aft frame member along some or all of the drawbars length. Bolts or other fasteners may be used to connect the drawbars to the fore-aft frame members. The bolts or other fasteners may be arranged in in the lateral direction of the implement, transverse to the direction of travel, in which case the bolts or other fasteners may experience shear force loading from the attachments, rather than bending loads. The saddle may define, or join with, an extension arm that extends beyond the fore-aft frame members to mount the attachments. The projecting portion of the saddle and/or extension arm may align with the fore-aft frame member in the direction of travel. Other longitudinally extending mounting features or components of the attachments (e.g., pivotal support arms of finishing attachments) may also align with the fore-aft frame members and/or the saddle or extension arm so that the elevated features of the drawbar and the attachments may generally fall along a common line for which space may be made available during folding and when in the folded configuration.

Various aspects of the attachments in this disclosure themselves may also benefit the FGW capabilities of the implement. For example, in certain embodiments, the finishing attachments may have anti-tangle features or characteristics that limit the free-range of movement of their components when in a non-operational state. In this way, the finishing attachments may function as intended during operation, exhibiting all range of movement necessary to perform its dedicated ground-working function, but have constrained movement in one or more directions, especially in one or more folding directions, that aid in maintaining the attachment in a pre-defined space envelope. When mounted to the implement via the drawbars with the generally fixed mounting location features, as previously described, not only may the space envelope be pre-defined, so may its location with respect to the frame. The implement may then be designed and manufactured to accommodate the finishing attachments fitting within the pre-defined space envelope at the prescribed location.

In certain embodiments, the tillage implement may have a spike harrow attachment with anti-tangle brackets coupling the spike harrow assembly to associated mounting structure (e.g., the aforementioned drawbars) of the implement. In certain embodiments, the anti-tangle brackets may be sets of rigid links that are pivotally connected to the spike harrow ranks and/or the drawbar to allow movement primarily in one plane (e.g., parallel to the direction of travel) and resist movement in one or more other planes (e.g., in the lateral dimension perpendicular to the direction of travel). The anti-tangle brackets may have pivot joints between the links to provide essentially no compressive forces that would otherwise prevent the spike harrow ranks from tripping, while allowing the full weight of the spike harrow ranks from acting on the ground. The anti-tangle brackets provide tensile forces to carry the spike harrow ranks when not in a ground-engaging state, such as when tripped by a rigid ground object or during transport. The anti-tangle brackets may also provide limited secondary (e.g., lateral) movement to permit enhanced operation the spike harrow attachment (e.g., to improve flow and reduce plugging). The limited lateral movement causes only minor positional change during the folding process so that the spike harrow attachment is generally constrained in its pre-defined space envelope so as not to obstruct folding.

In certain embodiments, the FGW capabilities of the tillage implement may be enhanced by making the downforce acting on the harrow ranks or other finishing attachment simpler and easier to adjust. The tilt angle adjustment may also be made simpler and easier. These adjustments may be made under power (e.g., hydraulic control), or if manual, may have adjustment mechanisms that reduce the forces on the assembly essentially to zero during the adjustment procedure. Moreover, the adjustment mechanisms may essentially eliminate adjustment loads while remaining in a generally operational orientation. Facilitating proper adjustment of the harrow ranks may better ensure that the attachment establishes and maintains the proper ground contact necessary to achieve good ground-working performance.

The FGW capabilities of the tillage implement may also be enhanced by a knockdown tine assembly and associated tine spacing pattern improvements. For example, in certain embodiments, the harrow tine attachment may have one or more "knockdown" tines having a wider tooth spacing and/or heavier gauge teeth. One or a row of knockdown tines may be mounted to a forward rank of the attachment to more aggressively work the ground. The knockdown tines may each be positioned to straddle a reference line extending in the fore-aft direction from a forward-mounted tillage tool (e.g., shank or standard) so that the knockdown tines are first to hit the raised mounds of ground left behind from the tool. The larger, stronger teeth thus better withstand the heavier loads, and the wider spacing allows for more soil and residue flow with less plugging. The tines in the ranks of the remainder of the harrow assembly may then be spaced in a prescribed pattern (e.g., such as a "split the middle" pattern or variants thereof) based off the positions of the knockdown tines, and their positions with respect to other tillage tools. This arrangement improves ground-finishing performance, which improves FGW capabilities by better ensuring unimpeded flow through the harrow attachment.

In certain embodiments, the FGW capabilities of the tillage implement may be enhanced by an improved configuration of a finishing basket attachment. In fact, the disclosed finishing basket attachment may have several features that improve FGW capabilities. For example, when combined with the drawbar of this disclosure, the finishing basket attachment has roller basket support arms that mount to the drawbars to align in the fore-aft direction of travel with the fore-aft frame members. The support arms may be manually adjustable or positioned under power (e.g., hydraulic control) to raise and lower. By aligning with the drawbars, the pre-defined space envelope of the support arms and the rest of the finishing basket attachment (in any adjusted position) may be accommodated for in the design and manufacture of the implement so as to better ensure uninhibited folding and unfolding of the frame sections. Also, the pivot point of each support arm may be lowered to approximately the height of the drawbar, and the cross-bar to which the roller basket is mounted may be positioned forward of the roller basket (rather than above it) to reduce the overall space envelope of the finishing basket attachment. The finishing basket attachment may also improve FGW capabilities through its provision of pivot connections between the support arms and the cross-bar and the use of materials and dimensions for the support arms that allow the support arms to flex laterally. The pivot connections and lateral flex of the support arms allow the roller basket to tilt laterally with respect to a horizontal plane as needed to follow side-hills and the like.

Moreover, when actuated under power (e.g., hydraulic control), open- or close-loop feedback control of one or more finishing attachments may also improve the FGW capabilities of the tillage implement. For example, position adjustments of the tools (e.g., ground penetration depth) during operation of the finishing attachments, from predetermined or real-time inputs, may allow the finishing attachments to perform better as ground conditions (e.g., soil type, residue percentage, etc.) change.

Referring now to the drawings, one or more example embodiments and implementations of the disclosed FGW capability improvements will be described with respect to one or both of the example tillage implements shown in FIGS. 1 and 1A. It will be understood that these tillage implements are only examples, and that the various aspects of the disclosure may be incorporated into other tillage implements of the same or different type, as well as into other agricultural machines. As such, the disclosure should not be limited by the illustrated examples described below.

As noted above, FIGS. 1 and 1A show two example tillage implements in which various aspects of the disclosure may be incorporated usefully. By way of example, a tillage implement in the form of a 56-foot mulch finisher is illustrated in FIG. 1, and a tillage implement in the form of a 50-foot field cultivator is illustrated in FIG. 1A. Both of the example tillage implements are multi-section implements with a main frame mounting at each side folding inner and outer wing sections. The mulch finisher of FIG. 1 differs from the field cultivator primary by the inclusion of forward gangs of cultivating disks and the type of harrow attachment at the rear of the implement. Otherwise, many of the features of the mulch finisher of FIG. 1 are the same or similar to the features of the field cultivator of FIG. 1A. Like reference numerals will be used in the drawings and the discussion below to refer to those features that are common to both example tillage implements. Specifically, both example tillage implements will be referred to as "TI 100" although for clarity the field cultivator of FIG. 1A will include a (') prime symbol (i.e., "TI 100'"). Similarly, other features of the field cultivator that are the same or similar to the mulch finisher will be referred to using like reference numbers containing a prime symbol. For clarity, the following discussion will describe the features and functionalities of the disclosure with reference to either TI 100 or TI 100', but not both. It will be understood, however, that the features and functionality may apply to both example implements, and that reference to one implement (e.g., TI 100) is a proxy or short-hand for reference to the other implement (e.g., TI 100'), unless otherwise noted. Generally, any reference to FIGS. 1-11 below should also be understood as a reference to FIGS. 1A-11A, and vice versa, unless noted otherwise. Moreover, the direction of travel "D" is the direction that the TI 100 is towed or otherwise moves during operation, and the centerline "C" of the TI 100 extends in the direction of travel D to define left and right lateral sides.

In the example embodiment illustrated in FIGS. 1-7, the TI 100 has five frame sections, which are hinged in a foldable configuration. Progressing from left to right in FIGS. 1 and 2, these frame sections include: (i) a first outer wing section 110, (ii) a first inner wing section 112, (iii) a main frame section 114, (iv) a second inner wing section 116, and (v) a second outer wing section 118. The inner wing sections 112, 116 are hinged at opposing lateral sides of the main frame section 114 and may pivot with respect thereto about first and second inner hinge lines 120. The outer wing sections 110, 118 are hinged at the laterally outer sides of the inner wing sections 112, 116, respectively, and can pivot relative thereto about first and second outer hinge lines 122. In embodiments wherein the hinge lines 120, 122 extend substantially parallel to the fore-aft axis, as is the case in the illustrated examples, the hinge lines 120, 122 may alternatively be referred to as "fore-aft hinge axes." Such a multi-section hinged design enables the TI 100 to transition from the unfolded operational state, shown in FIGS. 1-4, to a partially folded state, shown in FIG. 5, to a laterally compact, folded state to facilitate transport on roadways, shown in FIGS. 6 and 7. The width of the TI 100 when in the folded transport state is generally determined by the spacing between the inner hinge lines 120. In further embodiments, the TI 100 may include a greater or lesser number of wing sections, which may be hinged in various other foldable configurations.

Figure 7:
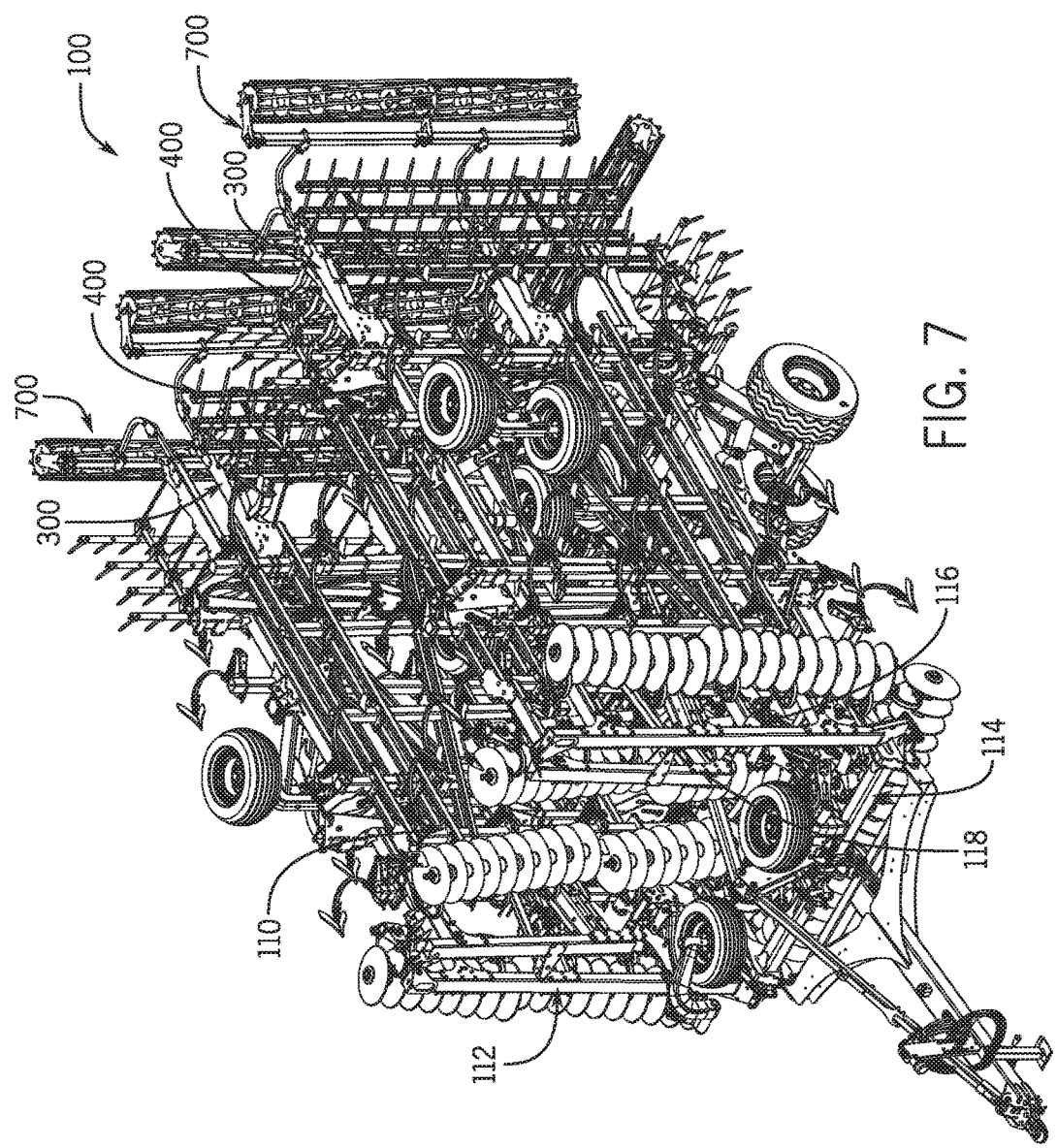
FIGS. 7 and 7A are respective front perspective views thereof.
Figure 7A:
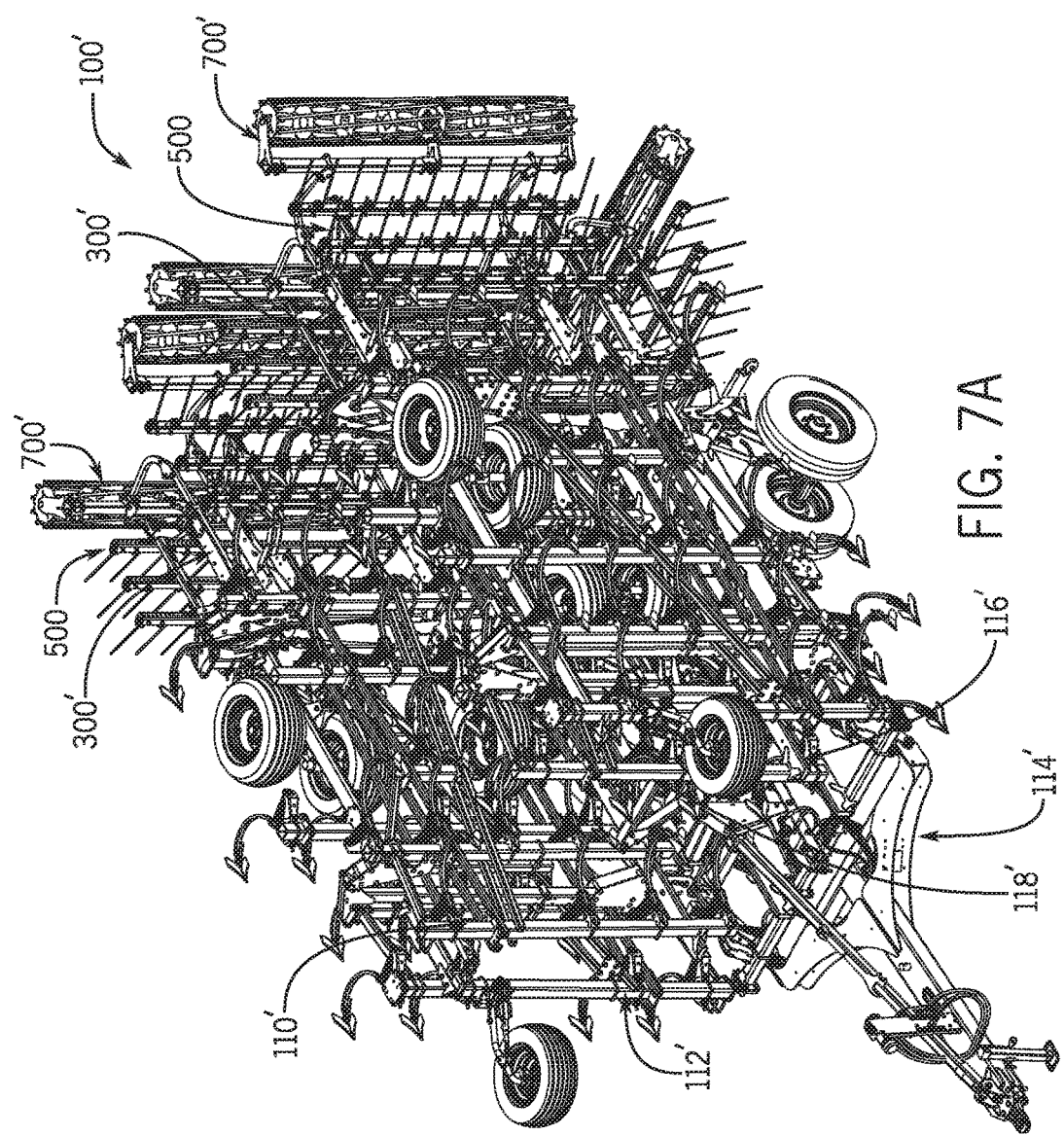
Figure 8A:
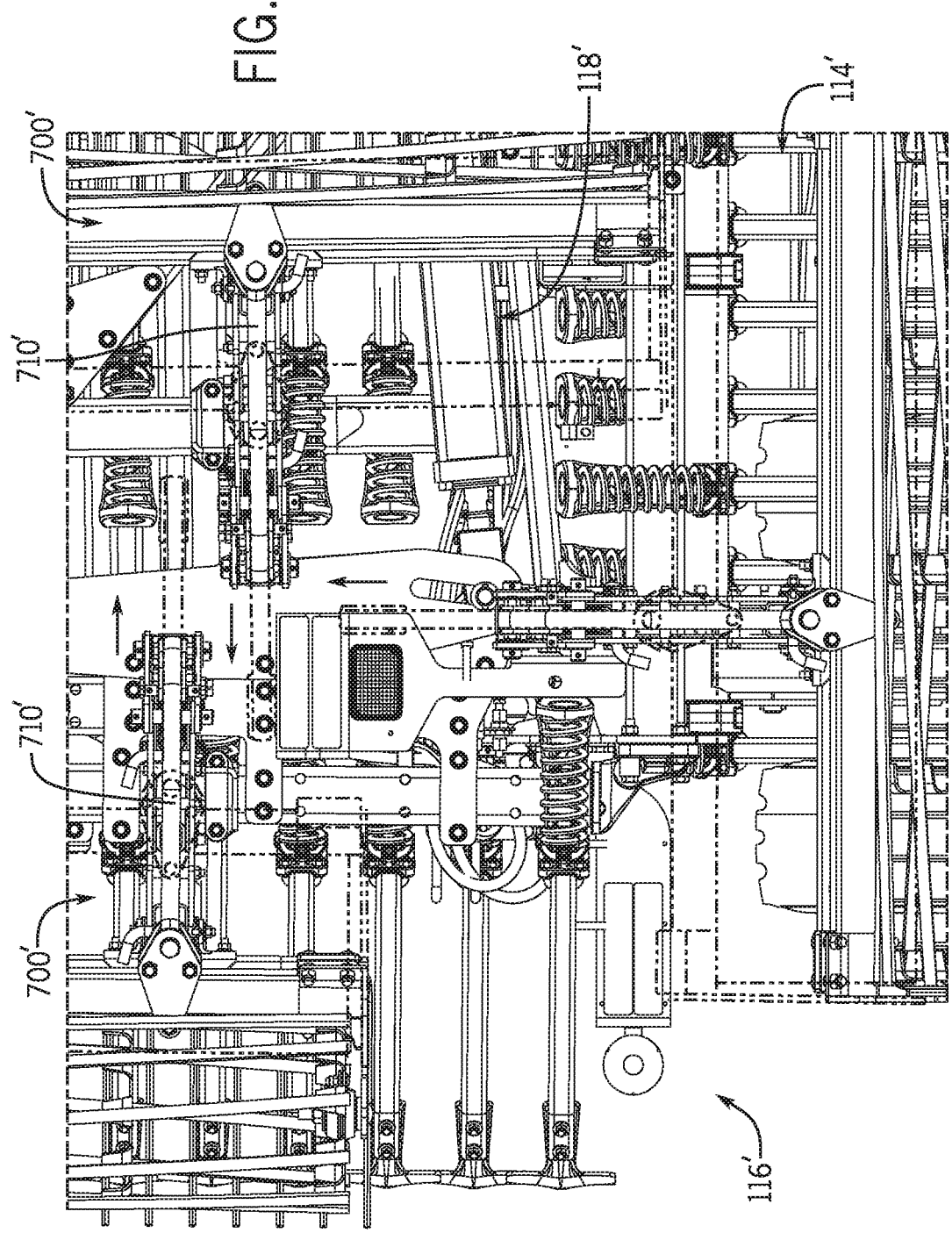
Figure 9:
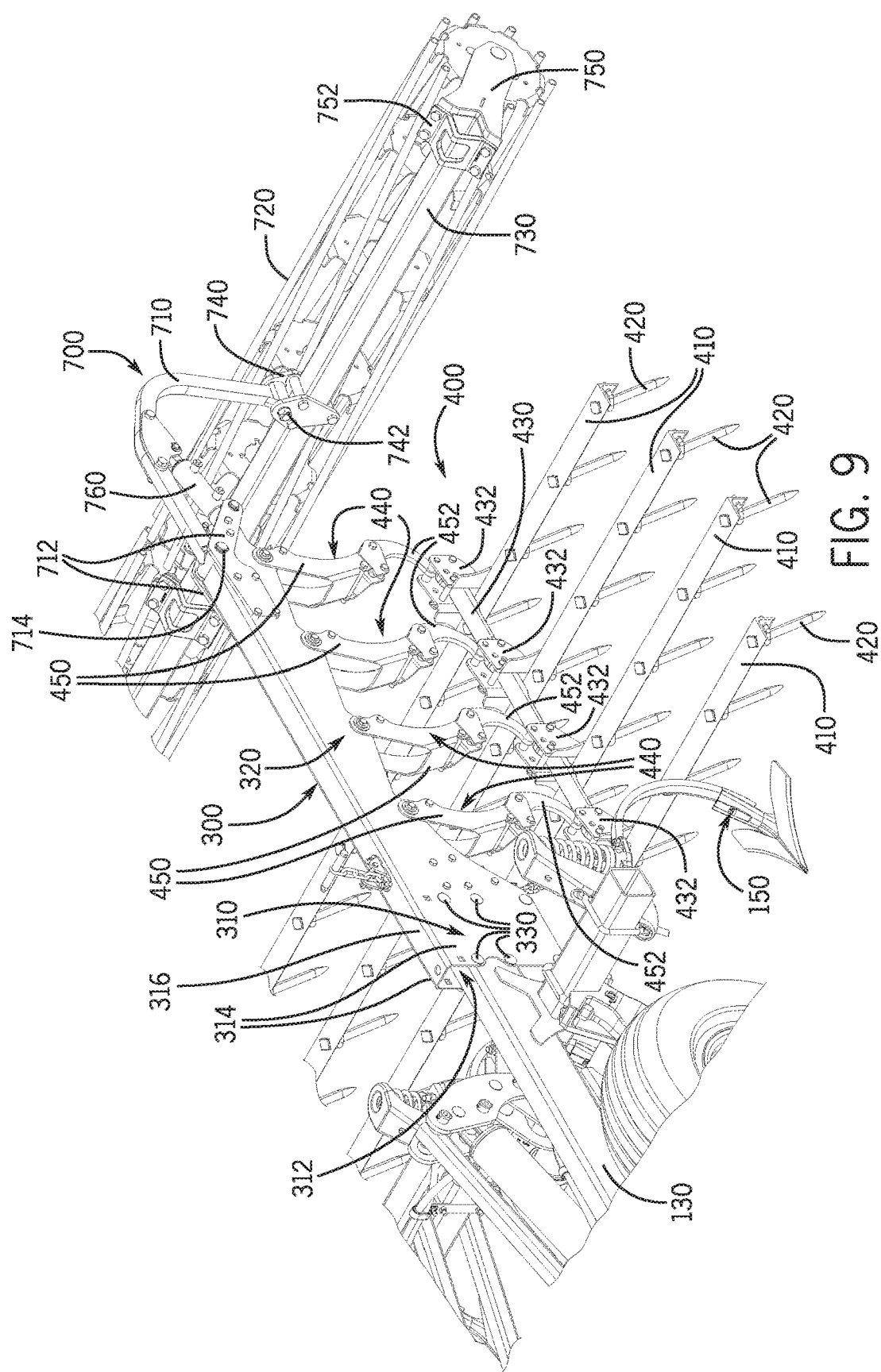
FIGS. 9 and 9A are enlarged partial perspective views showing areas 9-9 and 9A-9A of FIGS. 1 and 1A, respectively.
Figure 9A:
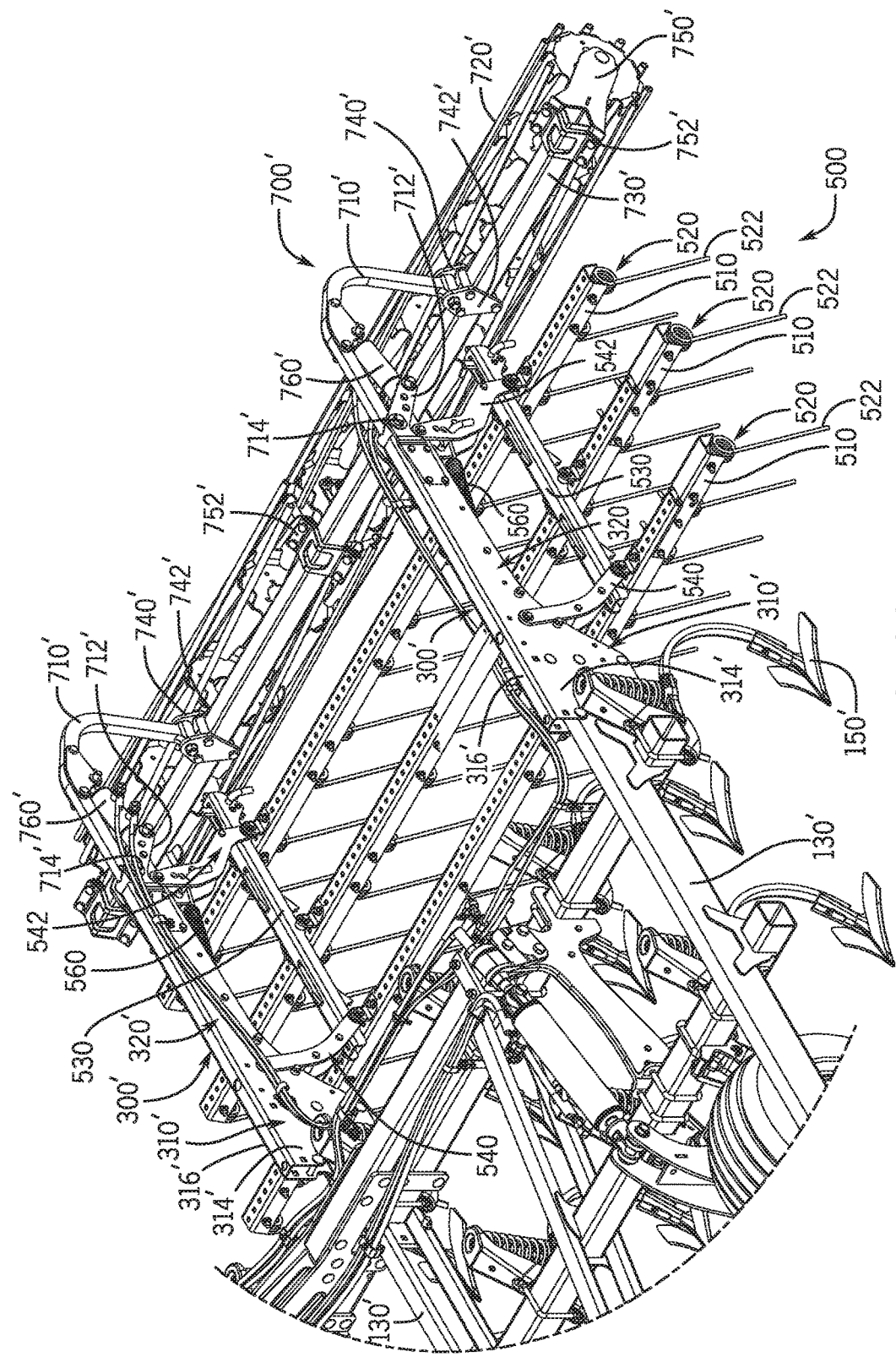
Figure 10:
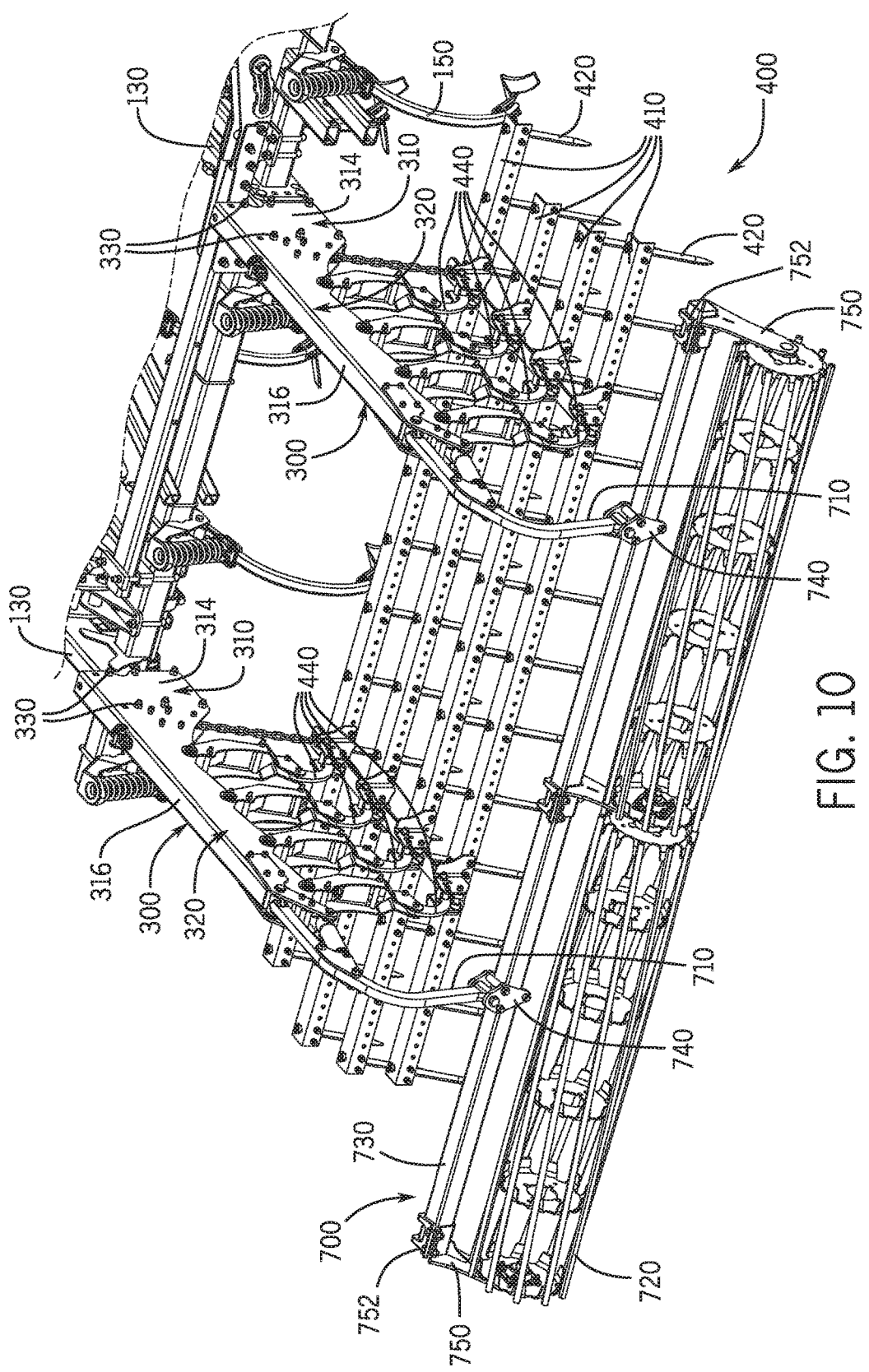
FIGS. 10 and 10A are respective enlarged partial rear perspective views thereof.
Figure 10A:
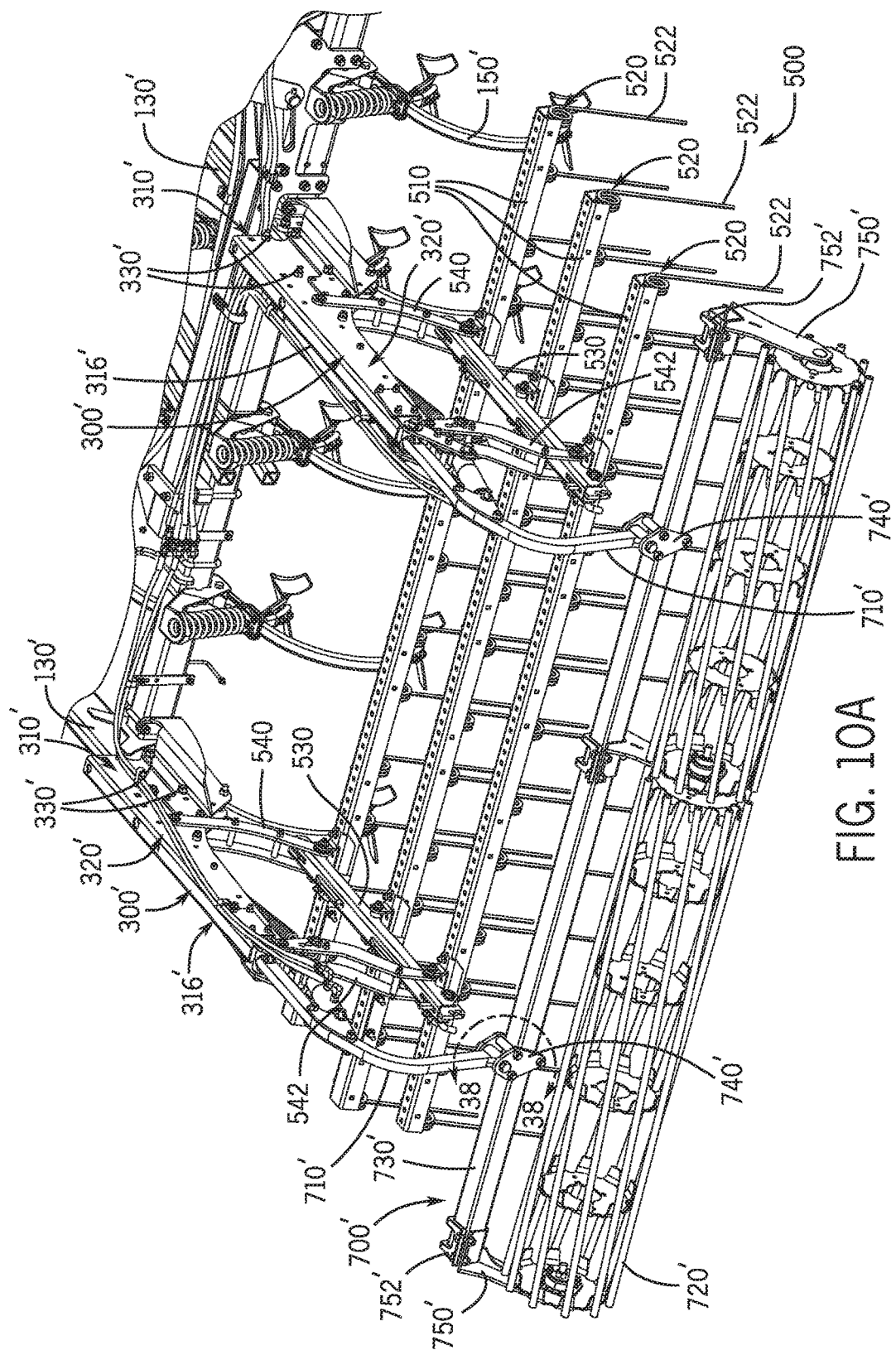
Figure 11A:
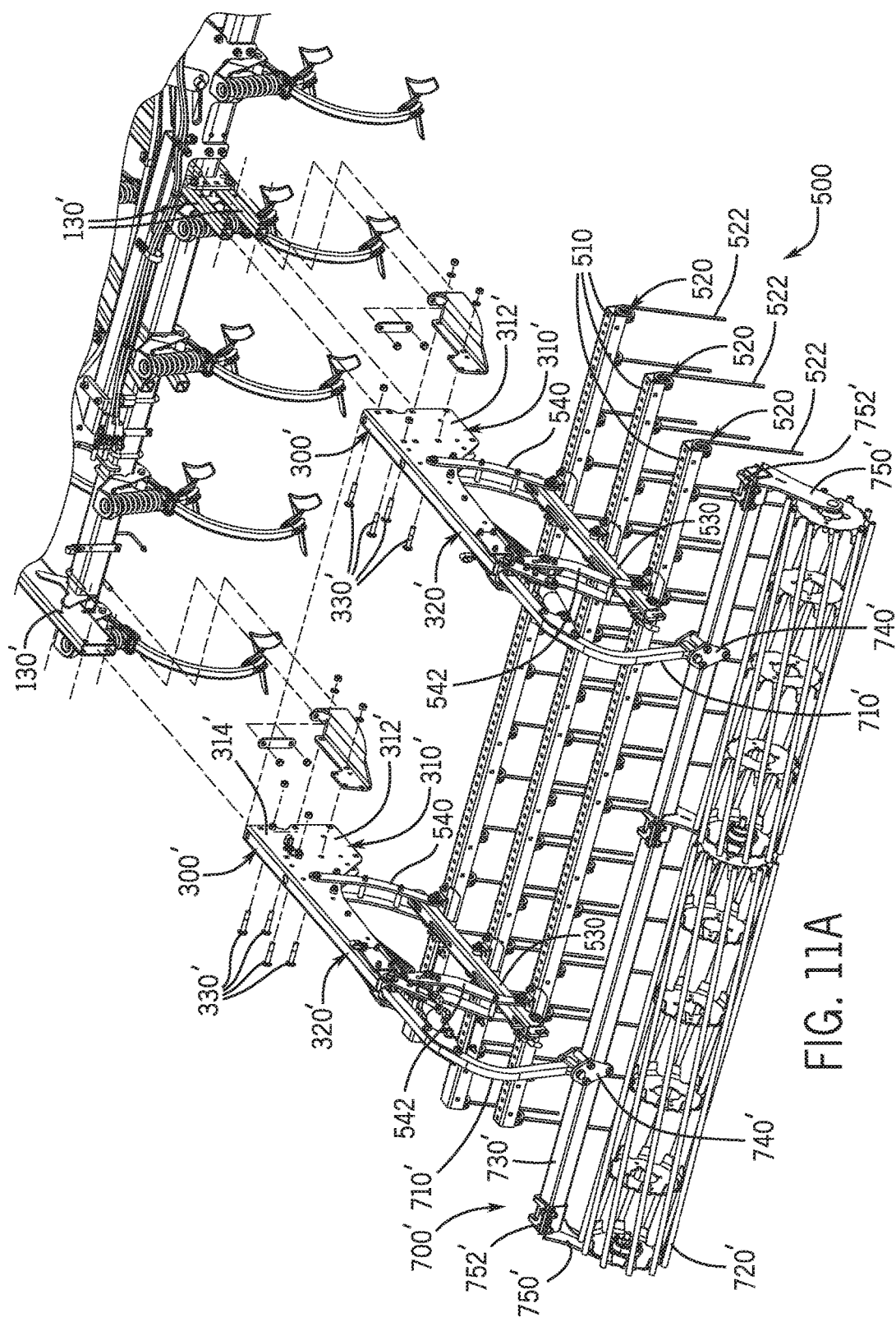

The frame sections 110-118 each have a number of frame members, such as hollow metal or non-metal tubes or beams (e.g., 2×6 or 2×8 beams, or pairs of 2×2 beams). The frame members may be interconnected to provide a lattice-like framework to which an array of tillage tools and other components may be mounted. In the examples, the frame sections 110-118 include both laterally-spaced fore-aft frame members 130 and fore-aft spaced lateral frame members 132 (only a few of which are labeled in FIGS. 1 and 2 for clarity), which are bolted, welded or otherwise interconnected in the manner illustrated. The frame sections 110-118 may assume various other forms and may have other constructions in other embodiments, provided that the frame sections 110-118 enable the below-described tillage tools and attachments to be mounted at selected locations across the TI 100. The TI 100 may also include various other components mounted to the frame sections 110-118 at selected locations to facilitate towing of the TI 100, to automate movement of the TI 100 between folded and unfolded states, or to provide other functions. Such components may include a tow hitch 140 projecting from the main frame section 114 in a forward direction, a number of ground-engaging wheels 142 (only a few of which are labeled in FIGS. 1 and 2 for clarity), and an actuation system 144 (e.g., controllers, hydraulic cylinders, and associated plumbing) for transitioning the TI 100 between its unfolded operational state (FIGS. 1-4) and its folded transport state (FIGS. 6 and 7).

Figure 1A:
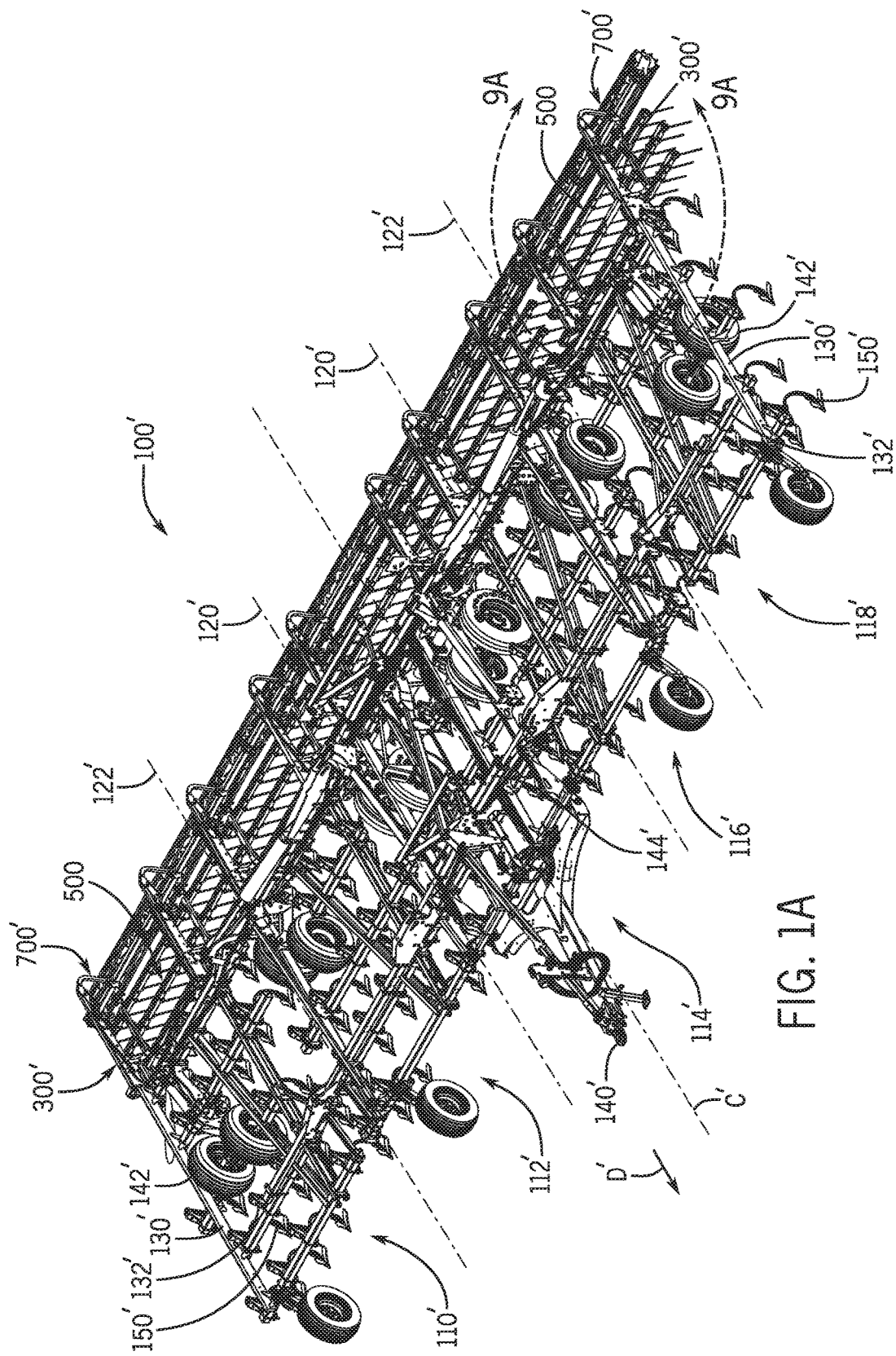
Figure 2:
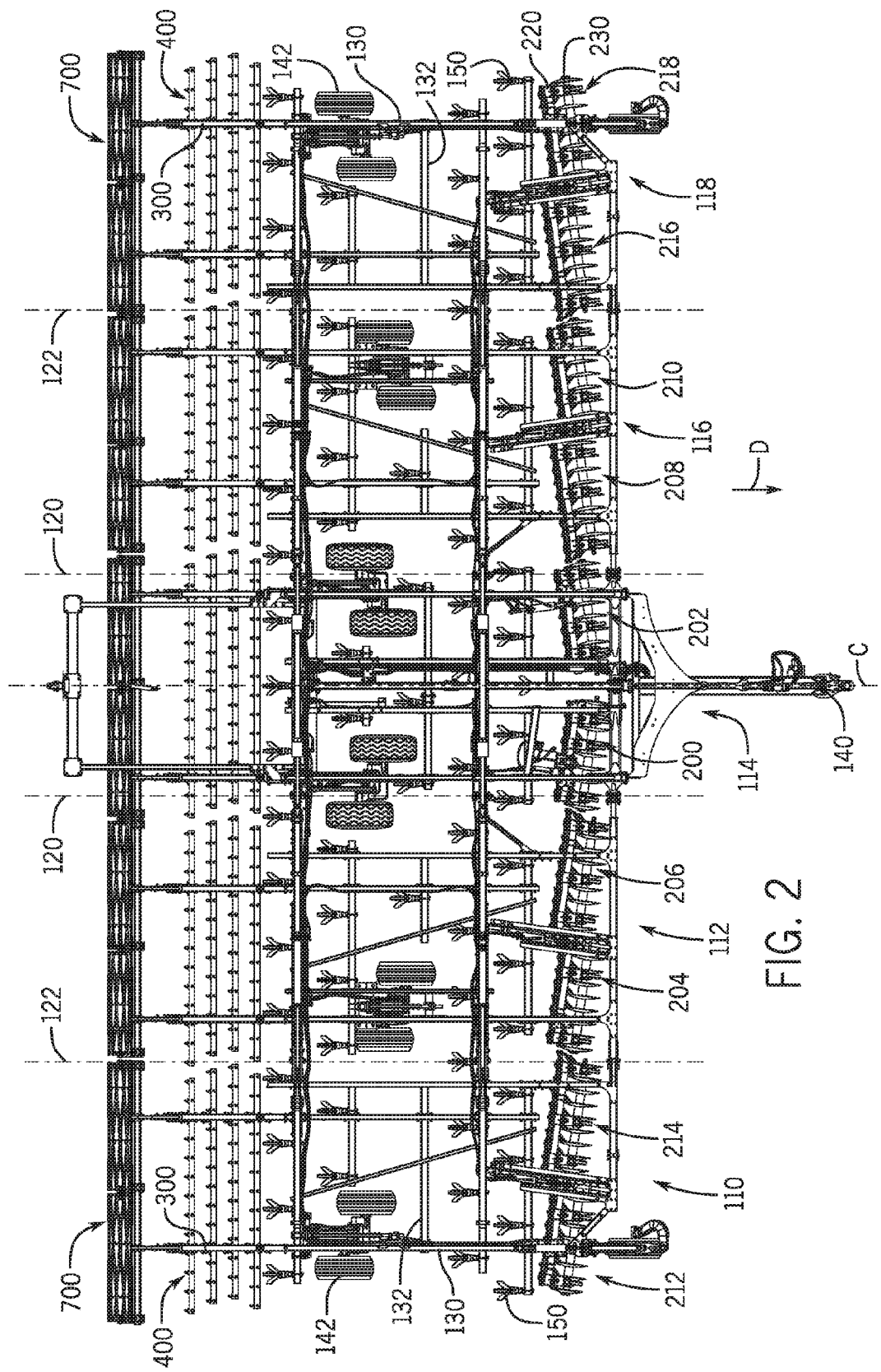
Figure 3:
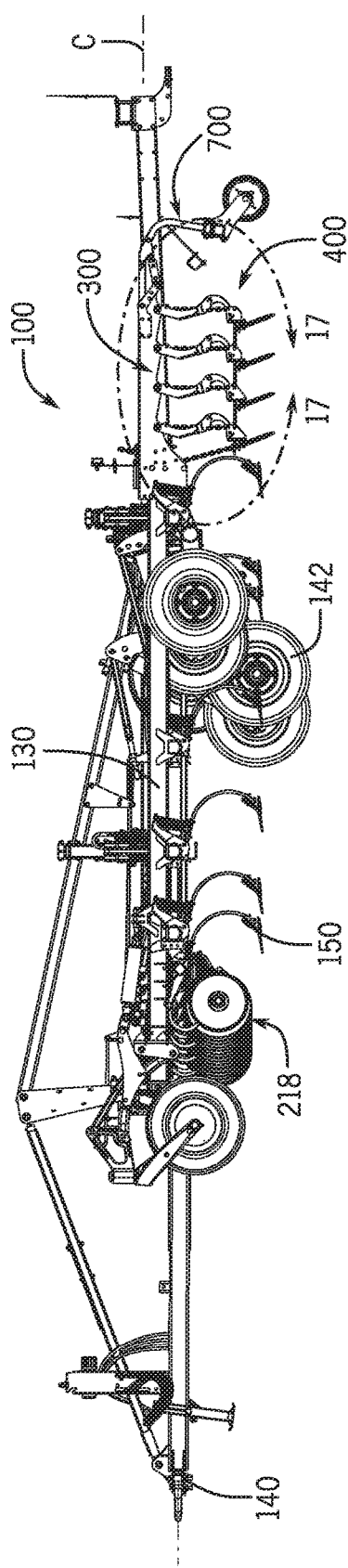
FIGS. 3 and 3A are respective side views of thereof.
Figure 3A:
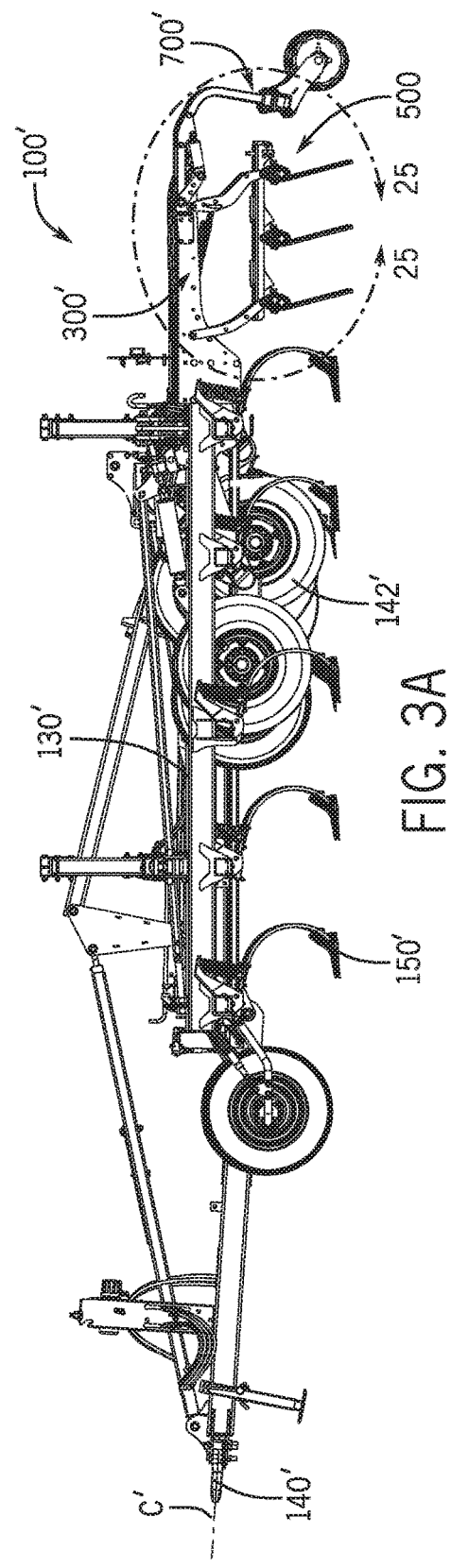
Figure 4:
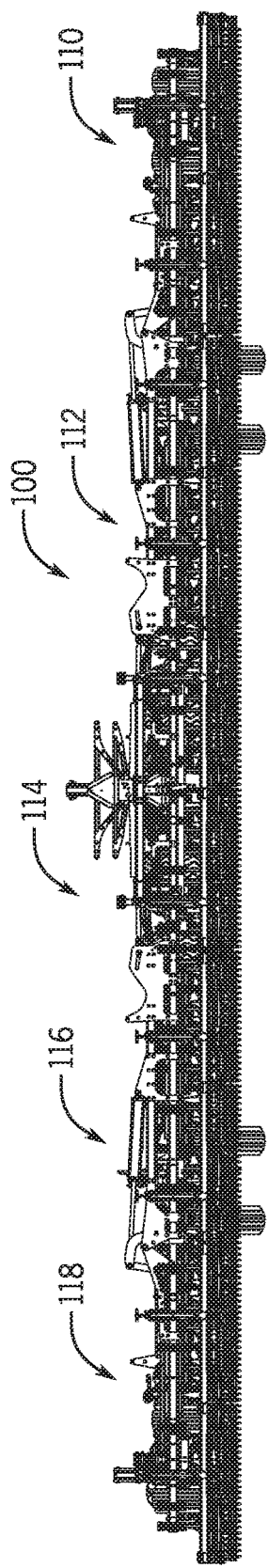
FIGS. 4 and 4A are respective rear views thereof.
Figure 4A:
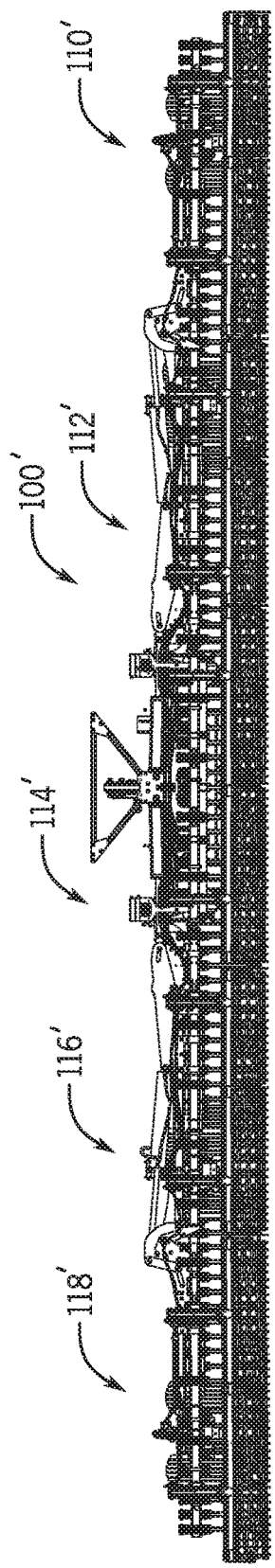

The TI 100 is equipped with a plurality of ground-engaging tillage tools 150, such as "standards" (only a few of which are labeled in FIGS. 1 and 2 for clarity). The tillage tools 150 may be mounted to the frame sections 110-118 in a strategically-chosen spatial formation or array, with each tool mounted at a particular location dictated by a prescribed tool placement pattern. Such a prescribed tool placement pattern may be determined based upon any number of design parameters and other factors, such as a desired furrow row spacing. In the illustrated example, the tillage tools 150 are positioned in a so-called "staggered split the middle pattern;" however, in other embodiments, the tillage tools 150 may be positioned in accordance with various other tool placement patterns or spatial arrays, as tailored to suit different applications and implement designs.

Adherence to the prescribed tool placement pattern may directly affect the performance of the TI 100 (e.g., residue flow and ground smoothing). Adherence to the prescribed tool placement pattern may be disrupted, however, when various components of the implement (e.g., wheels, frame joints, other tools) coincide with one or more of the prescribed tool-mount locations. In such instances, the TI 100 may be designed with larger frame sections, particularly in the fore-aft dimension, to maintain the tool pattern while accommodating the other components, or to relocate certain of the tools, thereby disrupting the tool pattern. As noted, disrupting the tool pattern may have an adverse effect on performance, and the ability to change section dimensions may be limited, (e.g., upper transport width limit), or even if not, changing section dimensions may impact FGW capabilities. Aspects of the disclosure may be incorporated into the TI 100 to permit strict adherence to the prescribed tool placement pattern, while maintaining the lateral width (or "hinge-to-hinge" dimension) of the main frame section 114. In this manner, the TI 100 may be imparted with a relatively broad wingspan when in an unfolded operational state and with a sufficiently narrow width in the folded transport state as well as a reduced fore-aft dimension ("frame depth") for better ground-following during operation, all without deviation from the prescribed tool placement configuration.

First, with reference to FIGS. 1, 2, and 12-16, an intra-wing offset tool mounting configuration will now be described. The example TI 100 has a forward tool arrangement mounted in gangs at the leading sides of the frame sections 110-118. The principles of the intra-wing offset mounting arrangement aspect of the disclosure are generally applicable to gang mounting any type of tools, for example, in the illustrated embodiment the TI 100 has gangs of rotating cultivator disks. Moreover, the principles of the intra-wing offset mounting arrangement may apply to implements in which the gangs are mounted either in a forwardly or rearwardly angled orientation with respect to the direction of travel D, such as the rearwardly angled orientation illustrated with respect to the TI 100. Further, it should be noted that adjacent ends of adjacent gangs, intra-wing and/or inter-wing, may be spaced apart in the lateral direction, or they may overlap in the lateral direction, such that the outer end of an inner gang may be in front of or behind the inner end of an outer gang. Thus, whether angled forward or rearward, overlapping or spaced apart, each frame section 110-118, in particular the wing sections 110, 112, 116, 118, has multiple gangs of shorter length than the lateral dimension of the associated frame section and are arranged so that, at least within a given frame, their lengths are offset from one another in the direction of travel D.

Specifically, the main frame section 114 has two disk gangs 200 and 202, the inner wing sections 112, 116 each have two disk gangs 204, 206 and 208, 210, respectively, and the outer wing sections 110, 118 each have disk gangs 212, 214 and 216, 218, respectively. Each disk gang may have a rockshaft 220 (only a few of which are labeled) mounted to one of the frame members 130, 132 of the associated frame section 110-118. The rockshafts 220 are mounted, as described below, to pivot with respect to the frame sections 110-118 to raise and lower the disks 230. Each disk 230 (only a few of which are labeled) of the disk gangs is mounted to rotate with respect to the rockshaft 220 (e.g., view a shank-mounted bearing assembly) when engaged with the ground and the TI 100 is moving in the direction of travel D.

Figure 12:
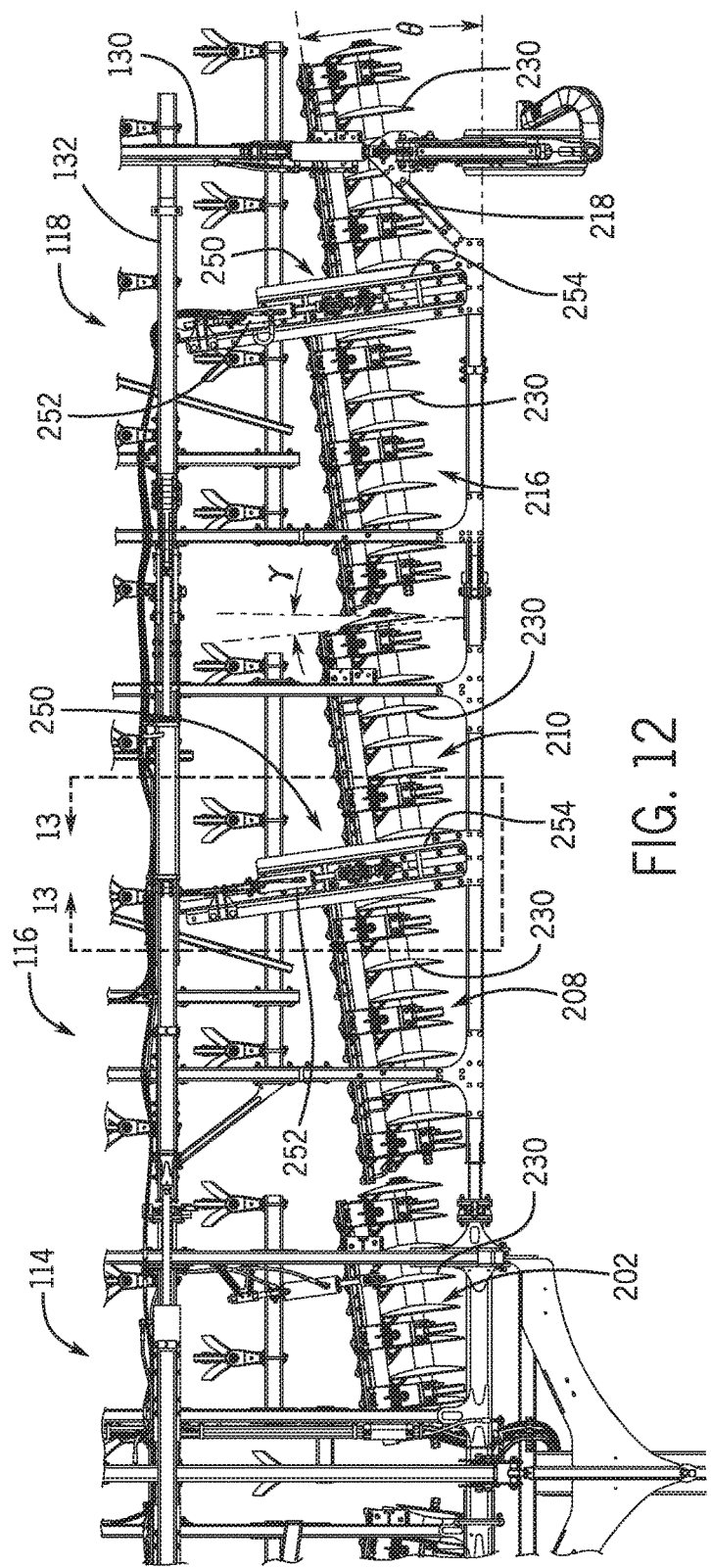
FIG. 12 is a partial top view showing an example offset disk gang arrangement of the mulch finisher of FIG. 1.
Figure 13:
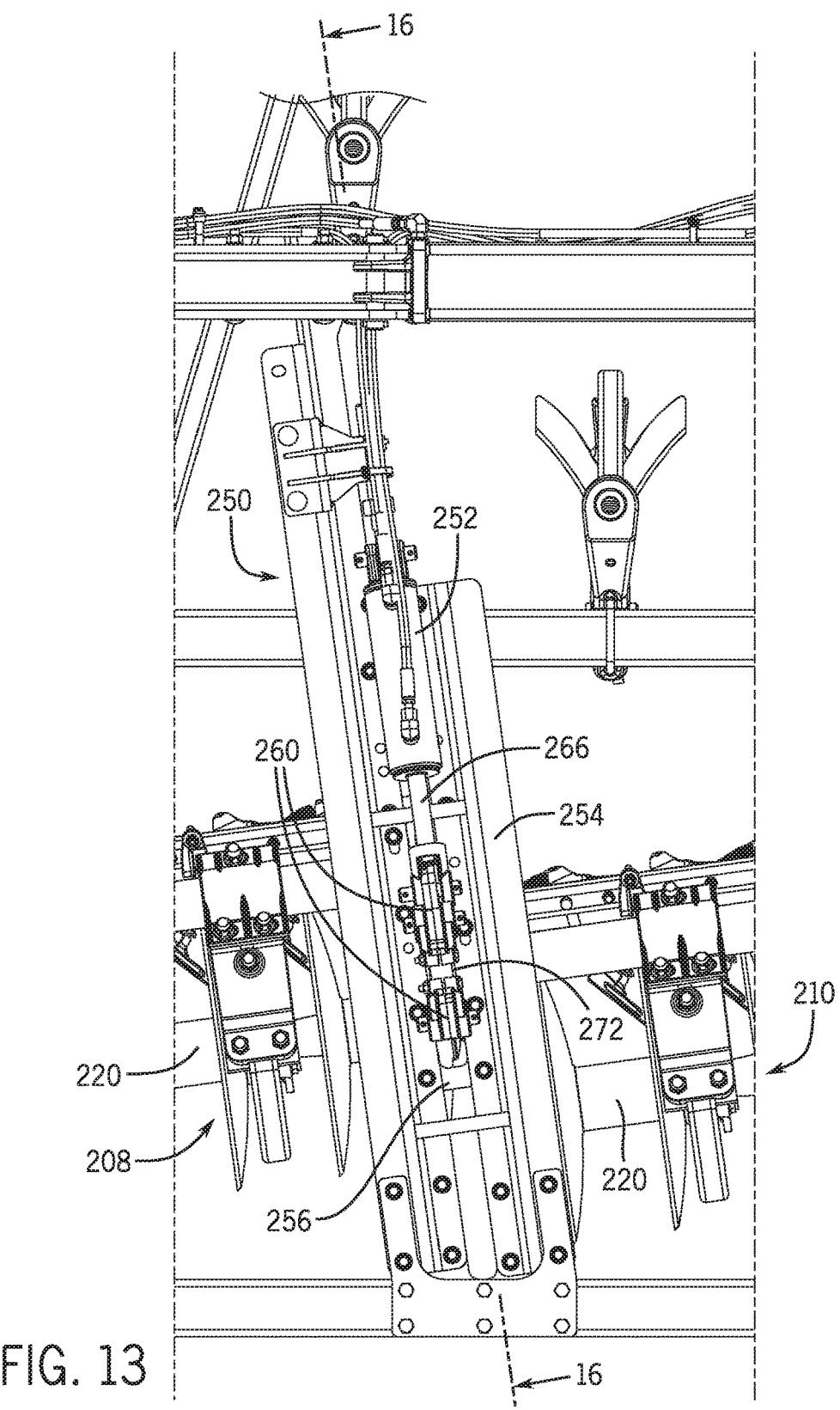
FIG. 13 is an enlarged partial top view showing area 13-13 of FIG. 12.
Figure 14:
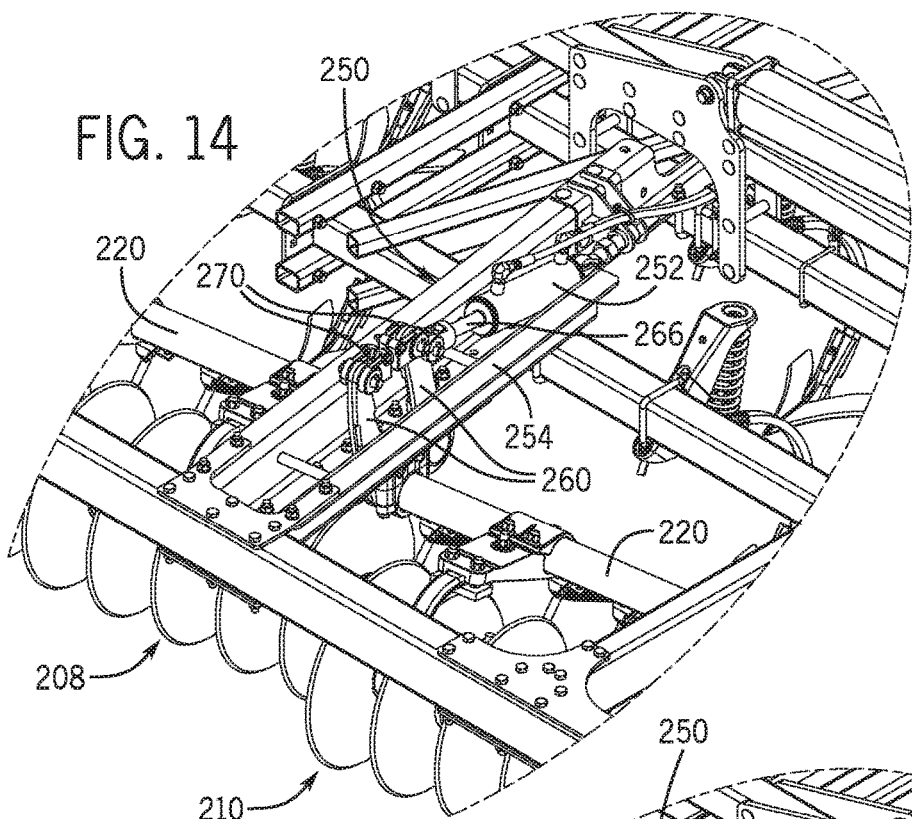
FIGS. 14 and 15 are enlarged partial perspective views thereof.
Figure 15:
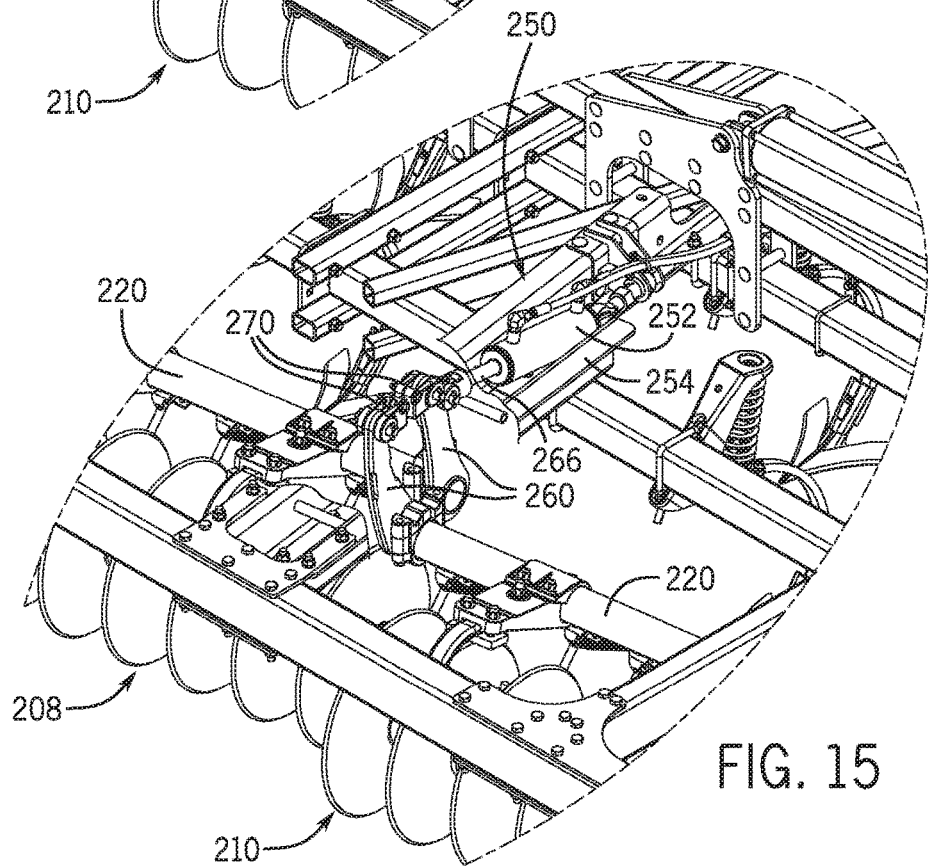
Figure 16:
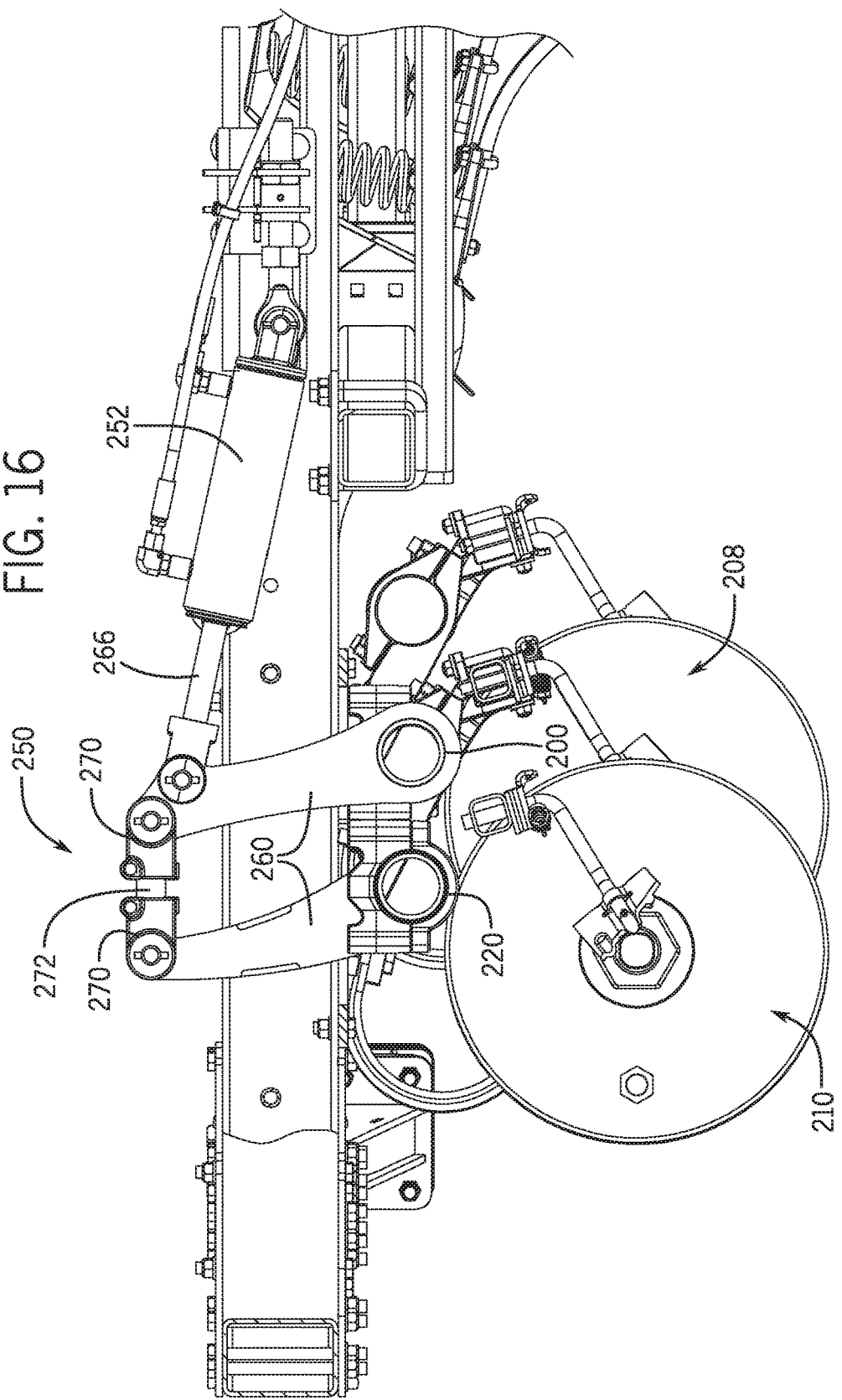
FIG. 16 is a side sectional view taken along line 16-16 of FIG. 13.
Figure 17:
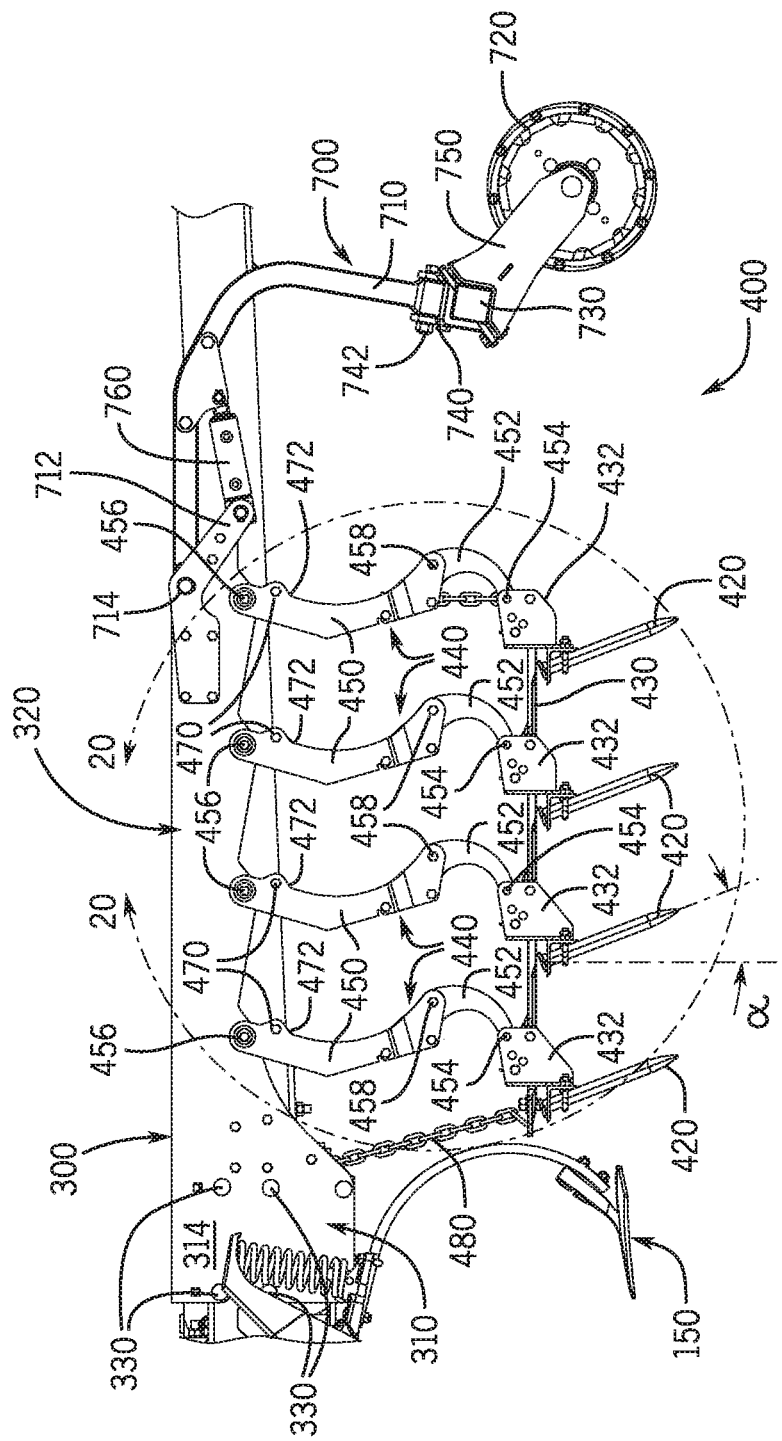
FIGS. 17-19 are partial side views showing an example spike harrow assembly of the mulch finisher of FIG. 1 in various positions.
Figure 18:
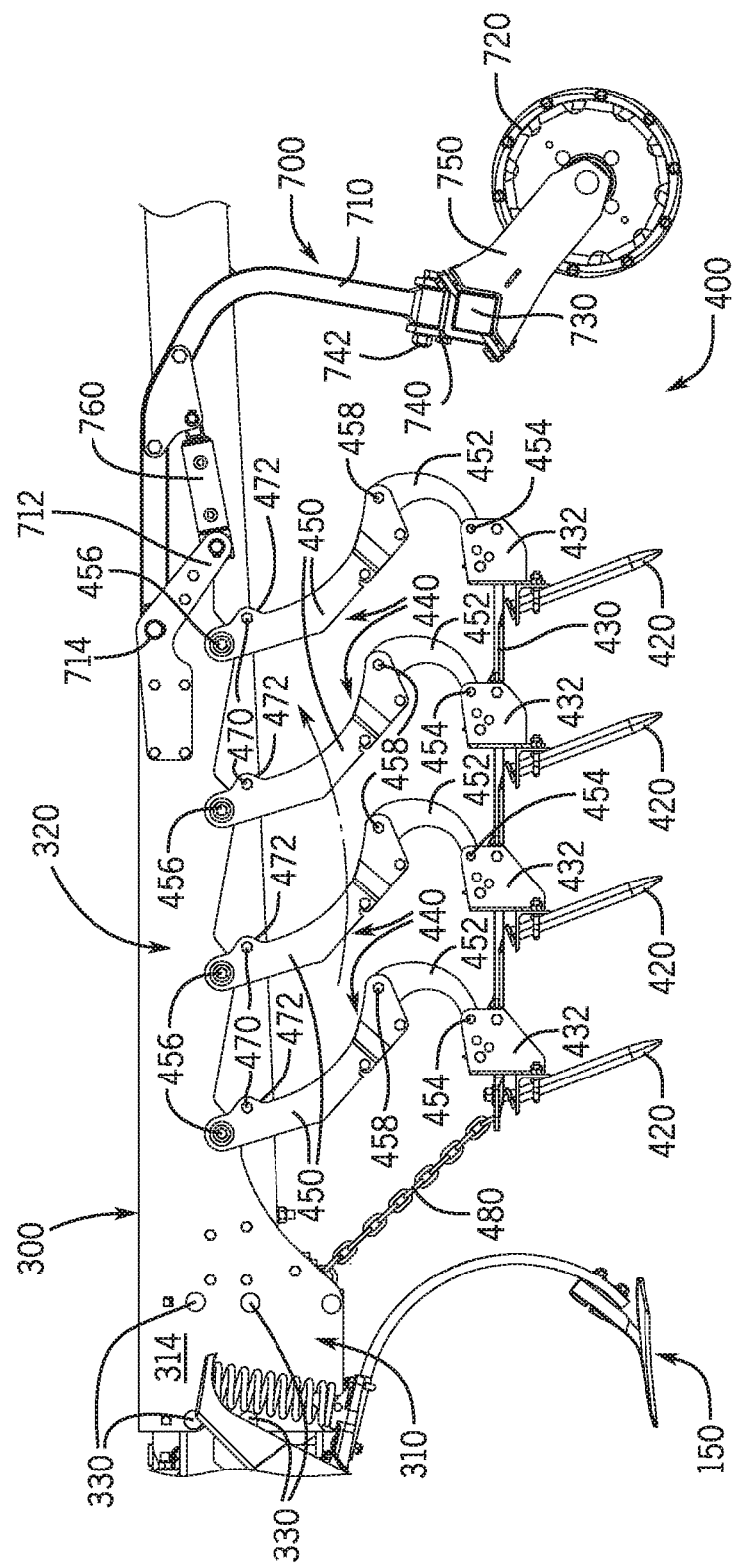
Figure 19:
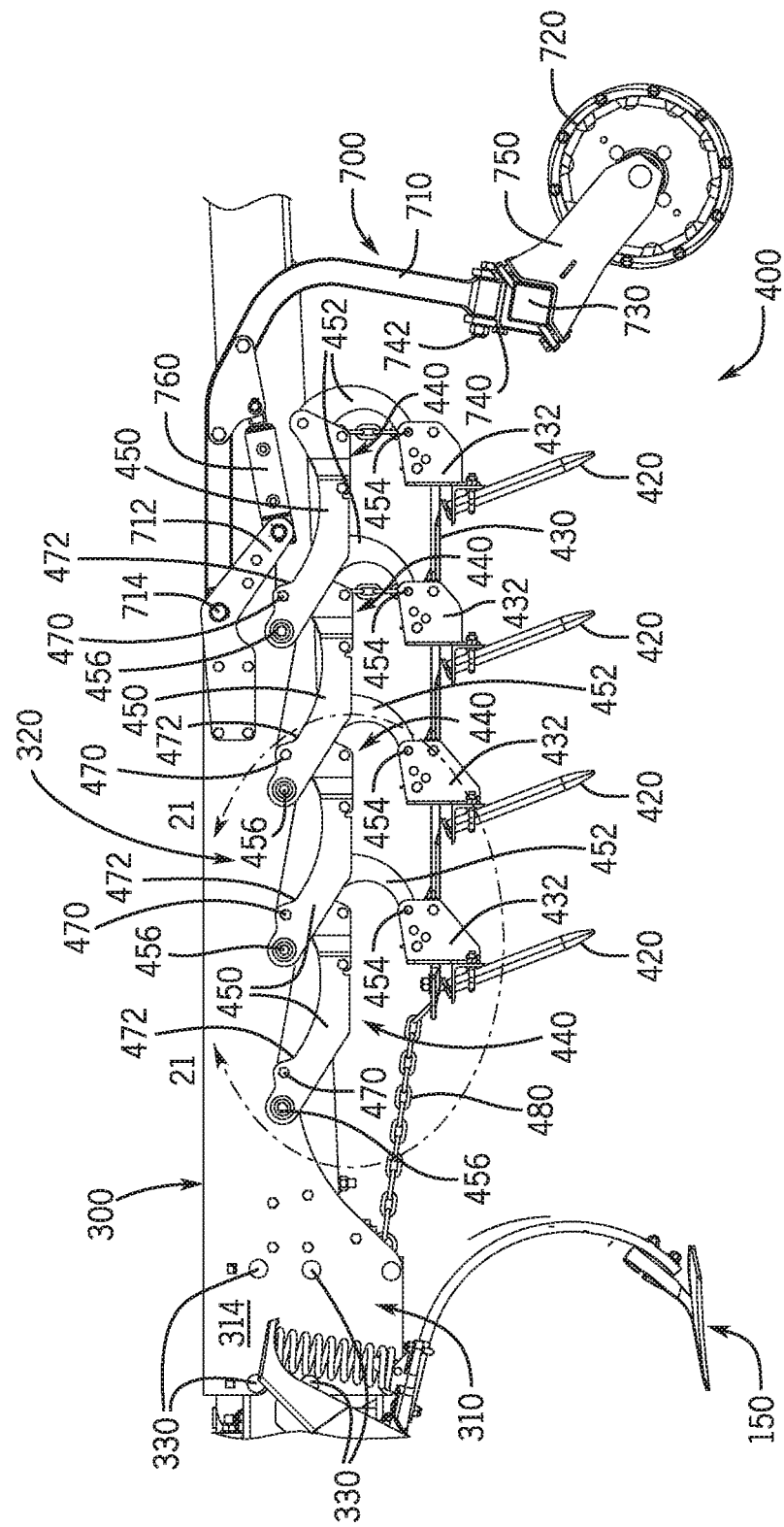

As can be seen in the top views of FIGS. 2 and 12, the disk gangs are mounted in an angularly offset arrangement in which ends of each disk gang are at different positions in the fore-aft direction, and each disk gang is at a different mounting location on a given side of the fore-aft centerline C. In the illustrated example, the disk gangs are arranged across the TI 100 in a mirrored orientation with respect to the centerline C to cascade rearward in the same or a similar manner at the same or similar fore-aft and lateral positons on each lateral side of the TI 100.

In particular, in the illustrated example, the disk gangs 200, 202 are mounted to the main frame section 114 in mirrored orientations so that the inner ends of the disk gangs 200, 202 are forward of their outer ends. The disk gangs 200, 202 (and the others) are shorter than the lateral dimension of the associated frame section. Apart from the space savings detailed below, using shorter disk gangs allows for certain components to be smaller (e.g., the lengthwise bolts securing the disks laterally), and thus less costly. The disk gangs 200, 202 each may be of the same or similar length, which may be a length sufficient to extend in a lateral distance from the centerline C to the outer edges of the main frame section 114. In other words, in the illustrated example in which there are two gangs per section, each gang may have a length or extend in the lateral direction roughly equivalent to one half of the lateral dimension of its associated frame section. When the frame sections 110-118 have the same or similar lateral dimensions, such as in the illustrated example, the gangs may all be the same length and oriented at the same or similar offset angles. It should be understood that more than two gangs may be included in each section and that one or more of the gangs may be of a different length, or at a different angular orientation, than the others.

Continuing, the disk gangs 204, 206, 208, 210 of the two inner wing sections 112, 116 may be mounted so that the inner end of each disk gang is forward of its outer end. In particular, the inner wing inner disk gangs 204, 208 are mounted to the associated inner wing section 112, 116 so that the inner ends are outside, and slightly forward, of the outer ends of the main frame disk gangs 200, 202, respectively. The inner wing outer disk gangs 204, 210 are mounted to the associated inner wing section 112, 116 so that their inner ends are slightly outside, and slightly forward, of the outer ends of the inner wing inner disk gangs 206, 208, respectively. In a similar manner, the disk gangs 212, 214, 216, 218 of the two outer wing sections 110, 118 may be mounted so that the inner end of each disk gang is forward of its outer end. In particular, the outer wing inner disk gangs 214, 216 are mounted to the associated outer wing section 110, 118 so that the inner ends are slightly outside, and slightly forward, of the outer ends of the inner wing outer disk gangs 204, 210, respectively. The outer wing outer disk gangs 212, 218 are mounted to the associated outer wing section 110, 118 so that their inner ends are slightly outside, and slightly forward, of the outer ends of the outer wing inner disk gangs 214, 216, respectively.

By way of example, the 56-foot mulch finisher example of the TI 100 illustrated in FIG. 1 has five sections, and as shown in FIG. 12, the disk gangs are oriented angularly offset from the lateral direction by an angle θ of about eight degrees to provide a steer angle γ suitable for ground-working of about eight degrees. In the example embodiment, shortening and offsetting the gangs within each frame section may reduce the fore-aft distance occupied by the gangs by approximately seven inches per offset, or about 28 inches overall in the twin gang, five section implement shown. This represents a reduction in frame depth, and the fore-aft frame members 130, of about 14 inches compared to implements with a single gang per frame section. The frame depth reduction improves the FGW capabilities of the implement, while maintaining the prescribed tool placement pattern.

Further, the noted gain in FGW capability may be achieved without extra space requirements, complexity, weight or cost being added to the implement. For example, each pair of disk gangs on the frame sections 110-118 may be actuated using a single actuator. The TI 100 may have an actuator assembly 250 mounted to each frame section 110-118 to raise and lower both of the associated disk gangs simultaneously. This not only reduces part-count, cost and weight, but it also ensures that both disk gangs in each pair are positioned uniformly with respect to the frame, and thereby the ground (i.e., the same penetration depth), or in other words are "leveled" with respect to one another. It should be noted that, if desired, the disk gangs may be clocked differently so that the actuator assembly 250 may position the associated disk gangs at different heights (or penetration depths). Moreover, separate actuators for each disk gang could be provided if space, cost and weight are not of concern.

In particular, each actuator assembly 250 may include an actuator 252 operatively coupled to the actuation system 144, which in this case may be a dual-acting hydraulic cylinder. As will be understood, the hydraulic cylinder may be coupled, via various hydraulic fluid carrying plumbing lines, to a hydraulic pump on board the towing vehicle. Also on board the towing vehicle may be one or more controllers having processors and memory architecture for controlling the position of various electro-hydraulic valves, which may be connected to the controller(s) directly or by a suitable bus and which control the extension and/or the retraction of the cylinder piston. As noted, the hydraulic cylinder may be a dual-acting cylinder that may be driven to extend and retract.

The actuator 252 may be mounted to the associated frame section at the same or a similar angle as the steer angle γ of the disk gangs by a cylinder anchor 254. The cylinder anchor 254 may have a slot 256 or other opening through which pivot arms 260 may extend. The pivot arms 260 may each be coupled to an end of one of the rockshafts 220 of the pair of disk gangs, the rockshafts 220 being suitably mounted (e.g., via bearings, pillow blocks, etc.) to the disk gangs so as to rotate with respect to the frame section. Extending and retracting a piston 266 of the actuator 252 will pivot the pivot arms 260 to pivot the rockshafts 220, and thereby raise and lower the disks 230 of the disk gangs. The ends of the rockshafts 220 may extend far enough laterally so that the pivot arms 260 may fall along the stroke axis of the actuator 252. The upper ends of the pivot arms 260 may have suitable connections, such as clevises 270, for coupling to the actuator 252. Specifically, the clevis 270 of one of the pivot arms 260 may connect directly to the piston 266 of the actuator 252 and to a tie rod 272 coupling the devises 270 together. The tie rod 272 may be adjustable, such as in the form of a turn-buckle threaded at each end, so that the relative angular orientation of the pivot arms 260 may be varied. The turn-buckle tie rod 272 provides a simple and quick mechanism for adjusting the level of the disks in the gang-pair relative to the frame (and the ground), and thus to the disks 230 of gang-pairs of other frame sections. This mechanism also allows the gang-pairs to be clocked differently, if desired, so that the disks 230 of one disk gang in the pair may have a different height (or penetration depth) than the disks 230 of the other disk gang in the pair.

Other aspects of the disclosure facilitate the TI 100 to assume a tight, compact folded configuration with reduced or no incidents of binding or obstructing while folding and unfolding the wing sections. Referring now to FIGS. 1-2 and 9-11, the TI 100 may have an improved configuration for mounting various attachments at the rear of the implement, including finishing attachments such as various harrow assemblies and roller baskets. More specifically, the TI 100 may have dedicated locations at which the finishing attachments are to be mounted to the frame sections 110-118 so that the finishing attachments fall within the pre-defined space envelopment intended during design and manufacturing. Unlike conventional systems that allow the finishing attachments to be mounted anywhere along the rear lateral frame member using a U-bolt or other tube clamp fastener, the TI 100 has the finishing attachment mounted to the fore-aft frame members 130, such that their lateral position is fixed. This keeps the gross positioning of the finishing attachments in predetermined locations so as to allow folding in a tight fold configuration without binding. As shown in FIGS. 5-7, the TI 100 may fold so that the outer wing sections 110,118 may fold inward about hinge lines 122 on top of the inner wing sections 112, 116, respectively, approximately 180 degrees (FIG. 5). The inner wing sections 112, 116, and the folded outer wing sections 110, 118, then may fold inward about hinge lines 120 approximately 90 degrees (FIG. 6) so that the inner and outer wing sections are near perpendicular to the main frame section 114.

In the illustrated examples, this location fixing functionality is achieved in part due to the mounting technique employed and the unique configuration of the mounting interface. In particular, the finishing attachments attach using drawbars 300 (only some of which are labeled) mounted to the rearward ends of one or more (or all) of the fore-aft frame members 130. The drawbars 300 may thus become an integral part, or extension of, the fore-aft frame members 130. The drawbars 300 may be the same, and each drawbar 300 may form a channel portion, or include a saddle 310 generally having an inverted U-shaped configuration defining a channel 312 opening at a lower side of the drawbar 300 sized to receive the thickness (i.e., lateral) dimension of the associated fore-aft frame member 130. The channel 312 may be located at a forward end of the drawbar 300 or may run the full length of the drawbar 300, as shown. The saddle 310 has long sides 314 that fit along the transverse (i.e., vertical width) dimension of the fore-aft frame member 130 so that the saddle 310 overlaps the top and sides of the frame member. The sides 314 may be over-sized for certain frame members so that they may be used with other wider frame members. Thus, as shown, an upper wall 316 of the saddle 310, and in certain embodiments the entire drawbar 300, may be spaced from (above) the upper wall of the frame member. Alternatively, or when the drawbars 300 are used with larger frame members (e.g., 8-inch rather than 6-inch frame members), the upper wall 316 of the saddle 310 may rest on the top of the frame member.

The drawbars 300 are mounted in cantilever fashion to the ends of the fore-aft members 130 so that an elongated support arm 320 extends rearward beyond the rearward ends of the frame members 130. In this way, the various components of the attachments may depend down from the drawbars 300 without interfering with the frame members 130, 132 or other components of the TI 100, as will be described below. The drawbars 300 may be mounted to the fore-aft frame members 130 by any suitable mechanical connection (e.g., welds, rivets, bolts, or other fasteners). For example, bolts 330 may be inserted into one or more sets of aligned openings in the sides 314 of the saddle 310 and the fore-aft frame member 130. In the examples, the long dimensions of the bolts 330 will extend in the lateral dimension transverse to the direction of travel D, which will subject the bolts 330 to shear forces rather than bending or other loading during operation of the TI 100. Shear loading provides an effectively stronger connection in that it will not tend to bend the bolts 330 from use.

As explained, the drawbars 300, including the saddle 310 and support arm 320 portions thereof, may be mounted to the TI 100 only at predetermined positions, including fore-aft and lateral locations at the rear of the implement. The drawbars 300 may be mounted so that their long dimensions extend in precise or close alignment with the fore-aft frame members 130. It should be understood that in other embodiments the drawbars may be configured so that extending portions thereof (e.g., the support arms) extend in a fore-aft direction that is parallel to, but offset from, the fore-aft frame members 130. Alternatively or additionally, the drawbars may be configured so that one or more extending portions (e.g., the support arms) are at an oblique or perpendicular angle to the fore-aft direction.

Various aspects of the disclosed finishing attachments will now be discussed. First, aspects of a spike harrow attachment 400 will be addressed with regard to the example configuration shown in FIGS. 9-11 (but not FIGS. 9A-11A) and FIGS. 17-24. A spike harrow attachment 400 may be attached to one or more (or all) of the drawbars 300 in all or a subset of the frame sections 110-118. In the example embodiment of FIG. 1 (but not FIG. 1A), the TI 100 has spike harrow attachments with anti-tangle brackets (as will be described) only at the main frame 114 and outer wing 110, 118 sections (the inner wing sections 112, 116 have chains). The anti-tangle features are particularly useful for the outer wing sections 110, 118, which pivot about the hinge lines 122 approximately 180 degrees to a generally inverted orientation (see FIG. 5) during folding and unfolding, and which end up on at the center of the implement (between the inner wing sections) when in the folded configuration (see FIG. 7).

The example spike harrow attachment 400 has a set of ranks of spikes, including four rank bars 410 (e.g., L-channel bar stock) to which are mounted individual spikes 420 (only some of which are labeled) disposed in openings in the rank bars 410 and mounted (e.g., via U-bolts) to be at rearward tilt angle α from an enlarged upper end to a pointed tip. The rank bars 410 are joined together by one or more crossbars, such as crossbar 430, which is connected by mounting brackets 432. The rank bars 410 may be spaced apart the same or different distances in the fore-aft direction, and they may be the same or different lengths and laterally aligned or offset from one another to provide the desired lateral coverage and lateral and fore-aft spike spacing. For example, the spikes 420 may be arranged in a pattern with a generally consistent fore-aft spacing between ranks and a generally consistent lateral spacing within each rank. However, the rank bars 410 may be laterally offset so that the spikes 420 in an immediate rearward rank evenly straddle, and center on, fore-aft reference lines through the spikes 420 of the immediately forward rank. Moreover, the forwardmost rank may be arranged a predetermined fore-aft spacing from the rear row of tillage tools 150, which may be the same as, or differ from, the spacing between ranks, and may be positioned to evenly straddle, and center on, a fore-aft reference line through the associated tillage tool 150.

As mentioned, the ranks of spikes may be mounted to one or more of the drawbars 300. In the example embodiment, the ranks may be mounted to two drawbars 300 each by one or more anti-tangle bracket assemblies 440, such as the four shown in the example embodiment. The anti-tangle bracket assemblies 440 are configured to permit the freedom of movement necessary for the spike harrow attachment 400 to perform as intended during operation, including to allow the full weight of the ranks (and the rest of the assembly) to act upon the ground so that the spikes 420 penetrate the ground, but also to allow the ranks to trip so that the spikes 420 move out of engagement with the ground in the event excessively hard ground or an immovable object is encountered. The anti-tangle bracket assemblies 440 may also permit lateral movement of the ranks relative to the drawbar 300 to aid in residue flow between the spikes 420 and to reduce plugging. However, the lateral movement of the ranks is constrained (e.g., to a few inches toward each lateral side of the TI 100). This constrained lateral movement limits shifting of the spike harrow attachment 400 during folding and unfolding. When the drawbars 300 are mounted to the TI 100 at the predetermined locations, as described above, each spike harrow attachment 400 is located in its pre-defined position and maintained there with little, or possibly even no, shifting during folding and unfolding. By way of example, the example embodiment may allow a lateral movement of 3-6 inches, such that during the folding process and/or when the TI 100 is in the folded transport position, the spike harrow attachment 400 may shift a corresponding distance (e.g., dropping under gravity when the section is oriented near vertical) (see FIG. 24A). This limited shifting is a considerable reduction from the approximately twenty inches or so of shifting possible with conventional hang chain harrow attachments. In this way, the anti-tangle bracket assemblies enhance both aspects of the FGW capabilities of the TI 100.

In particular, each of the example anti-tangle bracket assemblies 440 may have a scissor linkage arrangement with two pivot links 450 and 452. The lower end of the lower pivot link 452 is connected to a pivot pin 454 of the associated mounting bracket 432. The lower pivot link 452 could be coupled directly to the associated mounting bracket 432, or to the crossbar 430 of the associated rank bar 410. The upper end of the upper pivot link 450 is pivotally connected to the drawbar 300. In the example configuration, the upper pivot link 450 has a clevis configuration in which legs of the clevis mount to each side of the drawbar 300 by a pivot pin 456 (e.g., a bolt). The pivot links 450, 452 are pivotally coupled together by a central pivot pin 458. The long dimensions of the pivot pins 454, 456, 458 may be arranged to extend in the lateral direction, and thus realize shear, rather than bending, loads during operation. The four anti-tangle bracket assemblies 440, one for each rank bar 410, may be connected to the drawbar 300 in the same or similar fore-aft spacing at the ranks. Openings for the pivot pins 456 may be formed in integral lobes 460 formed by the short sides of the support arm 320 portion of the drawbar 300. The anti-tangle bracket assemblies 440 thus form a four-bar linkage arrangement with the drawbar 300 and the crossbar 430 so that the spike harrow attachment 400 remains level or otherwise maintains the same pitch and roll orientation during pivotal movement (e.g., tripping) during operation.

The anti-tangle bracket assemblies 440 may further be configured to facilitate fully trip movement of the spike harrow attachment 400. In particular, one link in each pair of pivot links 450, 452 may be longer than the other. In the example embodiment, the upper pivot link 450 is longer than the lower pivot link 452, such as by a ratio of approximately 2-3:1. In the example embodiment, the pivot links 450, 452 are curved with the concavities being in opposite fore-aft orientations (e.g., the upper pivot link is concave rearward and the lower pivot link is concave forward). The presence and shape of the concave surfaces may be configured to avoid interference of the links pivoting from other components or features of the attachment, drawbar or other parts of the TI 100 (e.g., to accommodate an actuator mechanism for a finishing basket attachment). As can be seen from FIGS. 17-19, the pivot links 450, 452 pivot in opposite clock orientations. For example, from the perspective of FIGS. 17-19, the upper pivot link 450 pivots counter-clockwise about pivot pin 456, and the lower pivot link pivots clockwise about the pivot pin 454. The configuration and relative lengths of the pivot links 450, 452 in the example embodiment permit the anti-tangle bracket assemblies 440 to pivot in the fore-aft direction sufficient to pivot rearward from the fully ground-engaging position of FIG. 17, which is at approximately 65 degrees down from horizontal, to the fully tripped position of FIG. 19, which is at approximately 10 degrees down from horizontal. Pivot links of the same length could be used in cases where a lower trip height is acceptable.

The anti-tangle bracket assemblies 440 may have features, such as stop pins 470 in lobes 472 near the upper end of each upper pivot link 450, that cooperate and interfere with features, such as the lobes 460, formed in the sides of the drawbar 300, as shown in FIGS. 20 and 21. A conventional drag chain 480 may be coupled to the drawbar 300 and the spike harrow attachment 400 so that the spikes 420 operate at their desired angle with the weight of the spike harrow attachment 400 on the spikes 420. When drag is set correctly, the anti-tangle bracket assemblies 440 will run partially tripped so that the spikes 420 move up and down to follow the ground.

Aspects of a tine harrow attachment 500 will be now addressed with regard to the example TI 100' shown in FIGS. 9A-11A and FIGS. 25-31. Like the spike harrow attachment, the tine harrow attachment 500 may mount to one or more of the drawbars 300', such as a pair of drawbars of each of the frame sections 110-118. The example tine harrow attachment 500 has a set of ranks of tines, including three rank bars 510 (e.g., C-channel bar stock) to which are mounted tines 520 (only some of which are labeled). Each of the tines 520 may have two elongated rod portions or "teeth" 522 that are spaced apart and connected by a center portion or "staple" 524. Each tine 520 may be an assembly of parts or a monolithic member with coiled areas for flexing at each end of the staple 524. Also, one or more of the tines 520 may have a single tooth. The tines 520 may be mounted to the rank bars 510 using suitable brackets and fasteners to clamp the staples 524 to the rank bars 510. The tines 520 may be mounted to the rank bars 510 to be at a rearward tilt angle α. The rank bars 510 may be joined together by one or more crossbars, such as crossbar 530, which is connected by mounting brackets 532. The rank bars 510 may be spaced apart the same or different distances in the fore-aft direction, and they may be the same or different lengths and laterally aligned or offset from one another to provide the desired lateral coverage and lateral and fore-aft tine spacing. For example, the tines 520 may be the same size (e.g., gauge thickness and/or teeth spacing and length) and may be arranged in a pattern with a generally consistent fore-aft spacing between ranks and a generally consistent lateral spacing within each rank. The rank bars 510 may be laterally offset so that the teeth 522 of the tines 520 in an immediate rearward rank evenly straddle, and center on, fore-aft reference lines through the teeth 522 of the tines 520 of the immediately forward rank. Moreover, the forward-most rank may be arranged a predetermined fore-aft spacing from the rear row of tillage tools 150', which may be the same as, or differ from, the spacing between ranks, and may be positioned to evenly straddle, and center on, a fore-aft reference line through the associated tillage tool 150'.

As mentioned, the ranks of tines may be mounted to one or more of the drawbars 300'. In the example embodiment, the ranks may be mounted to two drawbars 300' each by one or more pivot links, such as pivot links 540 and 542 shown in the example embodiment. The pivot links 540, 542 permit the freedom of movement necessary for the tine harrow attachment 500 to perform as intended during operation so that the tines 520 penetrate the ground, but also to allow the ranks to trip so the tines 520 move out of engagement with the ground in the event excessively hard ground or an immovable object is encountered. The pivot links 540, 542 (e.g., by proper pivot connections) may also permit lateral movement of the ranks relative to the drawbar 300' to aid in residue flow between the tines 520 and to reduce plugging. However, the lateral movement of the ranks is constrained (e.g., to a few inches toward each lateral side of the TI 100'). The rigid pivot links 540, 542 constrained lateral movement limits shifting of the tine harrow attachment 500 during folding and unfolding. When the drawbars 300' are mounted to the TI 100' at the predetermined locations, as described above, each tine harrow attachment 500 is located in its pre-defined position and maintained there with little, or possibly even no, shifting during folding and unfolding. By way of providing one specific example only, the example embodiment may allow a lateral movement of 1-6 inches, such that during the folding process and/or when the TI 100' is in the folded transport position, the tine harrow attachment 500 may shift a corresponding distance (e.g., dropping under gravity when the section is oriented near vertical). This limited shifting is a significant reduction from the approximately twenty inches or so of shifting possible with conventional hang chain harrow attachments. In this way, the tine harrow attachment 500 enhances both aspects of the FGW capabilities of the TI 100'.

In particular, in the example embodiment, pivot links 540, 542 are assemblies of link members 544 and 546, respectively, that are coupled together and spaced apart in the lateral direction. The lower ends of the pivot links 540, 542 are connected by pivot pins 550 to the associated mounting brackets 532, the crossbar 530 and/or the associated rank bar 510. The upper ends of the pivot links 540, 542 are pivotally connected to the drawbar 300' by pivot pins 552 (e.g., bolts). The long dimensions of the pivot pins 550, 552 may be arranged to extend in the lateral direction, and thus realize shear, rather than bending, loads during operation. Openings for the pivot pins 552 may be formed in the short sides of the support arm 320' portion of the drawbar 300'. The pivot links 540, 542 thus form a four-bar linkage arrangement with the drawbar 300' and the crossbar 530 so that the tine harrow attachment 500 remains level or otherwise maintains the same pitch and roll orientation during pivotal movement (e.g., tripping) in operation. The pivot links 540, 542 may further be configured to facilitate full tripping movement of the tine harrow attachment 500. In the example embodiment, the pivot links 540, 542 are angled or curved (or "dog-legged") to provide the desired range of motion and trip height without interference by other features (e.g., to accommodate an actuator mechanism for a finishing basket attachment).

Unlike the aforementioned example spike harrow attachment 400, which uses the weight of the assembly to engage the spikes 420 with the ground, the tine harrow attachment 500 may be biased in engagement with the ground by a downforce member, such as downforce spring 560. While the example embodiment includes downforce spring 560, other biasing components could be used, including any of various other spring configurations or piston-cylinder arrangements (e.g., pneumatic or hydraulic cylinders). Thus, the term "spring" as used herein will be understood to include conventional coiled metal wire springs and piston-cylinder actuators. As will be understood, the downforce spring 560 applies a biasing force to the pivot links 540, 542 in the clockwise direction (from the perspective of FIG. 25) to bias the ranks downward toward the ground to engage the teeth 522 of the tines 520 with the ground during operation. The pivot links 540, 542 pivot counter-clockwise (from the perspective of FIG. 25) to allow the ranks to trip rearward against the biasing force of the downforce spring 560 when an obstruction is encountered, after which the downforce spring 560 (and gravity) return the ranks to engage the tines 520 with the ground. The range of pivoting and the trip height, for example, may be the same or similar to that of the spike harrow attachment 400.

Figure 25:
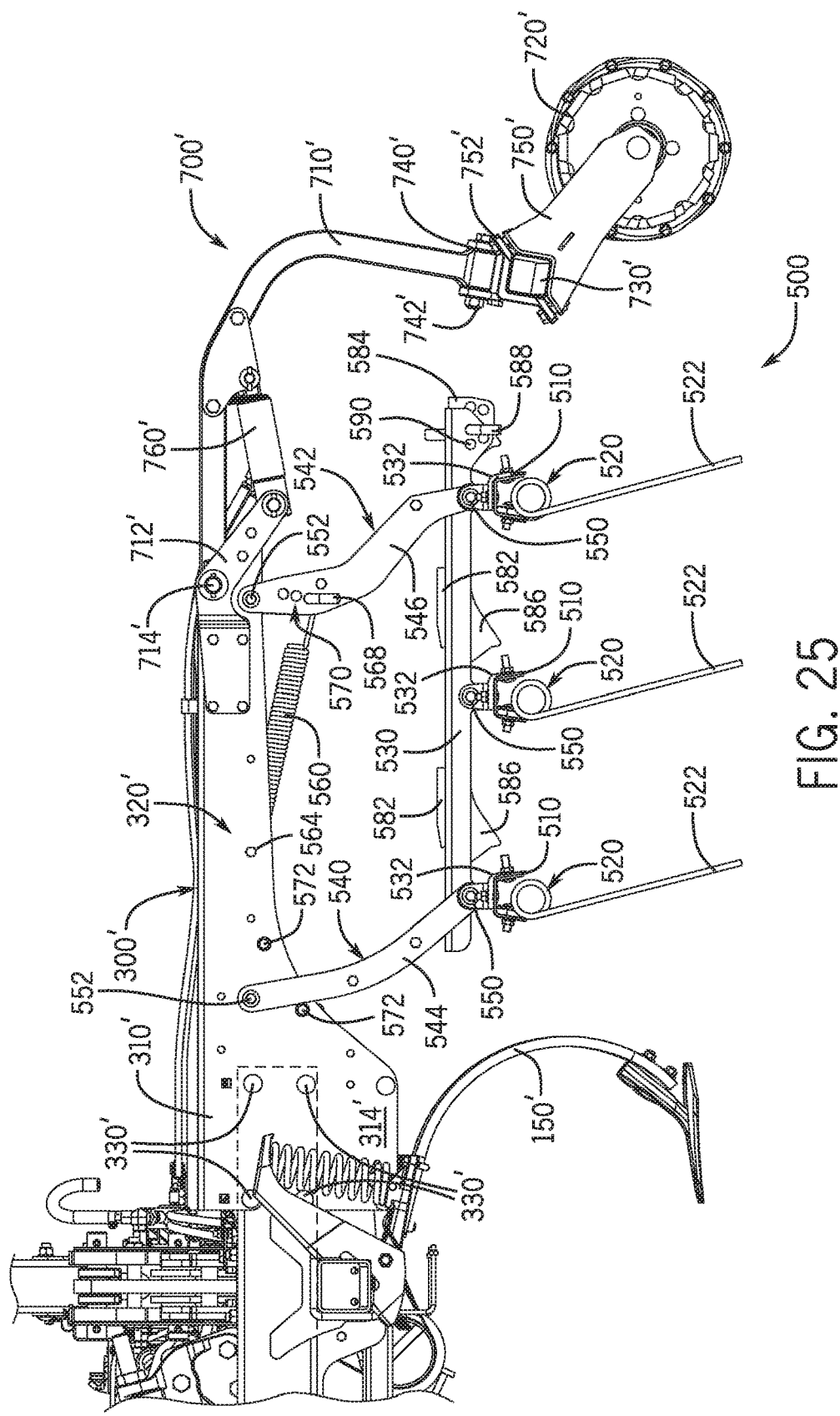
FIG. 25 is a partial side view of example tine harrow and finishing basket attachments of the field cultivator of FIG. 1A.
Figure 26:
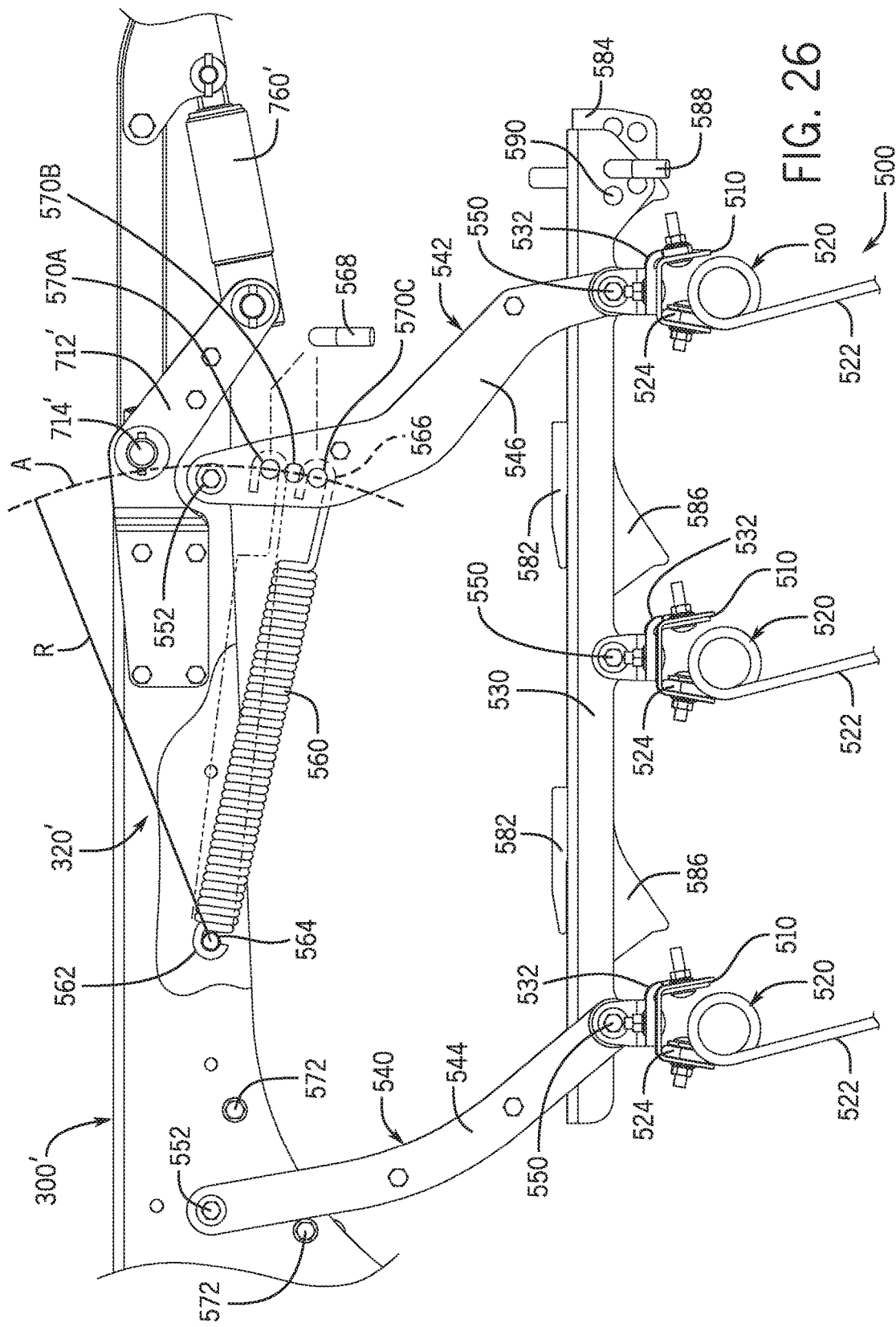
FIG. 26 is an enlarged partial side view thereof, showing a downforce pressure adjustment mechanism of the example tine harrow attachment of FIG. 25.
Figure 27:
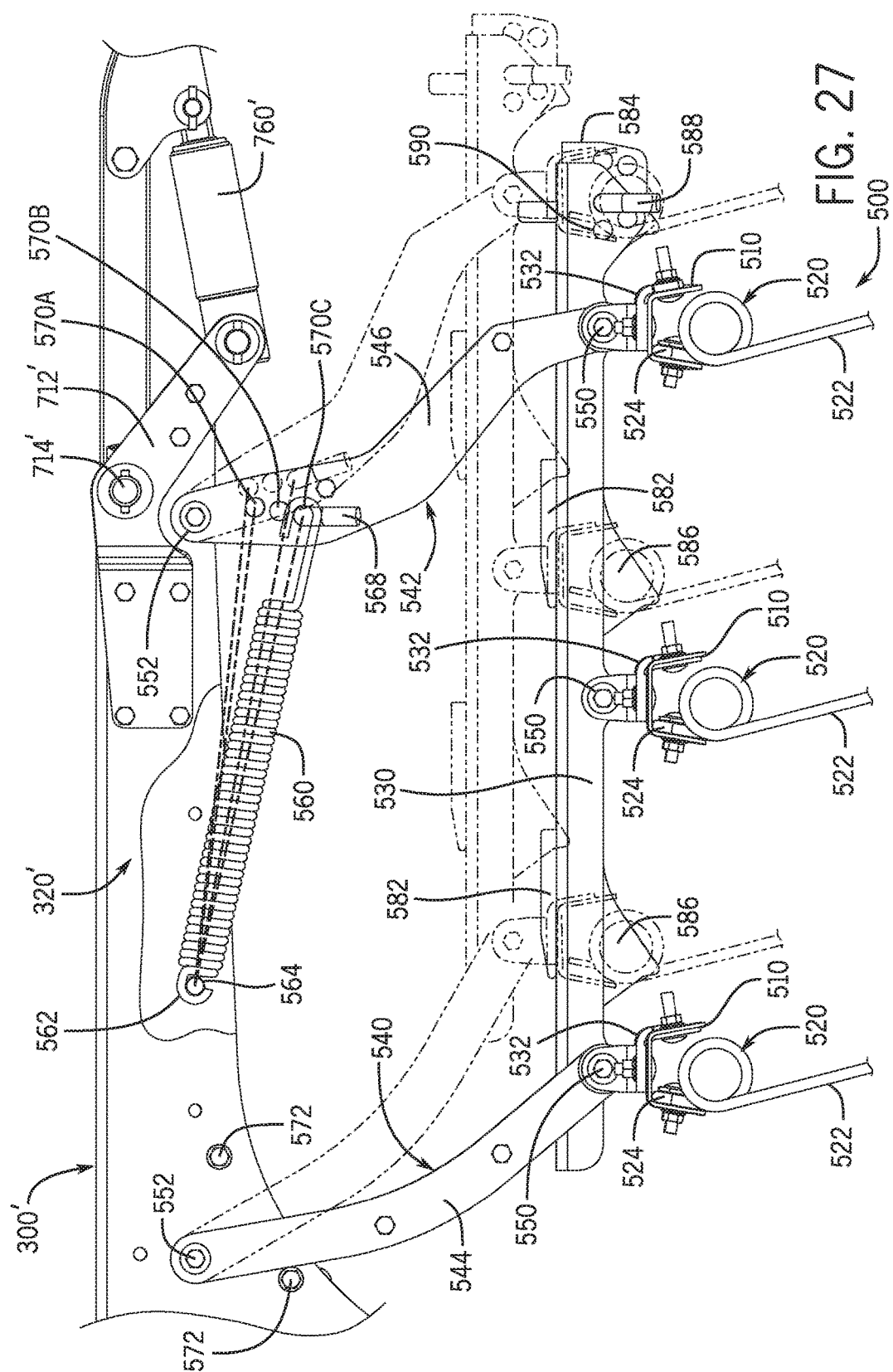
FIG. 27 is a partial side view similar to FIG. 26 showing in phantom the example tine harrow attachment in one of various positions.
Figure 28:
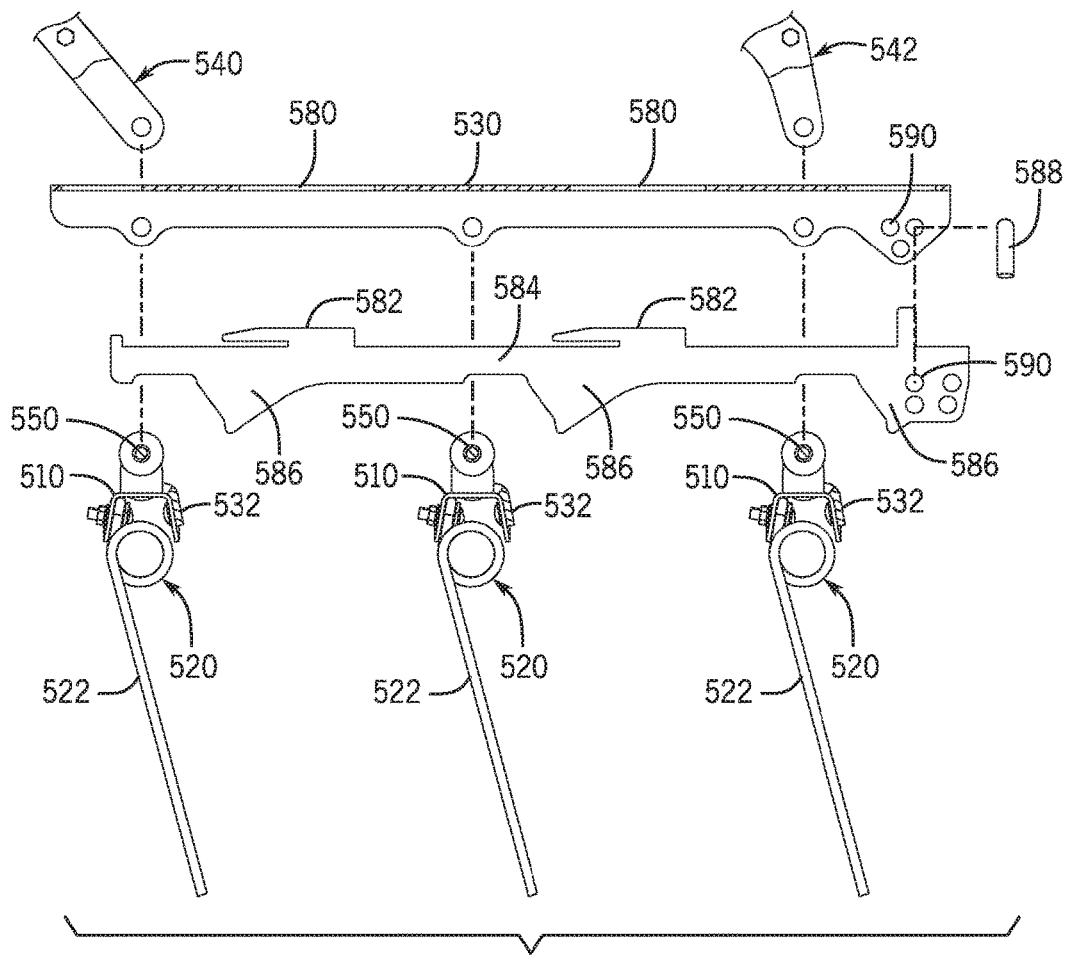
FIG. 28 is an enlarged partial exploded sectional side view showing certain components of the example tine harrow attachment.

It may be desirable to adjust the amount of downforce applied to the harrow ranks, such as to preferentially load the tine harrow attachment 500 for different ground conditions (e.g., soil type, hardness and residue coverage, etc.). With particular reference to FIGS. 25-27, the downforce spring 560 may be pivotally coupled at one end to the drawbar 300' or one of the pivot links 540, 542, and adjustably coupled to the other component at its other end. For example, in the example embodiment, the downforce spring 560 may have a loop or hook end 562 that fits about a fixed pin 564 extending laterally between, and mounted in openings in, the sides of the drawbar 300'. The downforce spring 560 may have another loop or hook end 566 that fits about a pull pin 568 (e.g., an L-shaped pin, the short leg of which acts as a handle). The long leg of the pull pin 568 extends in the lateral direction and fits into aligned pairs of openings, such as the three sets of adjustment openings 570A-570C, in the links 546 of the rear pivot link 542. Positioning the pull pin 568 in a different set of the adjustment openings 570A-570C changes the amount of biasing force applied to the harrow ranks by the downforce spring 560. Specifically, the perpendicular distance of the adjustment opening 570A is closer to the fulcrum (e.g., pivot pin 552) of the pivot link 542, and thus provides a shorter lever arm for the moment providing the biasing force, which decreases the moment and thereby the downforce, compared to that provided by the other adjustment openings 570B-C. It will thus be understood that when the pull pin 568 is in the adjustment openings 570A, the downforce spring 560 provides a lesser biasing moment and corresponding effective downforce, than when in the adjustment opening 570B, which provides a lesser biasing moment and corresponding effective downforce than when in the adjustment opening 570C.

In certain embodiments, an adjustment mechanism may be included so that the downforce may be adjusted with generally unfettered access from the rear of the implement and without fighting the downforce spring 560, in other words while the downforce spring 560 is at a zero-force, or fixed-length, state, neither in compression or tension. Further, such zero downforce adjustment may be carried out without repositioning the harrow ranks, in other words while the harrow ranks are maintained in the same (e.g., operational) orientation. This may be accomplished by positioning the adjustment openings 570A-C so that their centers fall along an arc "A" defined by a fixed-length radius line "R" (FIG. 26) originating from the fulcrum (e.g., the lateral axis of the fixed pin 564), in which the radius R is equal to the fixed-length of the downforce spring 560. Thus, provided the adjustment openings are centered of the arc defined by the radius R, the number and angular spacing between the sets of adjustment openings could be increased or decreased, and the angular spacing could be the same or different between consecutive sets of adjustment openings. In this way, without needing to stretch or compress the downforce spring 560, the downforce acting on the harrow ranks during operation may be changed by simply removing the pull pin 568 from one set of adjustment openings (and the hook end 566 of the downforce spring 560) and reinserting it into another set of adjustment openings (and the hook end 566).

The tine harrow attachment 500 may have mechanical stop features to limit the forward and/or rearward movement of the harrow ranks. In the illustrated example, forward and rearward stop pins 572 may be mounted to the drawbar 300' at suitable forward and rearward locations with respect to the forward pivot pin 552 for the forward pivot link 540. Protruding ends of the stop pins 572 cooperate, and are engaged by, opposite forward and rearward edges of the forward pivot link 540 to limit the pivot angle of the pivot links 540, 542, and thereby the harrow ranks. If desired, the forward stop pin 572 may be located to set the operating position (i.e., the non-tripped position) of the harrow ranks.

It may also be desirable to set and adjust the angle of attack (i.e., fore-aft tilt angle $\alpha$) of the tines 520 based on the ground conditions (e.g., soil type, hardness and residue coverage, etc.). In example embodiment, as shown in FIGS. 25 and 28-31, the rank bars 510 may be pivotally connected to the crossbar 530 to pivot either forward or rearward from a vertical or perpendicular orientation of the tines 520. Moreover, the crossbar 530 may have slots 580 in its upper wall through which extend vanes 582 of an adjustment plate 584 that have fore-aft slots sized to receive the thickness of the upper wall of the crossbar 530 so that the fore-aft position of the adjustment plate 584 may be changed. The lower side of the adjustment plate 584 may have angled bumps 586 spaced apart in the fore-aft direction so that one bump 586 is positioned behind each rank bar 510 to limit the rearward pivot angle $\beta$ of the rank bars 510. For example, the front edge of each bump 586 may be angled downward and rearward as needed to engage the associated rank bar 510 after pivoting through a prescribed angle. Alternatively or additionally, the bumps 586 may be positioned and configured so that the front edges engage the rank bars 510 to set the tilt angle $\alpha$ of the tines 520 without allowing rearward pivoting.

Figure 29:
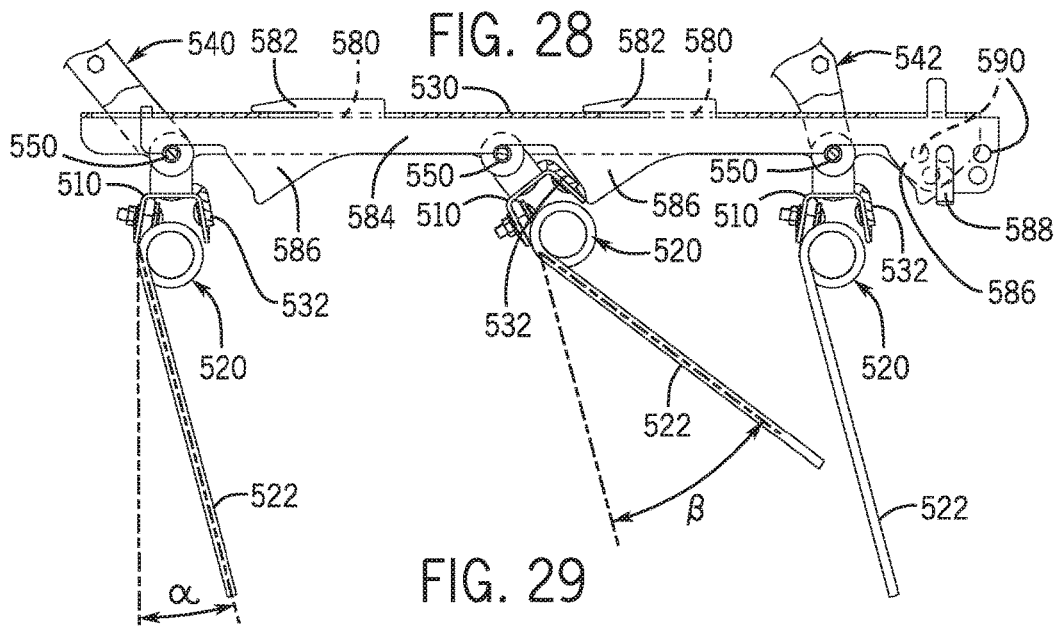
FIG. 29-31 are enlarged partial side sectional views thereof as assembled and in various tine angle positions.
Figure 30:
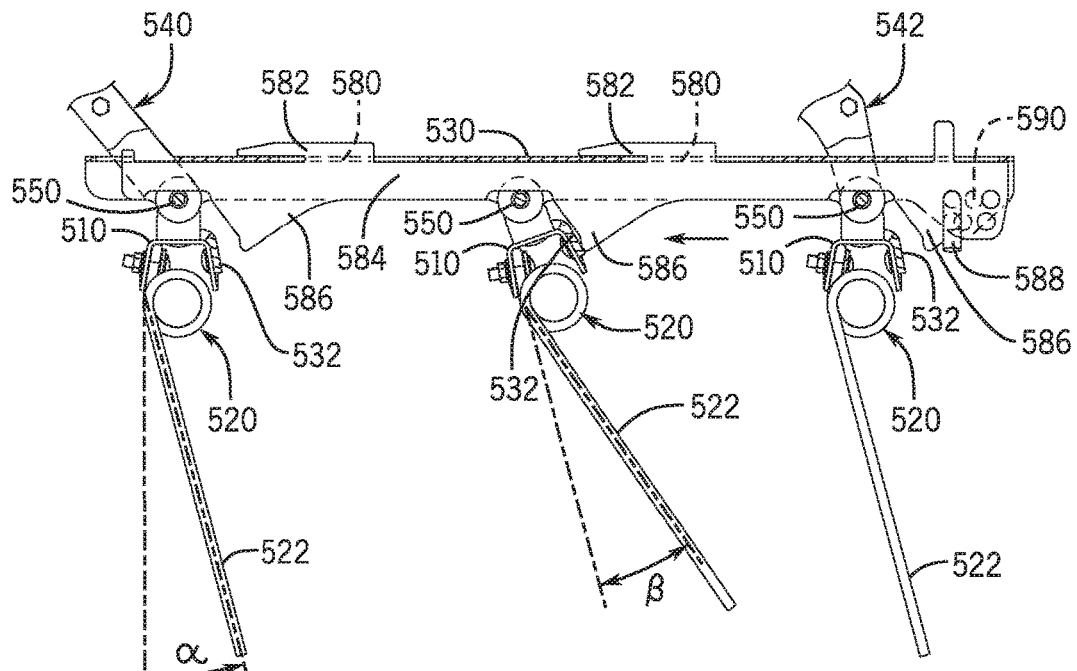
Figure 31:
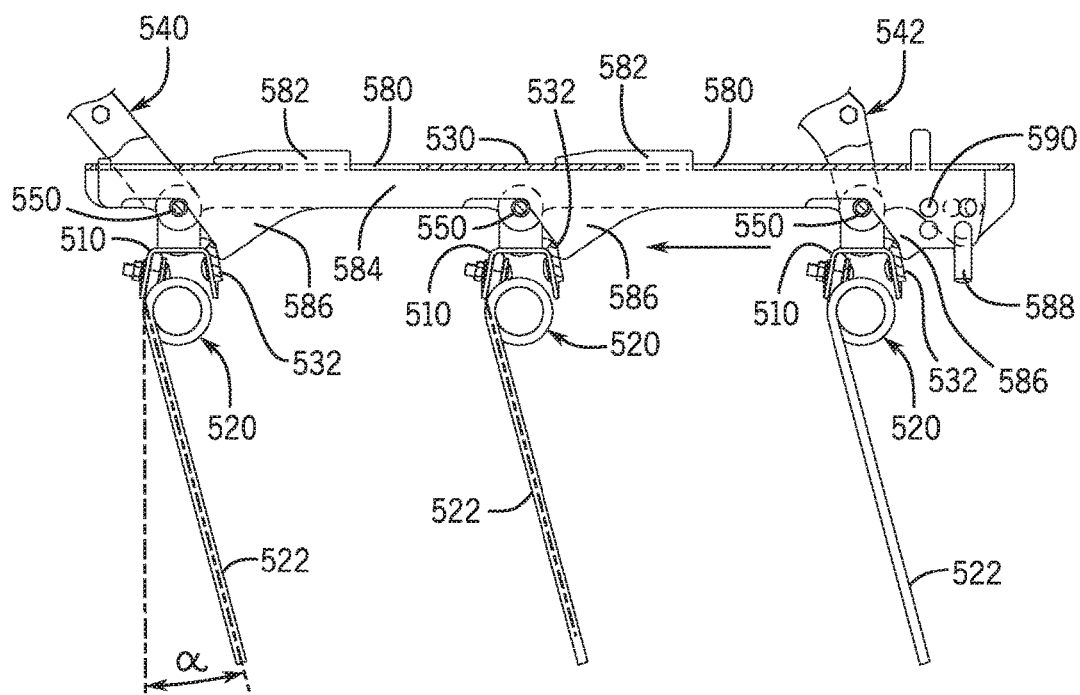

In either case, by changing the fore-aft position of the adjustment plate 584 in the crossbar 530, the tines 520 may pivot rearward to a different angle at which the rank bars 510 engage the bumps 586 of the adjustment plate 584, as shown in FIGS. 29 and 30, or the adjustment plate 584 may engage the rank bars 510 to set the tines 520 at a different tilt angle, as shown in FIG. 31. An adjustment mechanism may be included to control the position of the adjustment plate 584 relative to the crossbar 530, and thus the pivot or tilt angle of the tines 520. In the example embodiment, the adjustment mechanism is a pin and slot arrangement, including a pull pin 588 that fits into an aligned set of adjustment openings 590 in sides of the crossbar 530 and the adjustment plate 584. Each adjustment opening 590 may at any suitable fore-aft and vertical location to position the adjustment plate 584 as needed to achieve the desired tilt angle α and/or pivot angle β of the tines 520. By way of example, the tines 520 may be positioned at an aggressive tilt angle α of about 70 degrees (from a horizontal plane) to a less aggressive 50 degrees, or allow the tines 520 a pivot angle β of about 20 degrees rearward.

Alternatively or additionally, the tilt angle of the tines may be adjusted by using multiple adjustment plates, such as one for each rank. The adjustment plates may be mounted within separate crossbars pivotally connecting the rank bars, or they may be stacked together side-by-side within a single crossbar. Each adjustment plate may have its own vane and bump features that are used, respectively, for adjustably connecting the adjustment plate to the crossbar and to set the angle to which the associated rank bar may pivot. Whether separately mounted or mounted in a stacked configuration, the multiple adjustment plates may be used to set different tilt angles for the tines in different ranks. In the stacked configuration, one or more slots may be provided in the adjustment plates so that they may move independently from each other, while being secured to the crossbar with one or more fasteners (e.g., one or more bolts).

In certain embodiments, the tine harrow attachment 500 may have tines that are of the same or different size and shape, for example, including one or more "smoothing" tines 520 and one or more "knockdown" tines 620, which, comparatively, have a thicker gauge thickness and/or wider tooth spacing, as shown in FIGS. 33 and 34. In the example shown in FIG. 33, the knockdown tine 620 may have both a thicker gauge and a wider tooth spacing. The larger gauge and wide spaced teeth of the knockdown tines 620 may be useful for more aggressive ground working, such as for initially addressing, or knocking down, the large hills or mounds following ground-working by a preceding tillage tool before being smoothed by subsequent tines.

Like the smoothing tines 520, the knockdown tines 620 may have two elongated rod portions or "teeth" 622 that are spaced apart and connected by a center portion or "staple" 624. Each knockdown tine 620 may be an assembly of parts or a monolithic member with coiled areas for flexing at each end of the staple. Also, one or more of the knockdown tines 620 may have a single tooth. The knockdown tines 620 may be mounted to the same rank bars as smoothing tines 520, or they may be mounted to one or more dedicated knockdown rank bars 610, in the same manner as the smoothing tines using suitable brackets and fasteners clamping the staples 624 to the rank bars 610. In certain embodiments, the spacing between the teeth 622 of the knockdown tines 620 is at least fifty percent wider than the spacing between the teeth 522 of the smoothing tines 520. For example, the teeth 522 of the smoothing tines 520 may be spaced apart about nine inches, and the teeth 622 of the knockdown tines 620 may be spaced apart about eighteen inches. In certain embodiments, the teeth 622 of the knockdown tines 620 are at least fifty percent thicker than the teeth 522 of the smoothing tines 520. For example, the teeth 622 of the knockdown tines 620 may have a generally circular cross-section and be about $7/16$ inches in diameter.

Figure 35:
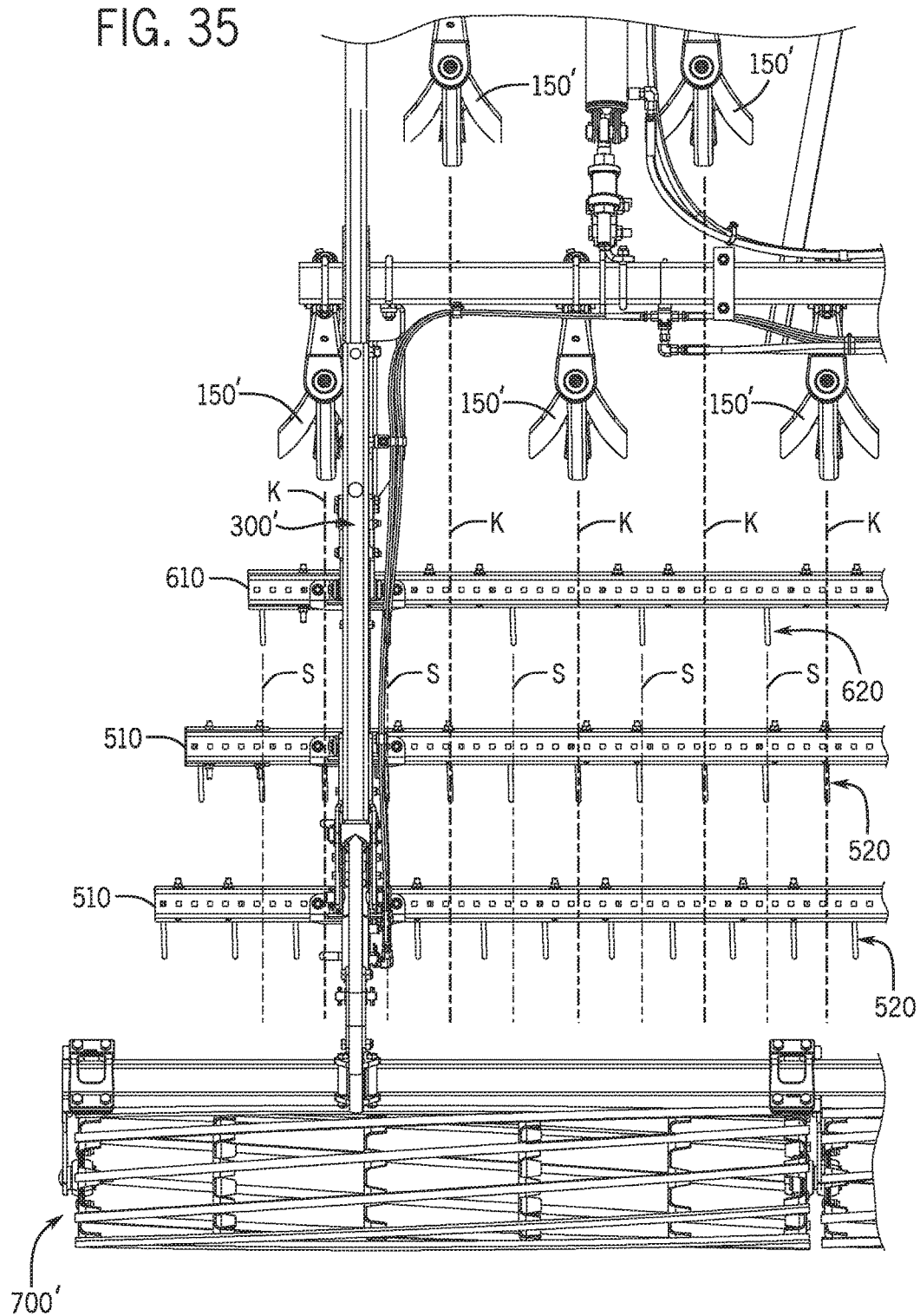
FIG. 35 is a partial top view showing a three-rank knockdown tine harrow attachment of FIG. 32 incorporated in the mulch finisher of FIG. 1.

FIG. 32 depicts the three-rank tine harrow attachment 500 as described above, except with the forward rank having a rank bar 610 with knockdown tines 620. As with the other embodiments, the ranks may be arranged in a pattern with a generally consistent fore-aft spacing between ranks and a generally consistent lateral spacing within each rank. Specifically, referring now also to FIG. 35, in the three-rank tine harrow attachment example shown, the tines 520, 620 may be arranged in a special form of a staggered split the middle configuration. For example, the knockdown tines 620 in the forward rank are positioned to straddle, and be centered on, parallel fore-aft reference lines "K" extending in the direction of travel D through the rearward-most tillage tools 150' so that the knockdown tines 620 are laterally positioned knockdown hills or mounds left behind from the ground-working done by the tillage tools 150'. The fore-aft spacing from the rearward-most tillage tools 150' may be same or different spacing between the harrow ranks. The smoothing tines 520 of the rear harrow rank are arranged so that the smoothing tines 520 straddle, and are centered on, parallel fore-aft reference lines "S" extending in the direction of travel D from the teeth 622 of the knockdown tines 620 of the forward harrow rank. An intermediate harrow rank, positioned between the forward and rearward ranks in the direction of travel D, has a plurality of smoothing tines 520 aligned across the rank bar 510 so that the alternating teeth 522 of the smoothing tines 520 are aligned with the reference lines K and S.

Figure 36:
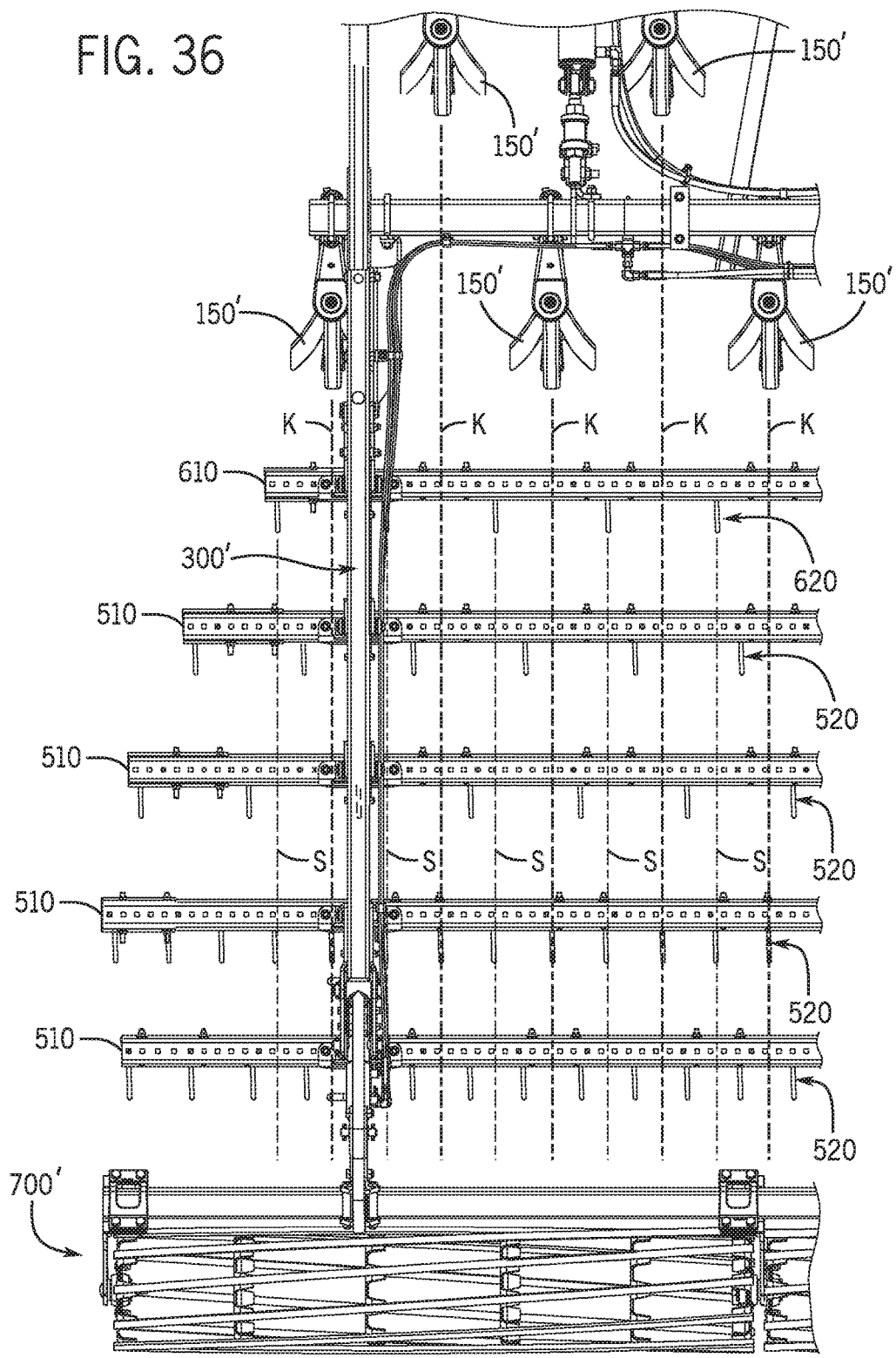
FIG. 36 is a partial top view similar to FIG. 35 of another example knockdown tine harrow attachment having five harrow ranks.

Additional (or fewer) ranks may be included in the tine harrow attachment, and the tines 520, 620 may be arranged in a special staggered split the middle configuration. For example, FIG. 36 shows an example five-rank tine harrow attachment in which the forward-most rank has knockdown tines 620 located in relation to the rearward-most tillage tools 150' in the same manner as the three-rank example described above. The rearward four ranks contain all smoothing tines 520, and the second rearward rank and rearward-most rank are arranged laterally in the same manner as the three-rank example described above. This example includes two additional intermediate ranks of smoothing tines 520. The smoothing tines 520 of the third rearward rank straddle, and are centered on, another set of parallel reference lines S extending in the direction of travel D from the teeth 522 of the smoothing tines 520 of the fourth rearward rank. The third and fourth rearward ranks are offset from the forward-most rank in the lateral direction by an amount equal to one fourth of the spacing between the smoothing tines 520, or in the case of nine inch smoothing tines, about 2.25 inches.

The knockdown tines 620, and the spacing pattern, thus provide better ground-working performance by putting more robust tines where they are needed to aggressively address larger areas of ground and provide better residue flow to reduce the likelihood of plugging. The constrained lateral movement and the readily adjustable downforce and tine angles of the tine harrow attachment 500, especially with the knockdown tines and the corresponding tine spacing pattern, thus serve to improve the FGW capabilities of the TI 100'.

Aspects of a finishing basket attachment 700 will be now addressed with regard to the example configuration shown in the figures. The finishing basket attachment 700 may include various features that enhance the FGW capabilities of the TI 100'. With regarding to folding and unfolding, the finishing basket attachment 700 may be mounted to the TI 100' by one or more of the drawbars 300', such as by a pair of drawbars 300' of any of the frame sections 110'-118'. As such, the lateral positioning of the finishing basket attachment 700 will be mounted at the expected location and pre-defined space envelopment. Moreover, certain aspects of the configuration of components in the finishing basket attachment 700 further contribute to avoiding obstructions during folding and to achieving a tight fold. For example, the finishing basket attachment 700 may mount to the drawbars 300' by basket arms 710 that align with the drawbars in the fore-aft direction and are attached approximately level with the drawbar 300' so that they occupy little or no vertical space above the drawbars 300'. The basket arms 710 interface with a roller basket 720 (or multiple laterally aligned roller baskets) at a lower, forward position with respect to the roller basket 720, which provides additional space-saving characteristics to improve the compactness of the fold, and avoid obstructing whether the finishing basket attachment 700 is in the lowered position (FIG. 25) or the raised position (FIG. 37) as the TI 100' is folded and unfolded.

More specifically now, and with reference to FIGS. 9-10, 25 and 37-41, in the example embodiments, the basket arms 710 mount to the drawbars 300' by the two mounting brackets 712 that are attached (e.g., by bolts, welding, etc.) to the rearward end of the drawbar 300'. The mounting brackets 712 provide a pivot connection, via pivot pin 714, that is at, or very near, the rearward end of the drawbar 300' and located generally at the same height, or very near the height of, the upper surface of the drawbar 300'. The pivot point does not project up far above the drawbar 300' where it may require significantly more space in the folded orientation of the TI 100'.

The rearward ends of the basket arms 710 mount to a crossbar 730 by pivot brackets 740. The pivot brackets 740 include a pivot pin 742 and mounting hardware (e.g., bolts) to secure the pivot brackets 740 to the crossbar 730. The crossbar 730 connects to the ends of the roller basket 720 by short mounting arms 750. The mounting arms 750 permit rotation of the roller basket 720 relative to the crossbar 730 (e.g., via suitable bearings) and connect to the crossbar 730 via tube clamps 752. As can be seen from FIGS. 25 and 27, the basket arms 710 are angled so that a rearward portion of each basket arm 710 extends downwardly and forwardly in the operational position shown in FIG. 25, such that the crossbar 730 is located forward of the roller basket 720 with respect to the direction of travel D. Due to the forward positioning of the crossbar 730, the crossbar 730 may also be set lower with respect to the roller basket 720, such that a lower portion of the crossbar 730 may be no higher, or even lower, than the top of the roller basket 720. As noted, and illustrated in FIG. 8, this provides additional space-saving characteristics to improve the compactness of the fold, and avoid obstructing whether the finishing basket attachment 700 is in the lowered position (FIG. 25) or the raised position (FIG. 37) when the TI 100' is folded and unfolded, since the basket arms 710, which are in fore-aft alignment with the drawbars 300', are staggered vertically when in the folded orientation.

The finishing basket attachment 700 also improves ground-working performance with enhanced lateral (or side hill) ground-following. For example, in the example embodiments, since the basket arms 710 are connected to the crossbar 730 by pivot brackets 740, the roller basket 720 is able to pivot about a reference axis extending generally in the fore-aft direction. In the example embodiments, the roller baskets 720, and thus the crossbars 730, are approximately as wide in the lateral direction as the associated frame sections 110'-118'. As such, to ensure that the roller baskets 720 are mounted securely and so that they are supported in a well-balanced manner for even ground contact across the length of the roller basket 720 during operation, and thus consistent, even finishing treatment, the roller baskets 720 are mounted to the TI 100' by two basket arms 710 at laterally spaced locations that may align in the fore-aft direction with two associated drawbars 300'. To permit the roller baskets 720 to pivot with multiple basket arms 710, in addition to the pivot brackets 740, in certain embodiments, the basket arms 710 may be made of a material (e.g., a suitable spring steel alloy), and have a sufficiently small lateral cross-section, to permit the basket arms 710 to flex laterally, as shown in FIG. 41. The arrangement thus provides lateral pivoting of the roller basket 720 by not only pivoting about the pivot pins 742 of the pivot brackets 740, but also by rotating the pivot pins 742 relative to one another. This relative rotation of the pivot pints 742 may be accomplished by pivoting of the basket arms 710 with respect to the drawbars 300' about pivot pins 714 in opposite, raise/lower directions and/or by the flexing of the basket arms 710 in opposite, inward clock directions. This arrangement thus allows multiple basket arms 710 to couple the roller basket 720 to the TI 100' so that it is well-balanced in the lateral direction, while also allowing the roller basket 720 to pivot laterally. This further promotes the FGW capabilities of the TI 100'.

Further, in certain embodiments, the basket arms 710 may be raised and lowered (i.e., pivoted about pivot pins 714) under power, such as by using an actuator 760, which, for example, may be a pneumatic or hydraulic dual-acting piston cylinder arrangement operatively coupled to a pneumatic or hydraulic system of the towing vehicle or the TI 100'. In this case, lateral pivoting may be accomplished actively (i.e., under power) or passively by the actuators 760 moving in response to movement of the roller basket 720. Further, various open- and closed-feedback control schemes may be used to control the finishing basket attachment 700. For example, various sensors and imaging devices may be used to input to one or more on-board controllers information about the environment and field conditions (e.g., soil type, hardness, residue coverage, etc.) in which the implement is operating. The controller may then provide the information to the towing vehicle operator via a user interface (e.g., display) for manual adjustments in position and/or downforce of the finishing attachments or other tools of the implement. Alternatively or additionally, the controller may use the input information to automate adjustments in position and/or downforce of the finishing attachments or other tools of the implement. It should be noted that similar powered control devices and schemes may be utilized to control the position and/or downforce of other components of the implement, including the various disc gangs and harrow attachments discussed above.

The examples used herein are for the purpose of describing particular embodiments only and are not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tillage implement, comprising:
a main frame centered on a centerline in a direction of travel of the implement;
at least one wing hinged to the main frame to one side of the centerline; and
a plurality of gangs having tools and mounted to the main frame and the at least one wing, including a plurality of main frame gangs mounted to the main frame and a plurality of wing gangs mounted to an associated one of the at least one wing;
wherein the main frame gangs are mounted to the main frame such that an inner end of a first main frame gang to a first side of the centerline is forward or rearward with respect to the direction of travel of an outer end of the first main frame gang and an inner end of a second main frame gang to a second side of the centerline opposite the first side is forward or rearward with respect to the direction of travel of an outer end of the second main frame gang;
wherein the wing frame gangs are mounted to the associated at least one wing offset from each other such that an inner end of an inner wing gang is forward with respect to the direction of travel of an outer end of the inner wing gang and an inner end of an outer wing gang is forward with respect to the direction of travel of an outer end of the outer wing gang;
wherein the inner end of the outer wing gang is forward with respect to the direction of travel of the outer end of the inner wing gang and the outer end of the inner wing gang is forward with respect to the direction of travel of the outer end of the outer wing gang;
wherein the at least one wing includes a plurality of wings including a first inner wing pivotally mounted to the main frame at the first side of the centerline and a second inner wing pivotally mounted to the main frame at the second side of the centerline;
wherein each of the first and second inner wings includes inner and outer wing gangs offset from each other such that an inner end of the associated inner wing gang is forward with respect to the direction of travel of an outer end of the associated inner wing gang and an inner end of the associated outer wing gang is forward with respect to the direction of travel of an outer end of the associated outer wing gang;
wherein in each of the first and second inner wings:
the inner end of the associated outer wing gang is forward with respect to the direction of travel of the outer end of the associated inner wing gang and the outer end of the associated inner wing gang is forward with respect to the direction of travel of the outer end of the associated outer wing gang; and
wherein the inner end of the associated inner wing gang is forward with respect to the direction of travel of the inner end of the associated outer wing gang;
wherein the inner end of the inner wing gang of the first inner wing is forward with respect to the direction of travel of the outer end of the first main frame gang;
wherein the inner end of the inner wing gang of the second inner wing is forward with respect to the direction of travel of the outer end of the second main frame gang;
wherein the inner ends of the first and second main frame gangs are forward with respect to the direction of travel of the inner ends of the inner wing gangs of the respective first and second inner wings;
wherein the inner wing gangs of the first and second inner wings are positioned at the respective first and second sides of the centerline substantially the same distance with respect to the centerline;
wherein the outer wing gangs of the first and second inner wings are positioned at the respective first and second sides of the centerline substantially the same distance with respect to the centerline;
wherein the plurality of wings include a first outer wing pivotally mounted to the first inner wing opposite the main frame and a second outer wing pivotally mounted to the second inner wing opposite the main frame;
wherein each of the first and second outer wings includes inner and outer wing gangs offset from each other such that an inner end of the associated inner wing gang is forward with respect to the direction of travel of an outer end of the associated inner wing gang and an inner end of the associated outer wing gang is forward with respect to the direction of travel of an outer end of the associated outer wing gang; and
wherein in each of the first and second outer wings:
the inner end of the associated outer wing gang is forward with respect to the direction of travel of the outer end of the associated inner wing gang and the outer end of the associated inner wing gang is forward with respect to the direction of travel of the outer end of the associated outer wing gang; and
wherein the inner end of the associated inner wing gang is forward with respect to the direction of travel of the inner end of the associated outer wing gang.

2. The tillage implement of claim 1, wherein the inner end of the inner wing gang of the first outer wing is forward with respect to the direction of travel of the outer end of the outer wing gang of the first inner wing;
wherein the inner end of the inner wing gang of the second inner wing is forward with respect to the direction of travel of the outer end of the outer wing gang of the second inner wing; and
wherein the inner ends of the outer wing gangs of the first and second inner wings are forward with respect to the direction of travel of the inner ends of the inner wing gangs of the respective first and second outer wings.

3. The tillage implement of claim 2, wherein the inner wing gangs of the first and second outer wings are positioned at the respective first and second sides of the centerline substantially the same distance with respect to the centerline; and
wherein the outer wing gangs of the first and second outer wings are positioned at the respective first and second sides of the centerline substantially the same distance with respect to the centerline.

4. A tillage implement, comprising:
a main frame centered on a centerline in a direction of travel of the implement;

first and second inner wings pivotally coupled to the main frame at respective first and second sides of the centerline;

first and second outer wings pivotally coupled to the respective first and second inner wings opposite the main frame; and a plurality of disk gangs mounted to the main frame and first and second inner and outer wings, including a plurality of main frame disk gangs mounted to the main frame and a plurality of wing disk gangs mounted to each of the first and second inner and outer wings;

wherein the main frame disk gangs are mounted to the main frame such that an inner end of a first main frame disk gang to a first side of the centerline is forward with respect to the direction of travel of an outer end of the first main frame disk gang and an inner end of a second main frame disk gang to a second side of the centerline opposite the first side is forward with respect to the direction of travel of an outer end of the second main frame disk gang;

wherein each of the first and second inner and outer wings has inner and outer wing disk gangs mounted offset from each other such that an inner end of the associated inner wing disk gang is forward with respect to the direction of travel of an outer end of the associated inner wing disk gang and an inner end of the associated outer wing disk gang is forward with respect to the direction of travel of an outer end of the associated outer wing disk gang; and wherein in each of the first and second inner and outer wings:

the inner end of the associated outer wing disk gang is forward with respect to the direction of travel of the outer end of the associated inner wing disk gang and the outer end of the associated inner wing disk gang is forward with respect to the direction of travel of the outer end of the associated outer wing disk gang; and wherein the inner end of the associated inner wing disk gang is forward with respect to the direction of travel of the inner end of the associated outer wing disk gang.

5. The tillage implement of claim 4, wherein the inner end of the inner wing disk gang of the first inner wing is forward with respect to the direction of travel of the outer end of the first main frame disk gang;

wherein the inner end of the inner wing disk gang of the second inner wing is forward with respect to the direction of travel of the outer end of the second main frame disk gang; and wherein the inner ends of the first and second main frame disk gangs are forward with respect to the direction of travel of the inner ends of the inner wing disk gangs of the respective first and second inner wings.

6. The tillage implement of claim 5, wherein the inner wing disk gangs of the first and second inner wings are positioned at the respective first and second sides of the centerline substantially the same distance with respect to the centerline; and wherein the outer wing disk gangs of the first and second inner wings are positioned at the respective first and second sides of the centerline substantially the same distance with respect to the centerline.

7. The tillage implement of claim 6, wherein in each of the first and second outer wings:

the inner end of the associated outer wing disk gang is forward with respect to the direction of travel of the outer end of the associated inner wing disk gang and the outer end of the associated inner wing disk gang is forward with respect to the direction of travel of the outer end of the associated outer wing disk gang; and wherein the inner end of the associated inner wing disk gang is forward with respect to the direction of travel of the inner end of the associated outer wing disk gang.

8. The tillage implement of claim 6, wherein the inner end of the inner wing disk gang of the first outer wing is forward with respect to the direction of travel of the outer end of the outer wing disk gang of the first inner wing;

wherein the inner end of the inner wing disk gang of the second inner wing is forward with respect to the direction of travel of the outer end of the outer wing disk gang of the second inner wing; and wherein the inner ends of the outer wing disk gangs of the first and second inner wings are forward with respect to the direction of travel of the inner ends of the inner wing disk gangs of the respective first and second outer wings.

* * * * *